(12) United States Patent
Rezaei

(10) Patent No.: US 12,217,403 B2
(45) Date of Patent: Feb. 4, 2025

(54) METHODS AND SYSTEMS TO CORRECT CROSSTALK IN ILLUMINATION EMITTED FROM REACTION SITES

(71) Applicant: ILLUMINA, INC., San Diego, CA (US)

(72) Inventor: Mohsen Rezaei, Brown Deer, WI (US)

(73) Assignee: ILLUMINA, INC., San Diego, CA (US)

( * ) Notice: Subject to any disclaimer, the term of this patent is extended or adjusted under 35 U.S.C. 154(b) by 400 days.

(21) Appl. No.: 17/849,857

(22) Filed: Jun. 27, 2022

(65) Prior Publication Data

US 2022/0414839 A1 Dec. 29, 2022

Related U.S. Application Data

(60) Provisional application No. 63/216,125, filed on Jun. 29, 2021.

(51) Int. Cl.
*G06K 9/00* (2022.01)
*A61K 35/12* (2015.01)
(Continued)

(52) U.S. Cl.
CPC ........... *G06T 5/73* (2024.01); *G01N 21/6428* (2013.01); *G01N 21/6454* (2013.01); *G06T 5/50* (2013.01)

(58) Field of Classification Search
CPC ............. A61K 35/12; G06K 9/00; G06T 5/00
USPC ........ 382/100, 103, 106–107, 109, 128–129, 382/155, 162, 168, 173, 181, 209, 219, 382/224, 254, 286–291, 305, 312; 250/340; 506/13, 17; 435/6.1; 536/24.31

See application file for complete search history.

(56) References Cited

U.S. PATENT DOCUMENTS 5,641,658 A * 6/1997 Adams .................... C12Q 1/686
                                                              435/6.1
6,090,592 A * 7/2000 Adams .................... C12Q 1/686
                                                              536/24.31
(Continued)

FOREIGN PATENT DOCUMENTS

WO    WO 1991/006678 A1    5/1991
WO    WO 2004/018497 A2    3/2004
(Continued)

OTHER PUBLICATIONS

Bentley, David R., et al. "Accurate whole human genome sequencing using reversible terminator chemistry." nature 456.7218 (2008): 53-59.

(Continued)

*Primary Examiner* — Seyed H Azarian
(74) *Attorney, Agent, or Firm* — FROST BROWN TODD LLP

(57) ABSTRACT

Biosensor including an array of reaction sites and corresponding light sensors may experience crosstalk in which photons from one reaction site are detected by neighbors of its corresponding light sensor, and such crosstalk may be corrected using sharpening kernels corresponding to the sensors in the array. Such sharpening kernels may be derived from generative matrices, which themselves may be derived from point spread functions representing dispersion of illumination emitted from the reaction sites.

18 Claims, 22 Drawing Sheets

(51) Int. Cl.
  *G01N 21/64* (2006.01)
  *G06T 5/00* (2024.01)
  *G06T 5/50* (2006.01)
  *G06T 5/73* (2024.01)

(56) References Cited

U.S. PATENT DOCUMENTS

| | | | |
|---|---|---|---|
| 7,057,026 B2 | 6/2006 | Barnes et al. | |
| 7,115,400 B1 | 10/2006 | Adessi et al. | |
| 7,211,414 B2 | 5/2007 | Hardin et al. | |
| 7,315,019 B2 | 1/2008 | Turner et al. | |
| 7,329,492 B2 | 2/2008 | Hardin et al. | |
| 7,405,281 B2 | 7/2008 | Xu et al. | |
| 7,414,116 B2 | 8/2008 | Milton et al. | |
| 7,427,673 B2 | 9/2008 | Balasubramanian et al. | |
| 7,541,444 B2 | 6/2009 | Milton et al. | |
| 7,566,537 B2 | 7/2009 | Balasubramanian et al. | |
| 7,592,435 B2 | 9/2009 | Milton et al. | |
| 7,595,883 B1 | 9/2009 | El Gamal et al. | |
| 7,875,918 B2 | 1/2011 | Venezia et al. | |
| 8,144,221 B2 | 3/2012 | Hiromichi et al. | |
| 8,866,920 B2 | 10/2014 | Venkataraman | |
| 8,937,759 B2 | 1/2015 | Holmes | |
| 9,142,582 B2 | 9/2015 | Ando et al. | |
| 9,175,343 B2 | 11/2015 | Tomaney et al. | |
| 9,434,989 B2 * | 9/2016 | Gordon | C07H 19/00 |
| 9,453,258 B2 * | 9/2016 | Kain | C12Q 1/6874 |
| 10,304,189 B2 * | 5/2019 | Garcia | G06T 7/33 |
| 2002/0055100 A1 | 5/2002 | Kawashima et al. | |
| 2004/0002090 A1 | 1/2004 | Mayer et al. | |
| 2004/0096853 A1 | 5/2004 | Mayer | |
| 2005/0100900 A1 | 5/2005 | Kawashima et al. | |
| 2005/0244870 A1 | 11/2005 | Chee et al. | |
| 2006/0188901 A1 | 8/2006 | Barnes et al. | |
| 2006/0240439 A1 | 10/2006 | Smith et al. | |
| 2006/0281109 A1 | 12/2006 | Barr Ost et al. | |
| 2006/0293860 A1 | 12/2006 | Bressler et al. | |
| 2007/0128624 A1 | 6/2007 | Gormley et al. | |
| 2007/0166705 A1 | 7/2007 | Milton et al. | |
| 2008/0009420 A1 | 1/2008 | Schroth et al. | |
| 2008/0108082 A1 | 5/2008 | Rank et al. | |
| 2008/0234136 A1 | 9/2008 | Drmanac et al. | |
| 2008/0242560 A1 | 10/2008 | Gunderson et al. | |
| 2011/0059865 A1 | 3/2011 | Smith et al. | |
| 2011/0121182 A1 * | 5/2011 | Wong | G01S 17/04 250/340 |
| 2012/0015825 A1 * | 1/2012 | Zhong | G01N 21/6428 506/13 |
| 2020/0080142 A1 | 3/2020 | Langlois et al. | |
| 2020/0364496 A1 | 11/2020 | Kostem | |

FOREIGN PATENT DOCUMENTS

| | | |
|---|---|---|
| WO | WO 2005/065814 A1 | 7/2005 |
| WO | WO 2006/064199 A1 | 6/2006 |
| WO | WO 2007/010251 A2 | 1/2007 |
| WO | WO 2007/123744 A2 | 11/2007 |
| WO | WO 2007/135368 A2 | 11/2007 |
| WO | WO 2009/142641 A1 | 11/2009 |
| WO | WO 2012/058096 A1 | 5/2012 |

OTHER PUBLICATIONS

International Search Report and Written Opinion dated Sep. 13, 2022, for International Application No. PCT/US2022/034065, 17 pages.

U.S. Appl. No. 61/538,294, entitled "Methods and Compositions for Nucleic Acid Sequencing," filed Sep. 23, 2011.

U.S. Appl. No. 61/619,878, entitled "Methods and Compositions for Nucleic Acid Sequencing," filed Apr. 3, 2012.

* cited by examiner

| $S^{1,1}$ | $S^{1,2}$ | $S^{1,3}$ | $S^{1,4}$ | ... | $S^{1,N}$ |
|---|---|---|---|---|---|
| $S^{2,1}$ | $S^{2,2}$ | $S^{2,3}$ | $S^{2,4}$ | | ⋮ |
| $S^{3,1}$ | $S^{3,2}$ | $S^{3,3}$ | $S^{3,4}$ | | |
| $S^{4,1}$ | $S^{4,2}$ | $S^{4,3}$ | $S^{4,4}$ | | |
| ⋮ | | | | ⋱ | |
| $S^{N,1}$ | ... | | | | $S^{N,N}$ |

FIG. 10B odd_odd

| 0.0025 | 0.9 | 1.1 | 0.43 | 1 |
|---|---|---|---|---|
| 0.54 | 3.1 | 8.7 | 4.1 | 1.3 |
| 0.77 | 6.5 | 42 | 8.5 | 1.2 |
| 1.2 | 4.3 | 7 | 2.4 | 0.86 |
| 0.11 | 1.2 | 1.2 | 1.2 | 0.77 | odd_even

| 0.073 | 0.96 | 0.54 | 0.56 | 0.21 |
|---|---|---|---|---|
| 1.1 | 3.3 | 10 | 2.7 | 0.85 |
| 2 | 8.5 | 42 | 6.5 | 0.37 |
| 1 | 2.8 | 6.8 | 3.9 | 0.34 |
| 0.8 | 1.8 | 1.5 | 0.76 | 0.41 | even_odd

| 0.88 | 1 | 1.2 | 1.4 | 0.52 |
|---|---|---|---|---|
| 1.1 | 3.7 | 7 | 2.8 | 0.65 |
| 0.98 | 6.7 | 39 | 8.5 | 1.6 |
| 0.32 | 3.5 | 10 | 4.1 | 1.4 |
| 0.14 | 0.51 | 1.3 | 1 | 0.19 | even_even

| 0.48 | 0.5 | 0.82 | 1.7 | 0.45 |
|---|---|---|---|---|
| 1.3 | 2.4 | 6.8 | 3.6 | 0.9 |
| 1.1 | 8.5 | 42 | 6.1 | 1.2 |
| 0.78 | 3.5 | 11 | 3.2 | 0.52 |
| 0.043 | 0.8 | 1.7 | 1.1 | 0.4 |

FIG. 17

Generative matrix (9x9) for extraction of 3x3 kernel from 3x3 PSF

FIG. 21

Generative matrix (25x25) for extraction of 5x5 kernel from 5x5 PSF

METHODS AND SYSTEMS TO CORRECT CROSSTALK IN ILLUMINATION EMITTED FROM REACTION SITES

This application claims the benefit of and priority to U.S. Provisional Patent Application Ser. No. 63/216,125, filed Jun. 29, 2021, entitled "Methods and Systems to Correct Crosstalk in Illumination Emitted from Reaction Sites," the disclosure of which is incorporated by reference herein.

BACKGROUND

Aspects of the present disclosure relate generally to biological or chemical analysis and more particularly to systems and methods using light sensors for biological or chemical analysis.

Various protocols in biological or chemical research involve performing a large number of controlled reactions on local support surfaces or within predefined reaction chambers. The designated reactions may then be observed or detected and subsequent analysis may help identify or reveal properties of chemicals involved in the reaction. For example, in some multiplex assays, an unknown analyte having an identifiable label (e.g., fluorescent label) may be exposed to thousands of known probes under controlled conditions. Each known probe may be deposited into a corresponding well of a microplate. Observing any chemical reactions that occur between the known probes and the unknown analyte within the wells may help identify or reveal properties of the analyte. Other examples of such protocols include known DNA sequencing processes, such as sequencing-by-synthesis (SBS) or cyclic-array sequencing.

In some conventional fluorescent-detection protocols, an optical system is used to direct an excitation light onto fluorescently-labeled analytes and to also detect the fluorescent signals that may emit from the analytes. However, such optical systems can be relatively expensive and require a larger benchtop footprint. For example, the optical system may include an arrangement of lenses, filters, and light sources. In other proposed detection systems, the controlled reactions occur immediately over a solid-state imager (e.g., charged-coupled device (CCD) or a complementary metal-oxide-semiconductor (CMOS) detector) that does not require a large optical assembly to detect the fluorescent emissions. However, such systems may have some limitations. For example, as the density of the analytes increases, it becomes increasingly challenging to manage or account for unwanted light emissions from adjacent analytes (e.g., crosstalk).

SUMMARY OF THE INVENTION

Described herein are devices, systems, and methods for compensating for crosstalk which may be encountered in systems which perform optical analysis, such as bioassay systems.

An implementation relates to a method comprising: capturing, at each of a set of light sensors, a captured illumination value representing photons detected by that light sensor, wherein: the set of light sensors is disposed in a two dimensional pattern in which each light sensor from the set of light sensors is adjacent to at least two other light sensors from the set of light sensors; and each light sensor from the set of light sensors has a corresponding reaction site from a set of reaction sites; determining a generative function, wherein: the generative function is determined based on one or more point spread functions (PSFs), each modeling how illumination emitted by a reaction site is detected by both a corresponding light sensor for that reaction site as well as surrounding light sensors; and the generative function provides a mapping of illumination emitted from the set of reaction sites to photons detected by the set of light sensors; determining a set of sharpening kernels based on the generative function; and obtaining a set of crosstalk corrected illumination values based on, for each light sensor from the set of light sensors, applying a corresponding sharpening kernel from the set of sharpening kernels to a set of captured illumination values comprising: the captured illumination value representing photons detected by that light sensor; and captured illumination values representing photons detected by a plurality of light sensors, wherein the plurality of light sensors comprises each light sensor which is adjacent to that light sensor.

In some implementations such as described in the second paragraph of this summary, each sharpening kernel from the set of sharpening kernels is a square matrix having a first side length; the generative function comprises a set of generative matrices, each of which is a square matrix having a second side length; each of the one or more point spread functions is a square matrix having a third side length; each generative matrix from the set of generative matrices has a corresponding point spread function; the second side length is equal to the square of the first side length; and the first side length and the third side length are both odd.

In some implementations such as described in the third paragraph of this summary, the third side length is different from the first side length.

In some implementations such as described in the third or fourth paragraphs of this summary, determining the generative function comprises, for each generative matrix, defining elements of that generative matrix to have values corresponding to a plurality of square submatrices which form a tiling of that generative matrix, wherein: each of the plurality of square submatrices has a side length equal to the first side length; the plurality of square submatrices comprises a submatrix corresponding to each row of that generative matrix's corresponding PSF, in which: that submatrix has a top row comprising: a leftmost set of elements having element values are equal to those of that generative matrix's corresponding PSF's corresponding row's middle element and that element's leftward neighbors, wherein the leftmost set of elements' cardinality is equal to a first number, and wherein the first number is equal to the third side length divided by two and rounded up; a rightmost set of elements having element values equal to zero, wherein the rightmost set of elements' cardinality is equal to the first side length less the first number of elements; that submatrix has a left column comprising: a topmost set of elements having element values equal to those of that generative matrix's corresponding PSF's corresponding row's middle element and that element's rightward neighbors, wherein the topmost set of elements' cardinality is equal to the first number; a bottommost set of elements having element values equal to zero, wherein the bottommost set of elements' cardinality is equal to the first side length less the first number of elements; and that submatrix comprises a set of diagonal elements, each of which has an element value equal to that of its upper left neighbor, wherein the cardinality of the union of the top row, the left column, and the set of diagonal elements is equal to the square of the first side length; the plurality of square submatrices comprises a top row of submatrices, a left column of submatrices, and a diagonal set of submatrices, in which: the top row of submatrices comprises: a leftmost set of submatrices, starting with the submatrix corresponding to that generative matrix's corresponding PSF's middle row and continuing rightward with the submatrices corresponding to all rows below the middle row in that generative matrix's corresponding PSF; and a rightmost set of submatrices, the rightmost set of submatrices having a cardinality equal to the first side length less the first number, wherein each submatrix in the rightmost set of submatrices consists of zero valued elements; the left column of submatrices comprises: a topmost set of submatrices, starting with the submatrix corresponding to that generative matrix's corresponding PSF's middle row and continuing downward with the submatrices corresponding to all rows above the middle row in that generative matrix's corresponding PSF; and a bottommost set of submatrices, the bottommost set of submatrices having a cardinality equal to the first side length less the first number, wherein each submatrix in the bottommost set of submatrices consists of zero valued elements; the diagonal set of submatrices comprises all of the plurality of square submatrices which are not comprised by the top row of submatrices or the left column of submatrices; and each submatrix in the diagonal set of submatrices is the same as its upper left neighbor.

In some implementations such as described in any of the third through fifth paragraphs of this summary, determining the generative function comprises, for each generative matrix: for each row in that generative matrix, defining that row by: obtaining a transformed PSF by reflecting that generative matrix's corresponding PSF over its vertical and horizontal axes; creating an intermediate matrix by center placing the transformed PSF on a corresponding element in a square matrix consisting of zero valued elements and having a cardinality equal to the square of the first side length; and row flattening that intermediate matrix to define that row.

In some implementations such as described in any of the third through sixth paragraphs of this summary, determining the set of sharpening kernels based on the generative function comprises, for each generative matrix from the set of generative matrices: determining an intermediate matrix which is an inverse of that generative matrix; and convert a middle row of the intermediate matrix into a corresponding sharpening kernel in which: the corresponding sharpening kernel's topmost row is the same as a leftmost set of elements in the middle row of the intermediate matrix having a cardinality equal to the first side length; and each row below the topmost row in the corresponding sharpening kernel starts with the leftmost element from the middle row of the intermediate matrix which does not appear in any higher row of the corresponding sharpening kernel, and continues with so many of that element's rightward neighbors as are necessary to complete that row.

In some implementations such as described in any of the second through sixth paragraphs of this summary, the set of light sensors is organized as an array having a plurality of odd columns, a plurality of odd rows, a plurality of even columns and a plurality of even rows; the one or more PSFs comprises: an odd-odd PSF, modeling how illumination from reaction sites corresponding to light sensors in odd rows and columns is detected by both those reaction sites' corresponding light sensors and surrounding light sensors; an odd-even PSF, modeling how illumination from reaction sites corresponding to light sensors in odd rows and even columns is detected by both those reaction sites' corresponding light sensors and surrounding light sensors; an even-odd PSF, modeling how illumination from reaction sites corresponding to light sensors in even rows and odd columns is detected by both those reaction sites' corresponding light sensors and surrounding light sensors; and an even-even PSF, modeling how illumination from reaction sites corresponding to light sensors in even rows and odd columns is detected by both those reaction sites' corresponding light sensors and surrounding light sensors; the generative function comprises: an even-even generative matrix; an even-odd generative matrix; an odd-odd generative matrix; an odd-even generative matrix; the even-even generative matrix corresponds to a first intermediate PSF consisting of: a first subset of elements of the odd-odd PSF; a first subset of elements of the even-even PSF; a first subset of elements of the odd-even PSF; and a first subset of elements of the even-odd PSF; the even-odd generative matrix corresponds to a second intermediate PSF consisting of: a second subset of elements of the odd-odd PSF; a second subset of elements of the even-even PSF; a second subset of elements of the odd-even PSF; and a second subset of elements of the even-odd PSF; the odd-odd generative matrix corresponds to a third intermediate PSF consisting of: a third subset of elements of the odd-odd PSF; a third subset of elements of the even-even PSF; a third subset of elements of the odd-even PSF; and a third subset of elements of the even-odd PSF; the odd-even generative matrix corresponds to a fourth intermediate PSF consisting of: a fourth subset of elements of the odd-odd PSF; a fourth subset of elements of the even-even PSF; a fourth subset of elements of the odd-even PSF; and a fourth subset of elements of the even-odd PSF; and for each of the odd-odd, even-even, odd-even, and even-odd PSFs, that PSF's first, second, third and fourth subsets of elements are disjoint.

In some implementations such as described in the preceding paragraph of this summary, determining the set of sharpening kernels based on the generative function comprises: generating a first intermediate generative matrix consisting of: a first subset of elements of the odd-odd generative matrix; a first subset of elements of the even-even generative matrix; a first subset of elements of the odd-even generative matrix; and a first subset of elements of the even-odd generative matrix; generating a second intermediate generative matrix consisting of: a second subset of elements of the odd-odd generative matrix; a second subset of elements of the even-even generative matrix; a second subset of elements of the odd-even generative matrix; and a second subset of elements of the even-odd generative matrix; generating a third intermediate generative matrix consisting of: a third subset of elements of the odd-odd generative matrix; a third subset of elements of the even-even generative matrix; a third subset of elements of the odd-even generative matrix; and a third subset of elements of the even-odd generative matrix; generating a fourth intermediate generative matrix consisting of: a fourth subset of elements of the odd-odd generative matrix; a fourth subset of elements of the even-even generative matrix; a fourth subset of elements of the odd-even generative matrix; and a fourth subset of elements of the even-odd generative matrix; for each of the first, second, third and fourth intermediate generative matrices: determining an additional intermediate matrix which is an inverse of that generative matrix; convert a middle row of the additional intermediate matrix into a corresponding sharpening kernel in which: the corresponding sharpening kernel's topmost row is the same as a leftmost set of elements in the middle row of the additional intermediate matrix having a cardinality equal to the first side length; and each row below the topmost row in the corresponding sharpening kernel starts with the leftmost element from the middle row of the additional intermediate matrix which does not appear in any higher row of the corresponding sharpening kernel, and continues with so many of that element's rightward neighbors as are necessary to complete that row; for each of the odd-odd, even-even, odd-even, and even-odd generative matrices, that generative matrix's first, second, third and fourth subsets of elements are disjoint; obtaining the set of crosstalk corrected illumination values comprises, for each light sensor from the plurality of light sensors: obtaining a first intermediate sharpened matrix by applying a corresponding sharpening kernel converted from the middle row in the first intermediate generative matrix to the set of captured illumination values; obtaining a second intermediate sharpened matrix by applying a corresponding sharpening kernel converted from the middle row in the second intermediate generative matrix to the set of captured illumination values; obtaining a third intermediate sharpened matrix by applying a corresponding sharpening kernel converted from the middle row in the third intermediate generative matrix to the set of captured illumination values; obtaining a fourth intermediate sharpened matrix by applying a corresponding sharpening kernel converted from the middle row in the fourth intermediate generative matrix to the set of captured illumination values; obtaining the set of crosstalk corrected illumination values by combining: a first subset of elements of the first intermediate sharpened matrix; a second subset of elements of the second intermediate sharpened matrix; a third subset of elements of the third intermediate sharpened matrix; and a fourth subset of elements of the fourth intermediate sharpened matrix.

In some implementations such as described in any of the second through ninth paragraphs of this summary, each reaction site from the set of reaction sites corresponds to only one light sensor from the set of light sensors the set of reaction sites are wells disposed in the surface of a flowcell; and the set of crosstalk corrected illumination values is used in sequencing nucleotides disposed within the reaction sites.

In some implementations such as described in any of the second through tenth paragraphs of this summary, the generative function and set of sharpening kernels are determined prior to capturing, at each of the set of light sensors, the captured illumination value representing photons detected by that light sensor.

An implementation relates to a system comprising a processor and a non-transitory computer readable medium storing instructions to, when executed by the processor: determine a generative function, wherein: the generative function is determined based on one or more point spread functions (PSFs), each modeling how illumination emitted by a reaction site from a set of reaction sites is detected by both a corresponding light sensor for that reaction site as well as surrounding light sensors comprised by a set of light sensors; and the generative function provides a mapping of illumination emitted from the set of reaction sites to photons detected by the set of light sensors; determining a set of sharpening kernels based on the generative function, wherein each sharpening kernel from the set of sharpening kernels corresponds to a light sensor from the set of light sensors.

In some implementations such as described in the twelfth paragraph of this summary, each sharpening kernel from the set of sharpening kernels is a square matrix having a first side length; the generative function comprises a set of generative matrices, each of which is a square matrix having a second side length; each of the one or more point spread functions is a square matrix having a third side length; each generative matrix from the set of generative matrices has a corresponding point spread function; the second side length is equal to the square of the first side length; and the first side length and the third side length are both odd.

In some implementations such as described in the thirteenth paragraph of this summary, the third side length is different from the first side length.

In some implementations such as described in any of the twelfth through fourteenth paragraphs of this summary, determining the generative function comprises, for each generative matrix, defining elements of that generative matrix to have values corresponding to a plurality of square submatrices which form a tiling of that generative matrix, wherein: each of the plurality of square submatrices has a side length equal to the first side length; the plurality of square submatrices comprises a submatrix corresponding to each row of that generative matrix's corresponding PSF, in which: that submatrix has a top row comprising: a leftmost set of elements having element values are equal to those of that generative matrix's corresponding PSF's corresponding row's middle element and that element's leftward neighbors, wherein the leftmost set of elements' cardinality is equal to a first number, and wherein the first number is equal to the third side length divided by two and rounded up; a rightmost set of elements having element values equal to zero, wherein the rightmost set of elements' cardinality is equal to the first side length less the first number of elements; that submatrix has a left column comprising: a topmost set of elements having element values equal to those of that generative matrix's corresponding PSF's corresponding row's middle element that element's rightward neighbors, wherein the topmost set of elements' cardinality is equal to the first number; a bottommost set of elements having element values equal to zero, wherein the bottommost set of elements' cardinality is equal to the first side length less the first number of elements; and that submatrix comprises a set of diagonal elements, each of which has an element value equal to that of its upper left neighbor, wherein the cardinality of the union of the top row, the left column, and the set of diagonal elements is equal to the square of the first side length; the plurality of square submatrices comprises a top row of submatrices, a left column of submatrices, and a diagonal set of submatrices, in which: the top row of submatrices comprises: a leftmost set of submatrices, starting with the submatrix corresponding to that generative matrix's corresponding PSF's middle row and continuing rightward with the submatrices corresponding to all rows below the middle row in that generative matrix's corresponding PSF; and a rightmost set of submatrices, the rightmost set of submatrices having a cardinality equal to the first side length less the first number, wherein each submatrix in the rightmost set of submatrices consists of zero valued elements; the left column of submatrices comprises: a topmost set of submatrices, starting with the submatrix corresponding to that generative matrix's corresponding PSF's middle row and continuing downward with the submatrices corresponding to all rows above the middle row in that generative matrix's corresponding PSF; and a bottommost set of submatrices, the bottommost set of submatrices having a cardinality equal to the first side length less the first number, wherein each submatrix in the bottommost set of submatrices consists of zero valued elements; the diagonal set of submatrices comprises all of the plurality of square submatrices which are not comprised by the top row of submatrices or the left column of submatrices; and each submatrix in the diagonal set of submatrices is the same as its upper left neighbor.

In some implementations such as described in any of the twelfth through fifteenth paragraphs of this summary, determining the generative function comprises, for each generative matrix: for each row in that generative matrix, defining that row by: obtaining a transformed PSF by reflecting that generative matrix's corresponding PSF over its vertical and horizontal axes; creating an intermediate matrix by center placing the transformed PSF on a corresponding element in a square matrix consisting of zero valued elements and having a cardinality equal to the square of the first side length; and row flattening that intermediate matrix to define that row.

In some implementations such as described in any of the thirteenth through sixteenth paragraphs of this summary, determining the set of sharpening kernels based on the generative function comprises, for each generative matrix from the set of generative matrices: determining an intermediate matrix which is an inverse of that generative matrix; and convert a middle row of the intermediate matrix into a corresponding sharpening kernel in which: the corresponding sharpening kernel's topmost row is the same as a leftmost set of elements in the middle row of the intermediate matrix having a cardinality equal to the first side length; and each row below the topmost row in the corresponding sharpening kernel starts with the leftmost element from the middle row of the intermediate matrix which does not appear in any higher row of the corresponding sharpening kernel, and continues with so many of that element's rightward neighbors as are necessary to complete that row.

In some implementations such as described in any of the twelfth through sixteenth paragraphs of this summary, the set of light sensors is organized as an array having a plurality of odd columns, a plurality of odd rows, a plurality of even columns and a plurality of even rows; the one or more PSFs comprises: an odd-odd PSF, modeling how illumination from reaction sites corresponding to light sensors in odd rows and columns is detected by both those reaction sites' corresponding light sensors and surrounding light sensors; an odd-even PSF, modeling how illumination from reaction sites corresponding to light sensors in odd rows and even columns is detected by both those reaction sites' corresponding light sensors and surrounding light sensors; an even-odd PSF, modeling how illumination from reaction sites corresponding to light sensors in even rows and odd columns is detected by both those reaction sites' corresponding light sensors and surrounding light sensors; and an even-even PSF, modeling how illumination from reaction sites corresponding to light sensors in even rows and odd columns is detected by both those reaction sites' corresponding light sensors and surrounding light sensors the generative function comprises: an even-even generative matrix; an even-odd generative matrix; an odd-odd generative matrix; an odd-even generative matrix; the even-even generative matrix corresponds to a first intermediate PSF consisting of: a first subset of elements of the odd-odd PSF; a first subset of elements of the even-even PSF; a first subset of elements of the odd-even PSF; and a first subset of elements of the even-odd PSF; the even-odd generative matrix corresponds to a second intermediate PSF consisting of: a second subset of elements of the odd-odd PSF; a second subset of elements of the even-even PSF; a second subset of elements of the odd-even PSF; and a second subset of elements of the even-odd PSF; the odd-odd generative matrix corresponds to a third intermediate PSF consisting of: a third subset of elements of the odd-odd PSF; a third subset of elements of the even-even PSF; a third subset of elements of the odd-even PSF; and a third subset of elements of the even-odd PSF; the odd-even generative matrix corresponds to a fourth intermediate PSF consisting of: a fourth subset of elements of the odd-odd PSF; a fourth subset of elements of the even-even PSF; a fourth subset of elements of the odd-even PSF; and a fourth subset of elements of the even-odd PSF; for each of the odd-odd, even-even, odd-even, and even-odd PSFs, that PSF's first, second, third and fourth subsets of elements are disjoint; determining the set of sharpening kernels based on the generative function comprises: generating a first intermediate generative matrix consisting of: a first subset of elements of the odd-odd generative matrix; a first subset of elements of the even-even generative matrix; a first subset of elements of the odd-even generative matrix; and a first subset of elements of the even-odd generative matrix; generating a second intermediate generative matrix consisting of: a second subset of elements of the odd-odd generative matrix; a second subset of elements of the even-even generative matrix; a second subset of elements of the odd-even generative matrix; and a second subset of elements of the even-odd generative matrix; generating a third intermediate generative matrix consisting of: a third subset of elements of the odd-odd generative matrix; a third subset of elements of the even-even generative matrix; a third subset of elements of the odd-even generative matrix; and a third subset of elements of the even-odd generative matrix; generating a fourth intermediate generative matrix consisting of: a fourth subset of elements of the odd-odd generative matrix; a fourth subset of elements of the even-even generative matrix; a fourth subset of elements of the odd-even generative matrix; and a fourth subset of elements of the even-odd generative matrix; for each of the first, second, third and fourth intermediate generative matrices: determining an additional intermediate matrix which is an inverse of that generative matrix; convert a middle row of the additional intermediate matrix into a corresponding sharpening kernel in which: the corresponding sharpening kernel's topmost row is the same as a leftmost set of elements in the middle row of the additional intermediate matrix having a cardinality equal to the first side length; and each row below the topmost row in the corresponding sharpening kernel starts with the leftmost element from the middle row of the additional intermediate matrix which does not appear in any higher row of the corresponding sharpening kernel, and continues with so many of that element's rightward neighbors as are necessary to complete that row; and for each of the odd-odd, even-even, odd-even, and even-odd generative matrices, that generative matrix's first, second, third and fourth subsets of elements are disjoint.

An implementation relates to a system comprising a processor and a non-transitory computer readable medium storing a set of sharpening kernels and instructions to, when executed by the processor: capturing, at each of a set of light sensors, a captured illumination value representing photons detected by that light sensor, wherein: the set of light sensors is disposed in a two dimensional pattern in which each light sensor from the set of light sensors is adjacent to at least two other light sensors from the set of light sensors; and each light sensor from the set of light sensors has a corresponding reaction site from a set of reaction sites; and obtaining a set of crosstalk corrected illumination values based on, for each light sensor from the set of light sensors, applying a corresponding sharpening kernel from the set of sharpening kernels to a set of captured illumination values comprising: the captured illumination value representing photons detected by that light sensor; and captured illumination values representing photons detected by a plurality of light sensors, wherein the plurality of light sensors comprises each light sensor which is adjacent to that light sensor.

In some implementations such as described in the preceding paragraph, obtaining the set of crosstalk corrected illumination values comprises, for each light sensor from the plurality of light sensors: obtaining a first intermediate sharpened matrix by applying a first corresponding sharpening kernel to the set of captured illumination values; obtaining a second intermediate sharpened matrix by applying a second corresponding sharpening kernel to the set of captured illumination values; obtaining a third intermediate sharpened matrix by applying a third corresponding sharpening kernel to the set of captured illumination values; obtaining a fourth intermediate sharpened matrix by applying a fourth corresponding sharpening kernel to the set of captured illumination values; obtaining the set of crosstalk corrected illumination values by combining: a first subset of elements of the first intermediate sharpened matrix; a second subset of elements of the second intermediate sharpened matrix; a third subset of elements of the third intermediate sharpened matrix; and a fourth subset of elements of the fourth intermediate sharpened matrix.

In some implementations such as described in either of the preceding two paragraphs, the set of reaction sites are wells disposed in the surface of a flowcell; and the non-transitory computer readable medium stores instructions to use the set of crosstalk corrected illumination values in sequencing nucleotides disposed within the reaction sites.

While multiple examples are described, still other examples of the described subject matter will become apparent to those skilled in the art from the following detailed description and drawings, which show and describe illustrative examples of disclosed subject matter. As will be realized, the disclosed subject matter is capable of modifications in various aspects, all without departing from the spirit and scope of the described subject matter. Accordingly, the drawings and detailed description are to be regarded as illustrative in nature and not restrictive.

BRIEF DESCRIPTION OF THE DRAWINGS

FIGS. 10A and 10B illustrate matrix recentering.

FIG. 17 illustrates exemplary point spread functions for an array of sensors exhibiting even-odd periodicity.

FIG. 21 illustrates a relationship between a 3×3 PSF and a 9×9 generative matrix.

FIG. 22 illustrates a relationship between a 5×5 PSF and a 25×25 generative matrix.

FIG. 23 illustrates relationships between 3×3 PSFs and 9×9 generative matrices in a system exhibiting even-odd periodicity.

DETAILED DESCRIPTION

Examples described herein may be used in various biological or chemical processes and systems for academic or commercial analysis. More specifically, examples described herein may be used in various processes and systems where it is desired to detect an event, property, quality, or characteristic that is indicative of a designated reaction. For instance, examples described herein include cartridges, biosensors, and their components as well as bioassay systems that operate with cartridges and biosensors. In particular examples, the cartridges and biosensors include a flow cell and one or more light sensors that are coupled together in a substantially unitary structure.

The bioassay systems may be configured to perform a plurality of designated reactions that may be detected individually or collectively. The biosensors and bioassay systems may be configured to perform numerous cycles in which the plurality of designated reactions occurs in parallel. For example, the bioassay systems may be used to sequence a dense array of DNA features through iterative cycles of enzymatic manipulation and image acquisition. As such, the cartridges and biosensors may include one or more microfluidic channels that deliver reagents or other reaction components to a reaction site. In some examples, the reaction sites are randomly distributed across a substantially planer surface. For example, the reaction sites may have an uneven distribution in which some reaction sites are located closer to each other than other reaction sites. In other examples, the reaction sites are patterned across a substantially planer surface in a predetermined manner. Each of the reaction sites may be associated with one or more light sensors that detect light from the associated reaction site. Yet in other examples, the reaction sites are located in reaction chambers that compartmentalize the designated reactions therein.

Figure 20:
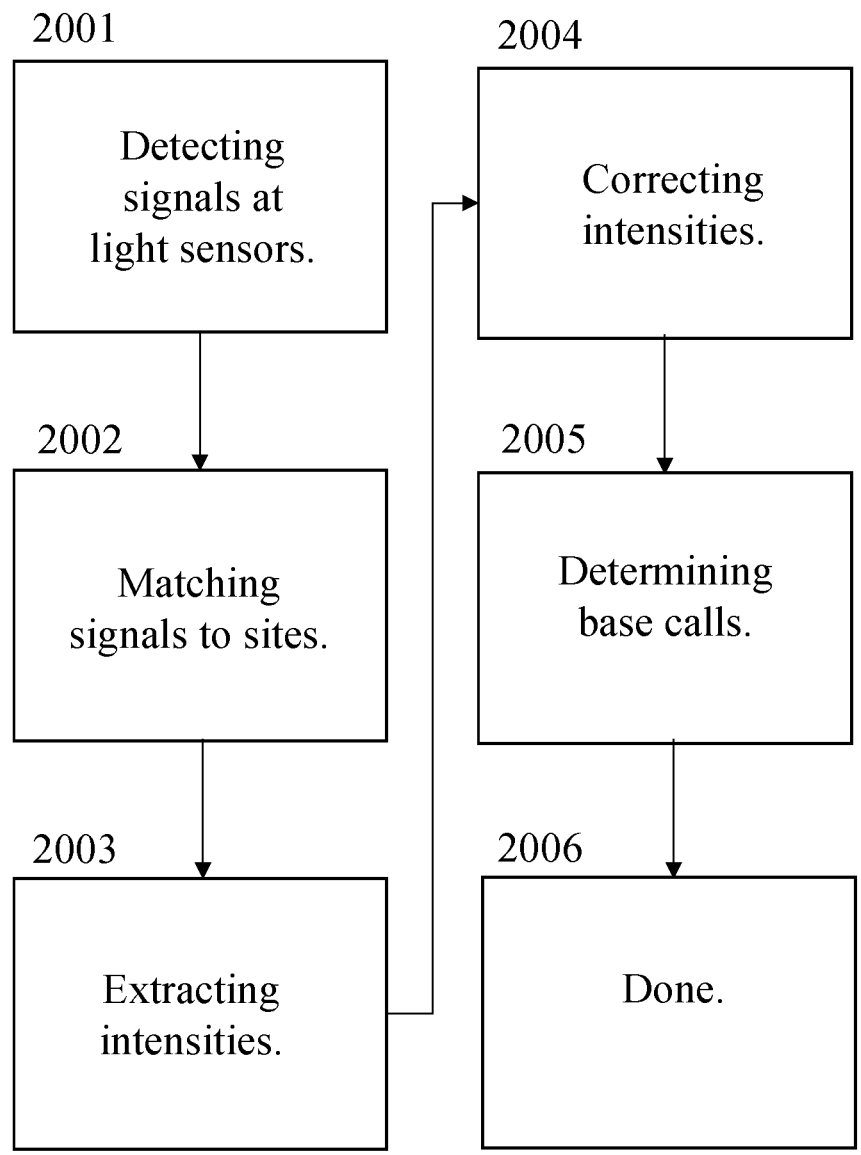
FIG. 20 illustrates a primary analysis process in which sharpening kernels may be applied to address crosstalk.

In some examples, light sensors may detect light emitted from reaction sites and the signals indicating photons emitted from the reaction sites and detected by the individual light sensors may be referred to as those sensors' illumination values. These illumination values may be combined into an image indicating photons as detected from the reaction sites which is referred to as a raw image. Similarly, when an image is composed of values which have been processed, such as to computationally correct for crosstalk, rather than being composed of the values directly detected by individual image sensors, that image may be referred to as a sharpened image. As described in more detail herein, such a sharpened image may be used for a variety of purposes, such as base calling in a primary analysis process as described in FIG. 20.

The following detailed description of certain examples will be better understood when read in conjunction with the appended drawings. To the extent that the figures illustrate diagrams of the functional blocks of various examples, the functional Hocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various examples are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one example" are not intended to be interpreted as excluding the existence of additional examples that also incorporate the recited features. Moreover, unless explicitly stated to the contrary, examples "comprising" or "having" an element or a plurality of elements having a particular property may include additional elements whether or not they have that property.

As used herein, a "designated reaction" includes a change in at least one of a chemical, electrical, physical, or optical property (or quality) of an analyte-of-interest. In particular examples, the designated reaction is a positive binding event (e.g., incorporation of a fluorescently labeled biomolecule with the analyte-of-interest). More generally, the designated reaction may be a chemical transformation, chemical change, or chemical interaction. In particular examples, the designated reaction includes the incorporation of a fluorescently-labeled molecule to an analyte. The analyte may be an oligonucleotide and the fluorescently-labeled molecule may be a nucleotide. The designated reaction may be detected when an excitation light is directed toward the oligonucleotide having the labeled nucleotide, and the fluorophore emits a detectable fluorescent signal. In alternative examples, the detected fluorescence is a result of chemiluminescence or bioluminescence. A designated reaction may also increase fluorescence (or Föster) resonance energy transfer (FRET), for example, by bringing a donor fluorophore in proximity to an acceptor fluorophore, decrease FRET by separating donor and acceptor fluorophores, increase fluorescence by separating a quencher from a fluorophore or decrease fluorescence by co-locating a quencher and fluorophore.

As used herein, a "reaction component" or "reactant "includes any substance that may be used to obtain a designated reaction. For example, reaction components include reagents, enzymes, samples, other biomolecules, and buffer solutions. The reaction components are typically delivered to a reaction site in a solution and/or immobilized at a reaction site. The reaction components may interact directly or indirectly with another substance, such as the analyte-of-interest.

As used herein, the term "reaction site" is a localized region where a designated reaction may occur. A reaction site may include support surfaces of a substrate where a substance may be immobilized thereon. For example, a reaction site may include a substantially planar surface in a channel of a flow cell that has a colony of nucleic acids thereon. Typically, but not always, the nucleic acids in the colony have the same sequence, being for example, clonal copies of a single stranded or double stranded template. However, in some examples a reaction site may contain only a single nucleic acid molecule, for example, in a single stranded or double stranded form. Furthermore, a plurality of reaction sites may be randomly distributed along the support surface or arranged in a predetermined manner (e.g., side-by-side in a matrix, such as in microarrays). A reaction site can also include a reaction chamber that at least partially defines a spatial region or volume configured to compartmentalize the designated reaction. As used herein, the term "reaction chamber" includes a spatial region that is in fluid communication with a flow channel. The reaction chamber may be at least partially separated from the surrounding environment or other spatial regions. For example, a plurality of reaction chambers may be separated from each other by shared walls. As a more specific example, the reaction chamber may include a cavity defined by interior surfaces of a well and have an opening or aperture so that the cavity may be in fluid communication with a flow channel. Biosensors including such reaction chambers are described in greater detail in international application no. PCT/US2011/057111 filed on Oct. 20, 2011, which is incorporated herein by reference in its entirety.

In some examples, the reaction chambers are sized and shaped relative to solids (including semi-solids) so that the solids may be inserted, fully or partially, therein. For example, the reaction chamber may be sized and shaped to accommodate only one capture bead. The capture bead may have clonally amplified DNA or other substances thereon. Alternatively, the reaction chamber may be sized and shaped to receive an approximate number of beads or solid substrates. As another example, the reaction chambers may also be filled with a porous gel or substance that is configured to control diffusion or filter fluids that may flow into the reaction chamber.

In some examples, light sensors (e.g., photodiodes) are associated with corresponding reaction sites. A light sensor that is associated with a reaction site is configured to detect light emissions from the associated reaction site when a designated reaction has occurred at the associated reaction site. In some cases, a plurality of light sensors (e.g., several pixels of a camera device) may be associated with a single reaction site. In other cases, a single light sensor (e.g., a single pixel) may be associated with a single reaction site or with a group of reaction sites. The light sensor, the reaction site, and other features of the biosensor may be configured so that at least some of the light is directly detected by the light sensor without being reflected.

As used herein, the term "adjacent" when used with respect to two reaction sites means no other reaction site is located between the two reaction sites. The term "adjacent" may have a similar meaning when used with respect to adjacent detection paths and adjacent light sensors (e.g., adjacent light sensors have no other light sensor therebetween). In some cases, a reaction site may not be adjacent to another reaction site, but may still be within an immediate vicinity of the other reaction site. A first reaction site may be in the immediate vicinity of a second reaction site when fluorescent emission signals from the first reaction site are detected by the light sensor associated with the second reaction site. More specifically, a first reaction site may be in the immediate vicinity of a second reaction site when the light sensor associated with the second reaction site detects, for example, crosstalk from the first reaction site. Adjacent reaction sites can be contiguous such that they abut each other or the adjacent sites can be non-contiguous having an intervening space between.

As used herein, a "substance" includes items or solids, such as capture beads, as well as biological or chemical substances. As used herein, a "biological or chemical substance" includes biomolecules, samples-of-interest, analytes-of-interest, and other chemical compound(s). A biological or chemical substance may be used to detect, identify, or analyze other chemical compound(s), or function as intermediaries to study or analyze other chemical compound(s). In particular examples, the biological or chemical substances include a biomolecule. As used herein, a "biomolecule" includes at least one of a biopolymer, nucleoside, nucleic acid, polynucleotide, oligonucleotide, protein, enzyme, polypeptide, antibody, antigen, ligand, receptor, polysaccharide, carbohydrate, polyphosphate, cell, tissue, organism, or fragment thereof or any other biologically active chemical compound(s) such as analogs or mimetics of the aforementioned species.

In a further example, a biological or chemical substance or a biomolecule includes an enzyme or reagent used in a coupled reaction to detect the product of another reaction such as an enzyme or reagent used to detect pyrophosphate in a pyrosequencing reaction. Enzymes and reagents useful for pyrophosphate detection are described, for example, in U.S. Patent Publication No. 2005/0244870 A1, which is incorporated herein in its entirety.

Biomolecules, samples, and biological or chemical substances may be naturally occurring or synthetic and may be suspended in a solution or mixture within a spatial region. Biomolecules, samples, and biological or chemical substances may also be bound to a solid phase or gel material. Biomolecules, samples, and biological or chemical substances may also include a pharmaceutical composition. In some cases, biomolecules, samples, and biological or chemical substances of interest may be referred to as targets, probes, or analytes.

As used herein, a "biosensor" includes a structure having a plurality of reaction sites that is configured to detect designated reactions that occur at or proximate to the reaction sites. A biosensor may include a solid-state imaging device (e.g., CCD or CMOS imager) and, optionally, a flow cell mounted thereto. The flow cell may include at least one flow channel that is in fluid communication with the reaction sites. As one specific example, the biosensor is configured to fluidicly and electrically couple to a bioassay system. The bioassay system may deliver reactants to the reaction sites according to a predetermined protocol (e.g., sequencing-by-synthesis) and perform a plurality of imaging events. For example, the bioassay system may direct solutions to flow along the reaction sites. At least one of the solutions may include four types of nucleotides having the same or different fluorescent labels. The nucleotides may bind to corresponding oligonucleotides located at the reaction sites. The bioassay system may then illuminate the reaction sites using an excitation light source (e.g., solid-state light sources, such as light-emitting diodes or LEDs). The excitation light may have a predetermined wavelength or wavelengths, including a range of wavelengths. The excited fluorescent labels provide emission signals that may be detected by the light sensors.

As used herein, a "cartridge" includes a structure that is configured to hold a biosensor. In some examples, the cartridge may include additional features, such as the light source (e.g., LEDs) that are configured to provide excitation light to the reaction sites of the biosensor. The cartridge may also include a fluidic storage system (e.g., storage for reagents, sample, and buffer) and a fluidic control system (e.g., pumps, valves, and the like) for fluidically transporting reaction components, sample, and the like to the reaction sites. For example, after the biosensor is prepared or manufactured, the biosensor may be coupled to a housing or container of the cartridge. In some examples, the biosensors and the cartridges may be self-contained, disposable units. However, other examples may include an assembly with removable parts that allow a user to access an interior of the biosensor or cartridge for maintenance or replacement of components or samples. The biosensor and the cartridge may be removably coupled or engaged to larger bioassay systems, such as a sequencing system, that conducts controlled reactions therein.

As used herein, when the terms "removably" and "coupled" (or "engaged") are used together to describe a relationship between the biosensor (or cartridge) and a system receptacle or interface of a bioassay system, the term is intended to mean that a connection between the biosensor (or cartridge) and the system receptacle is readily separable without destroying or damaging the system receptacle and/ or the biosensor (or cartridge). Components are readily separable when the components may be separated from each other without undue effort or a significant amount of time spent in separating the components. For example, the biosensor (or cartridge) may be removably coupled or engaged to the system receptacle in an electrical manner such that the mating contacts of the bioassay system are not destroyed or damaged. The biosensor (or cartridge) may also be removably coupled or engaged to the system receptacle in a mechanical manner such that the features that hold the biosensor (or cartridge) are not destroyed or damaged. The biosensor (or cartridge) may also be removably coupled or engaged to the system receptacle in a fluidic manner such that the ports of the system receptacle are not destroyed or damaged. The system receptacle or a component is not considered to be destroyed or damaged if, for example, only a simple adjustment to the component (e.g., realignment) or a simple replacement (e.g., replacing a nozzle) is required.

As used herein, the term "fluid communication" or "fluidicly coupled" refers to two spatial regions being connected together such that a liquid or gas may flow between the two spatial regions. For example, a microfluidic channel may be in fluid communication with a reaction chamber such that a fluid may flow freely into the reaction chamber from the microfluidic channel. The terms "in fluid communication" or "fluidicly coupled" allow for two spatial regions being in fluid communication through one or more valves, restrictors, or other fluidic components to control or regulate a flow of fluid through a system.

As used herein, the term "immobilized," when used with respect to a biomolecule or biological or chemical substance, includes substantially attaching the biomolecule or biological or chemical substance at a molecular level to a surface. For example, a biomolecule or biological or chemical substance may be immobilized to a surface of the substrate material using adsorption techniques including non-covalent interactions (e.g., electrostatic forces, van der Waals, and dehydration of hydrophobic interfaces) and covalent binding techniques where functional groups or linkers facilitate attaching the biomolecules to the surface.

Immobilizing biomolecules or biological or chemical substances to a surface of a substrate material may be based upon the properties of the substrate surface, the liquid medium carrying the biomolecule or biological or chemical substance, and the properties of the biomolecules or biological or chemical substances themselves. In some cases, a substrate surface may be functionalized (e.g., chemically or physically modified) to facilitate immobilizing the biomolecules (or biological or chemical substances) to the substrate surface. The substrate surface may be first modified to have functional groups bound to the surface. The functional groups may then bind to biomolecules or biological or chemical substances to immobilize them thereon. A substance can be immobilized to a surface via a gel, for example, as described in US Patent Publ. No. US 2011/0059865 A1, which is incorporated herein by reference in its entirety.

As used herein, the phrase "generative matrix" should be understood as a label used to help identify matrices in the description of certain aspects of the disclosed technology. The modifier "generative" should not be understood as requiring a "generative matrix" to have any particular dimensions or values, and instead the properties of any matrix referred to as a "generative matrix" should be understood as being specified by the description of that matrix in the context of the example where it is described.

In some examples, nucleic acids can be attached to a surface and amplified using bridge amplification. Useful bridge amplification methods are described, for example, in U.S. Pat. No. 5,641,658; WO 07/010251, U.S. Pat. No. 6,090,592; U.S. Patent Publ. No. 2002/0055100 A1; U.S. Pat. No. 7,115,400; U.S. Patent Publ. No. 2004/0096853 A1; U.S. Patent Publ. No. 2004/0002090 A1; U.S. Patent Publ. No. 2007/0128624 A1; and U.S. Patent Publ. No. 2008/0009420 A1, each of which is incorporated herein in its entirety. Another useful method for amplifying nucleic acids on a surface is rolling circle amplification (RCA), for example, using methods set forth in further detail below. In some examples, the nucleic acids can be attached to a surface and amplified using one or more primer pairs. For example, one of the primers can be in solution and the other primer can be immobilized on the surface (e.g., 5'-attached). By way of example, a nucleic acid molecule can hybridize to one of the primers on the surface followed by extension of the immobilized primer to produce a first copy of the nucleic acid. The primer in solution then hybridizes to the first copy of the nucleic acid which can be extended using the first copy of the nucleic acid as a template. Optionally, after the first copy of the nucleic acid is produced, the original nucleic acid molecule can hybridize to a second immobilized primer on the surface and can be extended at the same time or after the primer in solution is extended. In any example, repeated rounds of extension (e.g., amplification) using the immobilized primer and primer in solution provide multiple copies of the nucleic acid.

In particular examples, the assay protocols executed by the systems and methods described herein include the use of natural nucleotides and also enzymes that are configured to interact with the natural nucleotides. Natural nucleotides include, for example, ribonucleotides or deoxyribonucleotides. Natural nucleotides can be in the mono-, di-, or tri-phosphate form and can have a base selected from adenine (A), Thymine (T), uracil (U), guanine (G) or cytosine (C). It will be understood however that non-natural nucleotides, modified nucleotides or analogs of the aforementioned nucleotides can be used. Some examples of useful non-natural nucleotides are set forth below in regard to reversible terminator-based sequencing by synthesis methods.

In examples that include reaction chambers, items or solid substances (including semi-solid substances) may be disposed within the reaction chambers. When disposed, the item or solid may be physically held or immobilized within the reaction chamber through an interference fit, adhesion, or entrapment. Exemplary items or solids that may be disposed within the reaction chambers include polymer beads, pellets, agarose gel, powders, quantum dots, or other solids that may be compressed and/or held within the reaction chamber. In particular examples, a nucleic acid superstructure, such as a DNA ball, can be disposed in or at a reaction chamber, for example, by attachment to an interior surface of the reaction chamber or by residence in a liquid within the reaction chamber. A DNA ball or other nucleic acid superstructure can be preformed and then disposed in or at the reaction chamber. Alternatively, a DNA ball can be synthesized in situ at the reaction chamber. A DNA ball can be synthesized by rolling circle amplification to produce a concatemer of a particular nucleic acid sequence and the concatemer can be treated with conditions that form a relatively compact ball. DNA balls and methods for their synthesis are described, for example in, U.S. Patent Publ. Nos. 2008/0242560 A1 or 2008/0234136 A1 each of which is incorporated herein in its entirety. A substance that is held or disposed in a reaction chamber can be in a solid, liquid, or gaseous state.

Figure 1:
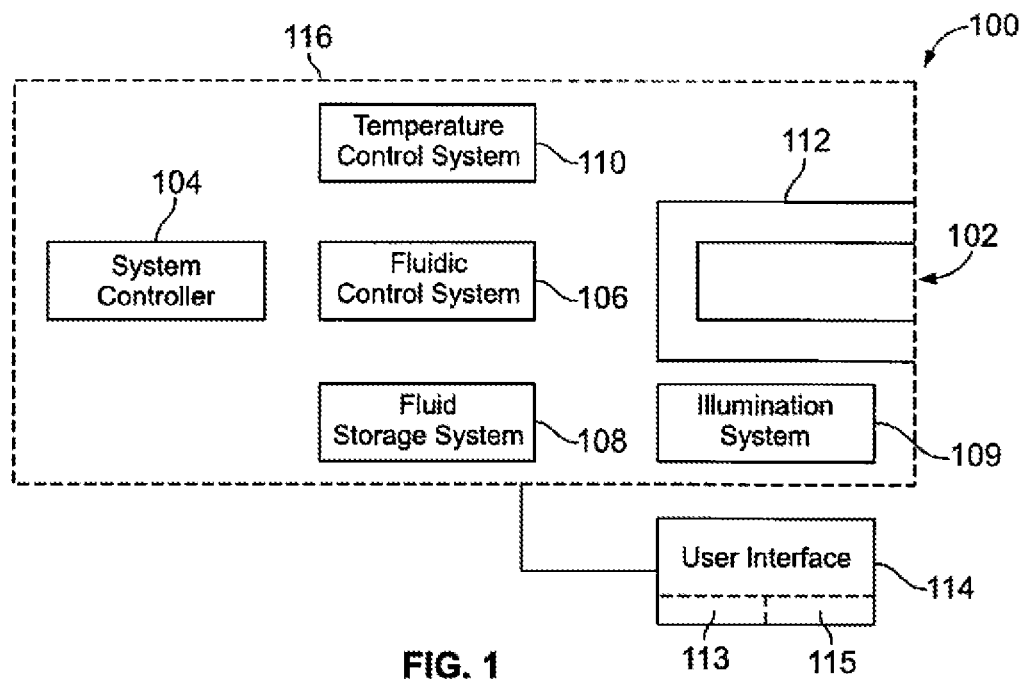
FIG. 1 is a block diagram of an exemplary system for biological or chemical analysis.

FIG. 1 is a block diagram of a bioassay system 100 for biological or chemical analysis formed in accordance with one example. The term "bioassay" is not intended to be limiting as the bioassay system 100 may operate to obtain any information or data that relates to at least one of a biological or chemical substance. In some examples, the bioassay system 100 is a workstation that may be similar to a bench-top device or desktop computer. For example, a majority (or all) of the systems and components for conducting the designated reactions may be within a common housing 116.

In particular examples, the bioassay system 100 is a nucleic acid sequencing system (or sequencer) configured for various applications, including but not limited to de novo sequencing, resequencing of whole genomes or target genomic regions, and metagenomics. The sequencer may also be used for DNA or RNA analysis. In some embodiments, the bioassay system 100 may also be configured to generate reaction sites in a biosensor. For example, the bioassay system 100 may be configured to receive a sample and generate surface attached clusters of clonally amplified nucleic acids derived from the sample. Each cluster may constitute or be part of a reaction site in the biosensor.

The exemplary bioassay system 100 may include a system receptacle or interface 112 that is configured to interact with a biosensor 102 to perform designated reactions within the biosensor 102. In the following description with respect to FIG. 1, the biosensor 102 is loaded into the system receptacle 112. However, it is understood that a cartridge that includes the biosensor 102 may be inserted into the system receptacle 112 and in some states the cartridge may be removed temporarily or permanently. As described above, the cartridge may include, among other things, fluidic control and fluidic storage components.

In particular examples, the bioassay system 100 is to perform a large number of parallel reactions within the biosensor 102. The biosensor 102 includes one or more reaction sites where designated reactions may occur. The reaction sites may be, for example, immobilized to a solid surface of the biosensor or immobilized to beads (or other movable substrates) that are located within corresponding reaction chambers of the biosensor. The reaction sites may include, for example, clusters of clonally amplified nucleic acids. The biosensor 102 may include a solid-state imaging device (e.g., CCD or CMOS imager) and a flow cell mounted thereto. The flow cell may include one or more flow channels that receive a solution from the bioassay system 100 and direct the solution toward the reaction sites. Optionally, the biosensor 102 may engage a thermal element for transferring thermal energy into or out of the flow channel.

The bioassay system 100 may include various components, assemblies, and systems (or sub-systems) that interact with each other to perform a predetermined method or assay, protocol for biological or chemical analysis. For example, the bioassay system 100 includes a system controller 104 that may communicate with the various components, assemblies, and sub-systems of the bioassay system 100 and also the biosensor 102. For example, in addition to the system receptacle 112, the bioassay system 100 may also include a fluidic control system 106 to control the flow of fluid throughout a fluid network of the bioassay system 100 and the biosensor 102; a fluid storage system 108 that is to hold all fluids (e.g., gas or liquids) that may be used by the bioassay system; a temperature control system 110 that may regulate the temperature of the fluid in the fluid network, the fluid storage system 108, and/or the biosensor 102; and an illumination system 111 that is to illuminate the biosensor 102. As described above, if a cartridge having the biosensor 102 is loaded into the system receptacle 112, the cartridge may also include fluidic control and fluidic storage components.

Also shown, the bioassay system 100 may include a user interface 114 that interacts with the user. For example, the user interface 114 may include a display 113 to display or request information from a user and a user input device 115 to receive user inputs. In some examples, the display 113 and the user input device 115 are the same device. For example, the user interface 114 may include a touch-sensitive display to detect the presence of an individual's touch and also identify a location of the touch on the display. However, other user input devices 115 may be used, such as a mouse, touchpad, keyboard, keypad, handheld scanner, voice-recognition system, motion-recognition system, and the like. As will be discussed in greater detail below, the bioassay system 100 may communicate with various components, including the biosensor 102 (e.g., in the form of a cartridge), to perform the designated reactions. The bioassay system 100 may also analyze data obtained from the biosensor to provide a user with desired information. The system controller 104 may include any processor-based or microprocessor-based system, including systems using microcontrollers, reduced instruction set computers (RISC), application specific integrated circuits (ASICs), field programmable gate array (FPGAs), logic circuits, and any other circuit or processor capable of executing functions described herein. The above examples are not intended to limit in any way the definition and/or meaning of the term system controller. In an example, the system controller 104 executes a set of instructions that are stored in one or more storage elements, memories, or modules in order to at least one of obtain and analyze detection data. Storage elements may be in the form of information sources or physical memory elements within the bioassay system 100.

The set of instructions may include various commands that instruct the bioassay system 100 or biosensor 102 to perform specific operations such as the methods and processes of the various examples described herein. The set of instructions may be in the form of a software program, which may form part of a tangible, non-transitory computer readable medium or media. As used herein, the teens "software" and "firmware" are interchangeable, and include any computer program stored in memory for execution by a computer, including RAM memory, ROM memory, EPROM memory, EEPROM memory; and non-volatile RAM (NVRAM) memory. The above memory types are exemplary only, and are thus not limiting as to the types of memory usable for storage of a computer program.

The software may be in various forms such as system software or application software. Further, the software may be in the form of a collection of separate programs, or a program module within a larger program or a portion of a program module. The software also may include modular programming in the form of object-oriented programming. After obtaining the detection data, the detection data may be automatically processed by the bioassay system 100, processed in response to user inputs, or processed in response to a request made by another processing machine (e.g., a remote request through a communication link).

The system controller 104 may be connected to the biosensor 102 and the other components of the bioassay system 100 via communication links. The system controller 104 may also be communicatively connected to off-site systems or servers. The communication links may be hard-wired or wireless. The system controller 104 may receive user inputs or commands, from the user interface 114 and the user input device 115.

The fluidic control system 106 includes a fluid network and is to direct and regulate the flow of one or more fluids through the fluid network. The fluid network may be in fluid communication with the biosensor 102 and the fluid storage system 108. For example, select fluids may be drawn from the fluid storage system 108 and directed to the biosensor 102 in a controlled manner, or the fluids may be drawn from the biosensor 102 and directed toward, for example, a waste reservoir in the fluid storage system 108. Although not shown, the fluidic control system 106 may include flow sensors that detect a flow rate or pressure of the fluids within the fluid network. The sensors may communicate with the system controller 104.

The temperature control system 110 is to regulate the temperature of fluids at different regions of the fluid network, the fluid storage system 108, and/or the biosensor 102. For example, the temperature control system 110 may include a thermocycler that interfaces with the biosensor 102 and controls the temperature of the fluid that flows along the reaction sites in the biosensor 102. The temperature control system 110 may also regulate the temperature of solid elements or components of the bioassay system 100 or the biosensor 102. Although not shown, the temperature control system 110 may include sensors to detect the temperature of the fluid or other components. The sensors may communicate with the system controller 104.

The fluid storage system 108 is in fluid communication with the biosensor 102 and may store various reaction components or reactants that are used to conduct the designated reactions therein. The fluid storage system 108 may also store fluids for washing or cleaning the fluid network and biosensor 102 and for diluting the reactants. For example, the fluid storage system 108 may include various reservoirs to store samples, reagents, enzymes, other biomolecules, buffer solutions, aqueous, and non-polar solutions, and the like. Furthermore, the fluid storage system 108 may also include waste reservoirs for receiving waste products from the biosensor 102. In examples that include a cartridge, the cartridge may include one or in ore of a fluid storage system, fluidic control system or temperature control system. Accordingly, one or more of the components set forth herein as relating to those systems can be contained within a cartridge housing. For example, a cartridge can have various reservoirs to store samples, reagents, enzymes, other biomolecules, buffer solutions, aqueous, and non-polar solutions, waste, and the like. As such, one or more of a fluid storage system, fluidic control system or temperature control system can be removably engaged with a bioassay system via a cartridge or other biosensor.

The illumination system 111 may include a light source (e.g., one or more LEDs) and a plurality of optical components to illuminate the biosensor. Examples of light sources may include lasers, arc lamps, LEDs, or laser diodes. The optical components may be, for example, reflectors, dichroics, beam splitters, collimators, lenses, filters, wedges, prisms, mirrors, detectors, and the like. In embodiments that use an illumination system, the illumination system 111 may be configured to direct an excitation light to reaction sites. As one example, fluorophores may be excited by green wavelengths of light, as such the wavelength of the excitation light may be approximately 532 nm.

The system receptacle or interface 112 is to engage the biosensor 102 in at least one of a mechanical, electrical, and fluidic manner. The system receptacle 112 may hold the biosensor 102 in a desired orientation to facilitate the flow of fluid through the biosensor 102. The system receptacle 112 may also include electrical contacts that are to engage the biosensor 102 so that the bioassay system 100 may communicate with the biosensor 102 and/or provide power to the biosensor 102. Furthermore, the system receptacle 112 may include fluidic ports (e.g., nozzles) that are to engage the biosensor 102. In some examples, the biosensor 102 is removably coupled to the system receptacle 112 in a mechanical manner, in an electrical manner, and also in a fluidic manner.

In addition, the bioassay system 100 may communicate remotely with other systems or networks or with other bioassay systems 100. Detection data obtained by the bioassay system(s) 100 may be stored in a remote database.

Figure 2:
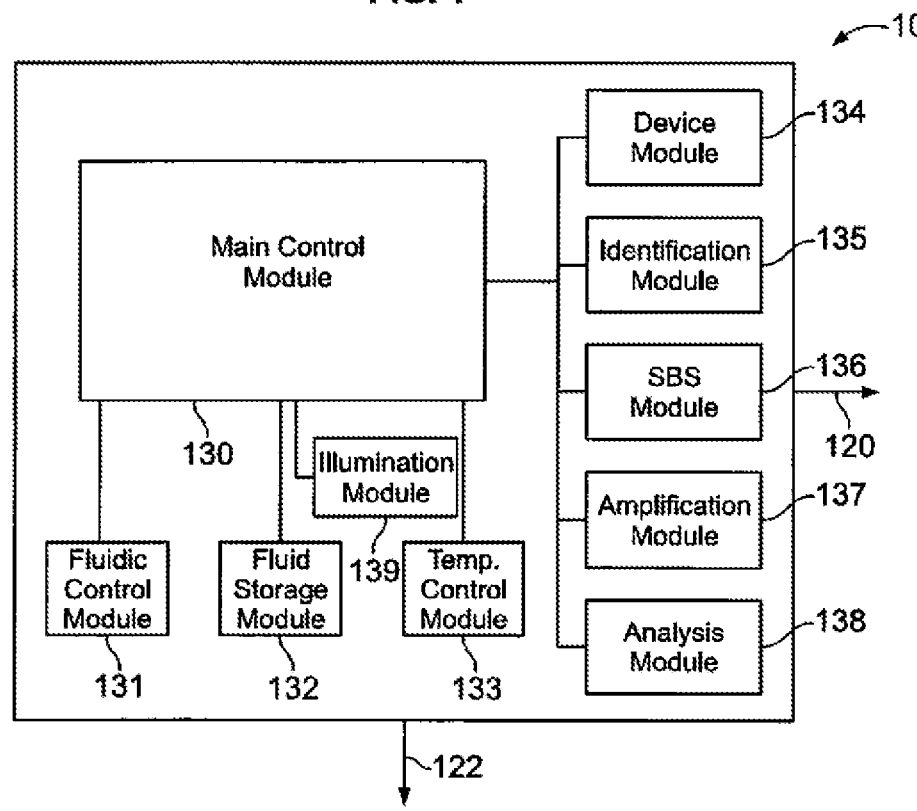
FIG. 2 is a block diagram of an exemplary system controller that may be used in the system of FIG. 1.

FIG. 2 is a block diagram of the system controller 104 in an example. In one example, the system controller 104 includes one or more processors or modules that may communicate with one another. Each of the processors or modules may include an algorithm (e.g., instructions stored on a tangible and/or non-transitory computer readable storage medium) or sub-algorithms to perform particular processes. The system controller 104 is illustrated conceptually as a collection of modules, but may be implemented utilizing any combination of dedicated hardware hoards, DSPs, processors, etc. Alternatively, the system controller 104 may be implemented utilizing an off-the-shelf PC with a single processor or multiple processors, with the functional operations distributed between the processors. As a further option, the modules described below may be implemented utilizing a hybrid configuration in which certain modular functions are performed utilizing dedicated hardware, while the remaining modular functions are performed utilizing an off-the-shelf PC and the like. The modules also may be implemented as software modules within a processing unit.

During operation, a communication link 120 may transmit information (e.g., commands) to or receive information (e.g., data) from the biosensor 102 (FIG. 1) and/or the sub-systems 106, 108, 110 (FIG. 1). A communication link 122 may receive user input from the user interface 114 (FIG. 1) and transmit data or information to the user interface 114. Data from the biosensor 102 or sub-systems 106, 108, 110 may be processed by the system controller 104 in real-time during a bioassay session. Additionally or alternatively, data may be stored temporarily in a system memory during a bioassay session and processed in slower than real-time or off-line operation.

As shown in FIG. 2, the system controller 104 may include a plurality of modules 131-139 that communicate with a main control module 130. The main control module 130 may communicate with the user interface 114 (FIG. 1). Although the modules 131-139 are shown as communicating directly with the main control module 130, the modules 131-139 may also communicate directly with each other, the user interface 114, and the biosensor 102. Also, the modules 131-139 may communicate with the main control module 130 through the other modules.

The plurality of modules 131-139 include system modules 131-133, 139 that communicate with the sub-systems 106, 108, 110, and 111, respectively. The fluidic control module 131 may communicate with the fluidic control system 106 to control the valves and flow sensors of the fluid network for controlling the flow of one or more fluids through the fluid network. The fluid storage module 132 may notify the user when fluids are low or when the waste reservoir is at or near capacity. The fluid storage module 132 may also communicate with the temperature control module 133 so that the fluids may be stored at a desired temperature. The illumination module 139 may communicate with the illumination system 109 to illuminate the reaction sites at designated times during a protocol, such as after the designated reactions (e.g., binding events) have occurred.

The plurality of modules 131-139 may also include a device module 134 that communicates with the biosensor 102 and an identification module 135 that determines identification information relating to the biosensor 102. The device module 134 may, for example, communicate with the system receptacle 112 to confirm that the biosensor has established an electrical and fluidic connection with the bioassay system 100. The identification module 135 may receive signals that identify the biosensor 102. The identification module 135 may use the identity of the biosensor 102 to provide other information to the user. For example, the identification module 135 may determine and then display a lot number, a date of manufacture, or a protocol that is recommended to be run with the biosensor 102.

The plurality of modules 131-139 may also include a detection data analysis module 138 that receives and analyzes the signal data (e.g., image data) from the biosensor 102. The signal data may be stored for subsequent analysis or may be transmitted to the user interface 114 to display desired information to the user. In some embodiments, the signal data may be processed by the solid-state imager (e.g., CMOS image sensor) before the detection data analysis module 138 receives the signal data.

Protocol modules 136 and 137 communicate with the main control module 130 to control the operation of the sub-systems 106, 108, and 110 when conducting predetermined assay protocols. The protocol modules 136 and 137 may include sets of instructions for instructing the bioassay system 100 to perform specific operations pursuant to predetermined protocols. As shown, the protocol module may be a sequencing-by-synthesis (SBS) module 136 that is configured to issue various commands for performing sequencing-by-synthesis processes. In SBS, extension of a nucleic acid primer along a nucleic acid template is monitored to determine the sequence of nucleotides in the template. The underlying chemical process may be polymerization (e.g., as catalyzed by a polymerase enzyme) or ligation (e.g., catalyzed by a ligase enzyme). In a particular polymerase-based SBS example, fluorescently labeled nucleotides are added to a primer (thereby extending the primer) in a template dependent fashion such that detection of the order and type of nucleotides added to the primer may be used to determine the sequence of the template. For example, to initiate a first SBS cycle, commands may be given to deliver one or more labeled nucleotides, DNA polymerase, etc., into/through a flow cell that houses an array of nucleic acid templates. The nucleic acid templates may be located at corresponding reaction sites. Those reaction sites where primer extension causes a labeled nucleotide to be incorporated may be detected through an imaging event. During an imaging event, the illumination system 111 may provide an excitation light to the reaction sites. Optionally, the nucleotides may further include a reversible termination property that terminates further primer extension once a nucleotide has been added to a primer. For example, a nucleotide analog having a reversible terminator moiety may be added to a primer such that subsequent extension cannot occur until a deblocking agent is delivered to remove the moiety. Thus, for examples that use reversible termination a command may be given to deliver a deblocking reagent to the flow cell (before or after detection occurs). One or more commands may be given to effect wash(es) between the various delivery steps. The cycle may then be repeated n times to extend the primer by n nucleotides, thereby detecting a sequence of length n. Exemplary sequencing techniques are described, for example, in Bentley et al., Nature 456:53-59 (2008), WO 04/018497; U.S. Pat. No. 7,057,026; WO 91/06678; WO 07/123744; U.S. Pat. Nos. 7,329,492; 7,211,414; 7,315,019; 7,405,281, and US 2008/0108082, each of which is incorporated herein by reference in its entirety.

For the nucleotide delivery step of an SBS cycle, either a single type of nucleotide may be delivered at a time, or multiple different nucleotide types (e.g. A, C, T and G together) may be delivered. For a nucleotide delivery configuration where only a single type of nucleotide is present at a time, the different nucleotides need not have distinct labels since they may be distinguished based on temporal separation inherent in the individualized delivery. Accordingly, a sequencing method or apparatus may use single color detection. For example, an excitation source need only provide excitation at a single wavelength or in a single range of wavelengths. For a nucleotide delivery configuration Where delivery results in multiple different nucleotides being present in the flow cell at one time, sites that incorporate different nucleotide types may be distinguished based on different fluorescent labels that are attached to respective nucleotide types in the mixture. For example, four different nucleotides may be used, each having one of four different fluorophores. In one embodiment, the four different fluorophores may be distinguished using excitation in four different regions of the spectrum. For example, four different excitation radiation sources may be used. Alternatively, fewer than four different excitation sources may be used, but optical filtration of the excitation radiation from a single source may be used to produce different ranges of excitation radiation at the flow cell.

In some examples, fewer than four different colors may, be detected in a mixture having four different nucleotides. For example, pairs of nucleotides may be detected at the same wavelength, but distinguished based on a difference iii intensity for one member of the pair compared to the other, or based on a change to one member of the pair (e.g., via chemical modification, photochemical modification or physical modification) that causes apparent signal to appear or disappear compared to the signal detected for the other member of the pair. Exemplary apparatus and methods for distinguishing four different nucleotides using detection of fewer than four colors are described for example in U.S. Pat. App. Ser. No. 61/538,294 and 61/619,878, which are incorporated herein by reference their entireties. U.S. application Ser. No. 13/624,200, which was filed on Sep. 21, 2012, is also incorporated by reference in its entirety.

The plurality of protocol modules may also include a sample-preparation (or generation) module 137 that is to issue commands to the fluidic control system 106 and the temperature control system 110 for amplifying a product within the biosensor 102. For example, the biosensor 102 may be engaged to the bioassay system 100. The amplification module 137 may issue instructions to the fluidic control system 106 to deliver necessary amplification components to reaction chambers within the biosensor 102. In other embodiments, the reaction sites may already contain some components for amplification, such as the template DNA and/or primers. After delivering the amplification components to the reaction chambers, the amplification module 137 may instruct the temperature control system 110 to cycle through different temperature stages according to known amplification protocols. In some examples, the amplification and/or nucleotide incorporation is performed isothermally.

The SBS module 136 may issue commands to perform bridge PCR where clusters of clonal amplicons are formed on localized areas within a channel of a flow cell. After generating the amplicons through bridge PCR, the amplicons may be "linearized" to make single stranded template DNA, or sstDNA, and a sequencing primer may be hybridized to a universal sequence that flanks a region of interest. For example, a reversible terminator-based sequencing by synthesis method may be used as set forth above or as follows.

Each sequencing cycle may extend a sstDNA by a single base which may be accomplished for example by using a modified DNA polymerase and a mixture of four types of nucleotides. The different types of nucleotides may have unique fluorescent labels, and each nucleotide may further have a reversible terminator that allows only a single-base incorporation to occur in each cycle. After a single base is added to the sstDNA, excitation light may be incident upon the reaction sites and fluorescent emissions may be detected. After detection, the fluorescent label and the terminator may be chemically cleaved from the sstDNA. Another similar sequencing cycle may follow. In such a sequencing protocol, the SBS module 136 may instruct the fluidic control system 106 to direct a flow of reagent and enzyme solutions through the biosensor 102. Exemplary reversible terminator-based SBS methods which may be utilized with the apparatus and methods set forth herein are described in US Patent Application Publication No. 2007/0166705 A1, US Patent Application Publication No. 2006/0188901 A1, U.S. Pat. No. 7,057,026, US Patent Application Publication No. 2006/0240439 A1, US Patent Application Publication No. 2006/0281109 A1, PCT Publication No. WO 05/065814, US Patent Application Publication No. 2005/0100900 A1, PCT Publication No. WO 06/064199 and PCT Publication No. WO 07/010251, each of which is incorporated herein by reference in its entirety. Exemplary reagents for reversible terminator-based SBS are described in U.S. Pat. Nos. 7,541,444; 7,057,026; 7,414,116; 7,427,673; 7,566,537; 7,592,435 and WO 07/135368, each of which is incorporated herein by reference in its entirety.

In some examples, the amplification and SBS modules may operate in a single assay protocol where, for example, template nucleic acid is amplified and subsequently, sequenced within the same cartridge.

The bioassay system 100 may also allow the user to reconfigure an assay protocol. For example, the bioassay system 100 may offer options to the user through the user interface 114 for modifying the determined protocol. For example, if it is determined that the biosensor 102 is to be used for amplification, the bioassay system 100 may request a temperature for the annealing cycle. Furthermore, the bioassay system 100 may issue warnings to a user if a user has provided user inputs that are generally not acceptable for the selected assay protocol.

Figure 3:
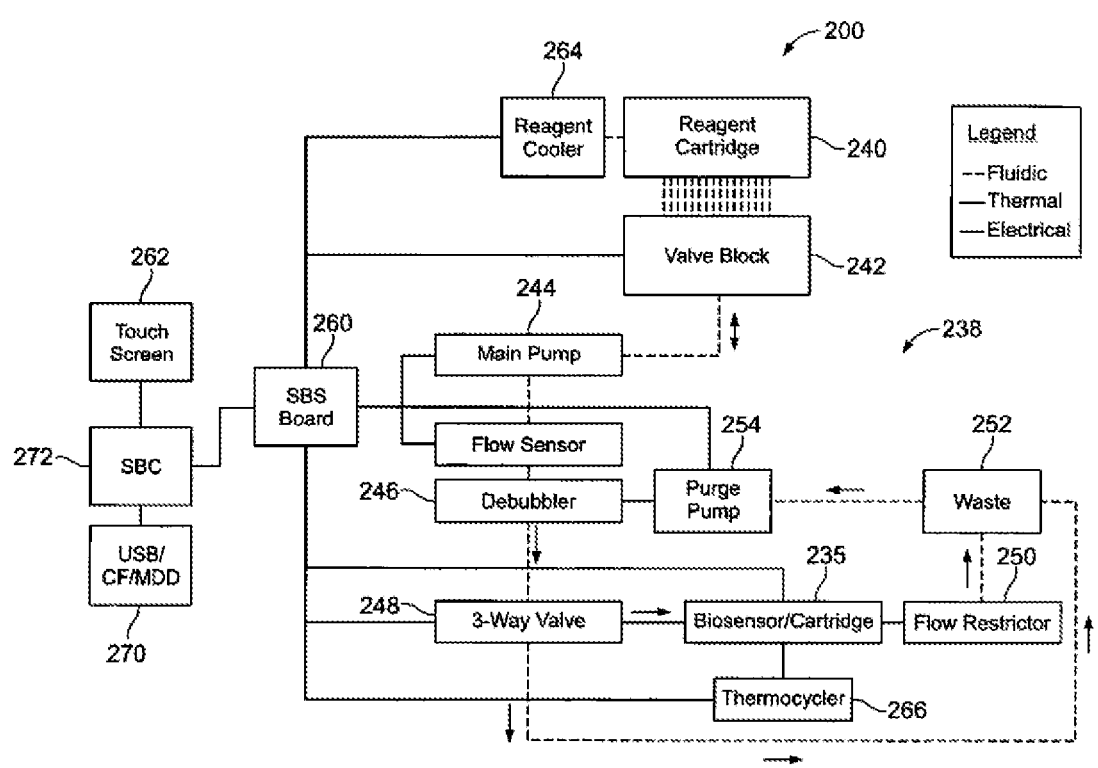
FIG. 3 is a block diagram of an exemplary workstation for biological or chemical analysis.

FIG. 3 is a block diagram of an exemplary workstation 200 for biological or chemical analysis in accordance with one example. The workstation 200 may have similar features, systems, and assemblies as the bioassay system 100 described above. For example, the workstation 200 may have a fluidic control system, such as the fluidic control system 106 (FIG. 1), that is fluidicly coupled to a biosensor (or cartridge) 235 through a fluid network 238. The fluid network 238 may include a reagent cartridge 240, a valve block 242, a main pump 244, a debubbler 246, a 3-way valve 248, a flow restrictor 250, a waste removal system 252, and a purge pump 254. In particular examples, most of the components or all of the components described above are within a common workstation housing (not shown). Although not shown, the workstation 200 may also include an illumination system, such as the illumination system 111, that is to provide an excitation light to the reaction sites.

A flow of fluid is indicated by arrows along the fluid network 238. For example, reagent solutions may be removed from the reagent cartridge 240 and flow through the valve block 242. The valve block 242 may facilitate creating a zero-dead volume of the fluid flowing to the cartridge 235 from the reagent cartridge 240. The valve block 242 may select or permit one or more liquids within the reagent cartridge 240 to flow through the fluid network 238. For example, the valve block 242 may include solenoid valves that have a compact arrangement. Each solenoid valve may control the flow of a fluid from a single reservoir bag. In some examples, the valve block 242 can permit two or more different liquids to flow into the fluid network 238 at the same time thereby mixing the two or more different liquids. After leaving the valve block 242, the fluid may flow through the main pump 244 and to the debubbler 246. The debubbler 246 is to remove unwanted gases that have entered or been generated within the fluid network 238.

From the debubbler 246, fluid may flow to the 3-way valve 248 where the fluid is either directed to the cartridge 235 or bypassed to the waste removal system 252. A flow of the fluid within the cartridge 235 may be at least partially controlled by the flow restrictor 250 located downstream from the cartridge 235. Furthermore, the flow restrictor 250 and the main pump 244 may coordinate with each other to control the flow of fluid across reaction sites and/or control the pressure within the fluid network 238. Fluid may flow through the cartridge 235 and onto the waste removal system 252. Optionally, fluid may flow through the purge pump 254 and into, for example, a waste reservoir bag within the reagent cartridge 240.

Also shown in FIG. 3, the workstation 200 may include a temperature control system, such as the temperature control system 110, that is to regulate or control a thermal environment of the different components and sub-systems of the workstation 200. The temperature control system 110 may include a reagent cooler 264 that is to control the temperature requirements of various fluids used by the workstation 200, and a thermocycler 266 that is to control the temperature of a cartridge 235. The thermocycler 266 may include a thermal element (not shown) that interfaces with the cartridge.

Furthermore, the workstation 200 may include a system controller or SBS board 260 that may have similar features as the system controller 104 described above. The SBS board 260 may communicate with the various components and sub-systems of the workstation 200 as well as the cartridge 235. Furthermore, the SBS board 260 may communicate with remote systems to, for example, store data or receive commands from the remote systems. The workstation 200 may also include a touch screen user interface 262 that is operatively coupled to the SBS board 260 through a single-board computer (SBC) 272. The workstation 200 may also include one or more user accessible data communication ports and/or drives. For example, a workstation 200 may include one or more universal serial bus (USB) connections for computer peripherals, such as a flash or jump drive, a compact-flash (CF) drive and/or a hard drive 270 for storing user data in addition to other software.

Figure 4:
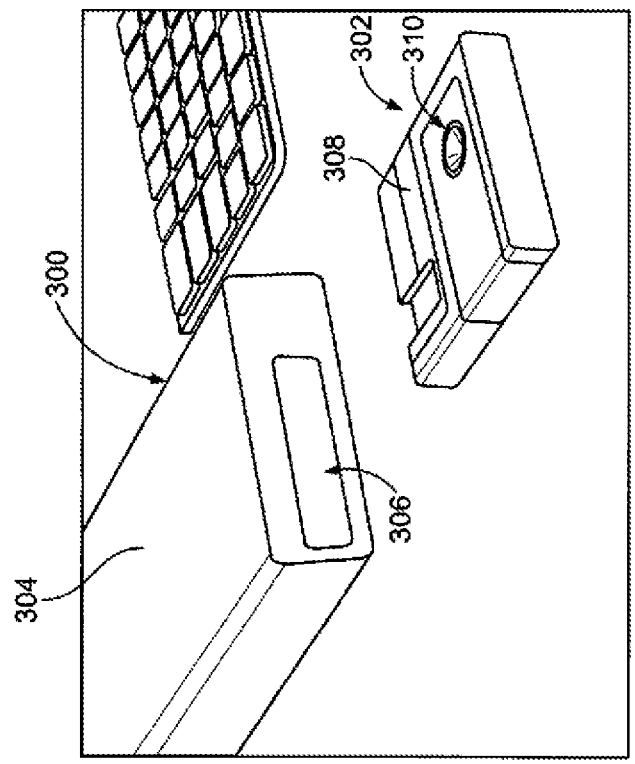
FIG. 4 is a perspective view of an exemplary workstation and an exemplary cartridge.

FIG. 4 is a perspective view of a workstation 300 and a cartridge 302 that may include one or more biosensors (not shown) as described herein. The workstation 300 may include similar components as described above with respect to the bioassay system 100 and the workstation 200 and may operate in a similar manner. For example, the workstation 300 may include a workstation housing 304 and a system receptacle 306 that is to receive and engage the cartridge 302. The system receptacle may at least one of fluidically or electrically engage the cartridge 302. The workstation housing 304 may hold, for example, a system controller, a fluid storage system, a fluidic control system, and a temperature control system as described above. In FIG. 4, the workstation 300 does not include a user interface or display that is coupled to the workstation housing 304. However, a user interface may be communicatively coupled to the housing 304 (and the components/systems therein) through a communication link. Thus, the user interface and the workstation 300 may be remotely located with respect to each other. Together, the user interface and the workstation 300 (or a plurality of workstations) may constitute a bioassay system.

As shown, the cartridge 302 includes a cartridge housing 308 having at least one port 310 that provides access to an interior of the cartridge housing 308. For example, a solution that is to be used in the cartridge 302 during the controlled reactions may be inserted through the port 310 by a technician or by the workstation 300. The system receptacle 306 and the cartridge 302 may be sized and shaped relative to each other such that the cartridge 302 may be inserted into a receptacle cavity (not shown) of the system receptacle 306.

Figure 5:
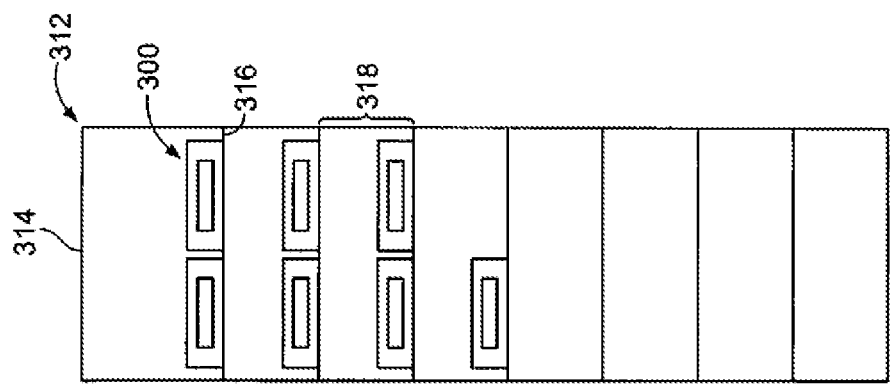
FIG. 5 is a front view of an exemplary rack assembly that includes a plurality of the workstations of FIG. 4.

FIG. 5 is a front view of a rack assembly 312 having a cabinet or carriage 314 with a plurality of the workstations 300 loaded thereon. The cabinet 314 may include one or more shelves 316 that define one or more reception spaces 318 to receive one or more workstations 300. Although not shown, the workstations 300 may be communicatively coupled to a communication network that permits a user to control operation of the workstations 300. In some examples, a bioassay system includes a plurality of workstations, such as the workstations 300, and a single user interface to control operation of the multiple workstations.

Figure 6:
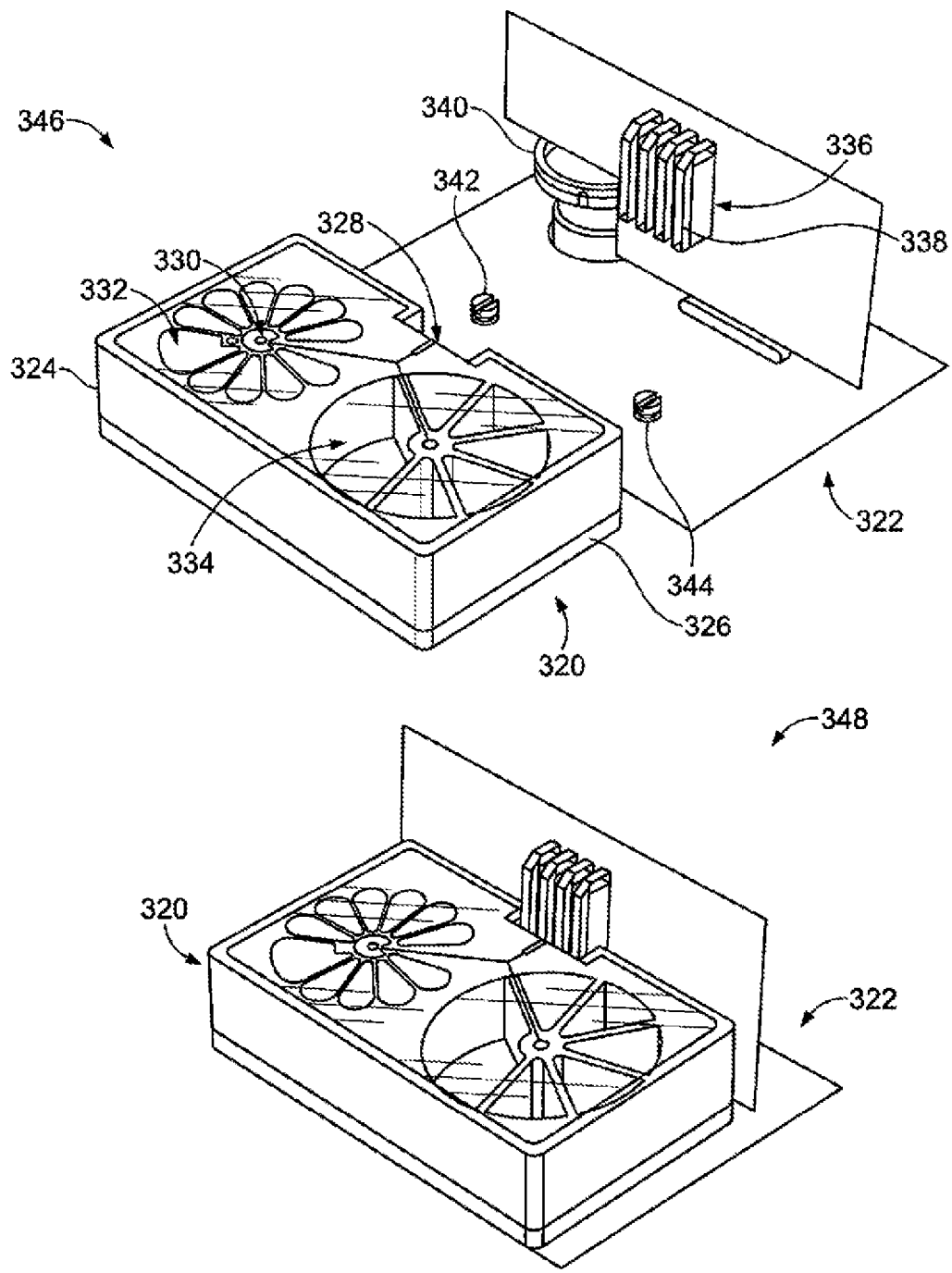
FIG. 6 illustrates internal components of an exemplary cartridge.

FIG. 6 illustrates various features of the cartridge 302 (FIG. 4) in accordance with one example. As shown, the cartridge 302 may include a sample assembly 320, and the system receptacle 306 may include a light assembly 322. Stage 346 shown in FIG. 6 represents the spatial relationship between the first and second sub-assemblies 320 and 322 when they are separate from each other. At stage 348, the first and second sub-assemblies 320 and 322 are joined together. The cartridge housing 308 (FIG. 4) may enclose the joined first and second sub-assemblies 320 and 322.

In the illustrated example, the first sub-assembly 320 includes a base 326 and a reaction-component body 324 that is mounted onto the base 326. Although not shown, one or more biosensors may be mounted to the base 326 in a recess 328 that is defined, at least in part, by the reaction-component body 324 and the base 326. For example, at least four biosensors may be mounted to the base 326. In some examples, the base 326 is a printed circuit board having circuitry that enables communication between the different components of the cartridge and the workstation 300 (FIG. 4). For example, the reaction-component body 324 may include a rotary valve 330 and reagent reservoirs 332 that are fluidically coupled to the rotary valve 330. The reaction-component body 324 may also include additional reservoirs 334.

The second sub-assembly 322 includes a light assembly 336 that includes a plurality of light directing channels 338. Each light directing channel 338 is optically coupled to a light source (not shown), such as a light-emitting diode (LED). The light source(s) are to provide an excitation light that is directed by the light directing, channels 338 onto the biosensors. In alternative examples, the cartridge may not include a light source(s). In such examples, the light source(s) may be located in the workstation 300. When the cartridge is inserted into the system receptacle 306 (FIG. 4), the cartridge 302 may align with the light source(s) so that the biosensors may be illuminated.

Also shown in FIG. 6, the second sub-assembly 322 includes a cartridge pump 340 that is fluidically coupled to ports 342 and 344. When the first and second sub-assemblies 320 and 322 are joined together, the port 342 is coupled to the rotary valve 330 and the port 344 is coupled to the other reservoirs 334. The cartridge pump 340 may be activated to direct reaction components from the reservoirs 332 and/or 334 to the biosensors according to a designated protocol.

Figure 7:
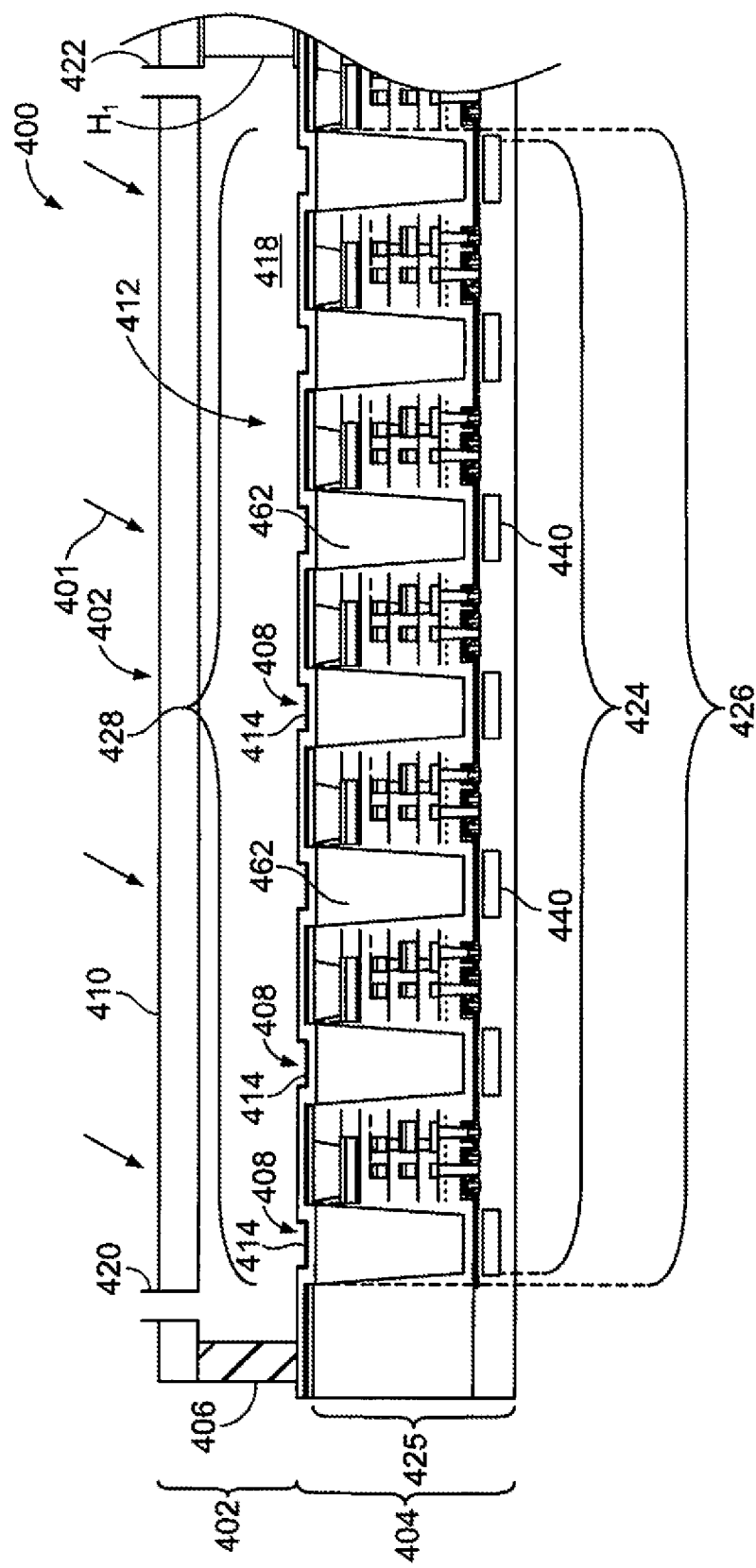
FIG. 7 illustrates a cross-section of a biosensor.

FIG. 7 illustrates a cross-section of a portion of an exemplary biosensor 400 formed in accordance with one example. The biosensor 400 may include similar features as the biosensor 102 (FIG. 1) described above and may be used in, for example, the cartridge 302 (FIG. 4). As shown, the biosensor 400 may include a flow cell 402 that is coupled directly or indirectly to a detection device 404. The flow cell 402 may be mounted to the detection device 404. In the illustrated embodiment, the flow cell 402 is affixed directly to the detection device 404 through one or more securing mechanisms (e.g., adhesive, bond, fasteners, and the like). In some examples, the flow cell 402 may be removably coupled to the detection device 404.

In the illustrated example, the detection device 404 includes a device base 425. In particular examples, the device base 425 includes a plurality of stacked layers (e.g., silicon layer, dielectric layer, metal-dielectric layers, etc.). The device base 425 may include a sensor array 424 of light sensors 440, a guide array 426 of light guides 462, and a reaction array 428 of reaction recesses 408 that have corresponding reaction sites 414. In certain examples, the components are arranged such that each light sensor 440 aligns with a single light guide 462 and a single reaction site 414. However, in other examples, a single light sensor 440 may receive photons through more than one light guide 462 and/or from more than one reaction site 414. As used herein, a single light sensor may include one pixel or more than one pixel.

Moreover, it is noted that the term "array" or "sub-array" does not necessarily include each and every item of a certain type that the detection device may have. For example, the sensor array 424 may not include each and every light sensor in the detection device 404. Instead, the detection device 404 may include other light sensors (e.g.; other array(s) of light sensors). As another example, the guide array 426 may not include each and every light guide of the detection device. Instead, there may be other light guides that are configured differently than the light guides 462 or that have different relationships with other elements of the detection device 404. As such, unless explicitly recited otherwise, the term "array" may or may not include all such items of the detection device.

In the illustrated example, the flow cell 402 includes a sidewall 406 and a flow cover 410 that is supported by the sidewall 406 and other sidewalls (not shown). The sidewalls are coupled to the detector surface 412 and extend between the flow cover 410 and the detector surface 412. In some examples, the sidewalls are formed from a curable adhesive layer that bonds the flow cover 410 to the detection device 404.

The flow cell 402 is sized and shaped so that a flow channel 418 exists between the flow cover 410 and the detection device 404. As shown, the flow channel 418 may include a height $H_1$. By way of example only, the height $H_1$ may be between about 50-400 μm (microns) or, more particularly, about 80-200 μm. In the illustrated example, the height $H_1$ is about 100 μm. The flow cover 410 may include a material that is transparent to excitation light 401 propagating from an exterior of the biosensor 400 into the flow channel 418. As shown in FIG. 7, the excitation light 401 approaches the flow cover 410 at a non-orthogonal angle. However, this is only for illustrative purposes as the excitation light 401 may approach the flow cover 410 from different angles.

Also shown, the flow cover 410 may include inlet and outlet ports 420, 422 that are to fluidically engage other ports (not shown). For example, the other ports may be from the cartridge 302 (FIG. 4) or the workstation 300 (FIG. 4). The flow channel 418 is sized and shaped to direct a fluid along the detector surface 412. The height $H_1$ and other dimensions of the flow channel 418 may be to maintain a substantially even flow of a fluid along the detector surface 412. The dimensions of the flow channel 418 may also be to control bubble formation.

The sidewalls 406 and the flow cover 410 may be separate components that are coupled to each other. In other examples, the sidewalls 406 and the flow cover 410 may be integrally formed such that the sidewalls 406 and the flow cover 410 are formed from a continuous piece of material. By way of example, the flow cover 410 (or the flow cell 402) may comprise a transparent material, such as glass or plastic. The flow cover 410 may constitute a substantially rectangular block having a planar exterior surface and a planar inner surface that defines the flow channel 418. The block may be mounted onto the sidewalls 406. Alternatively, the flow cell 402 may be etched to define the flow cover 410 and the sidewalls 406. For example, a recess may be etched into the transparent material. When the etched material is mounted to the detection device 404, the recess may become the flow channel 418.

The detection device 404 has a detector surface 412 that may be functionalized (e.g., chemically or physically modified in a suitable manner for conducting designated reactions). For example, the detector surface 412 may be functionalized and may include a plurality of reaction sites 414 having one or more biomolecules immobilized thereto. The detector surface 412 has an array of reaction recesses or open-sided reaction chambers 408. Each of the reaction recesses 408 may include one or more of the reaction sites 414. The reaction recesses 408 may be defined by, for example, an indent or change in depth along the detector surface 412. In other examples, the detector surface 412 may be substantially planar.

As shown in FIG. 7, the reaction sites 414 may be distributed in a pattern along the detector surface 412. For instance, the reactions sites 414 may be located in rows and columns along the detector surface 412 in a manner that is similar to a microarray. However, it is understood that various patterns of reaction sites may be used. The reaction sites may include biological or chemical substances that emit light signals. For example, the biological or chemical substances of the reaction sites may generate light emissions in response to the excitation light 401. In particular examples, the reaction sites 414 include clusters or colonies of biomolecules (e.g., oligonucleotides) that are immobilized on the detector surface 412.

Figure 8:
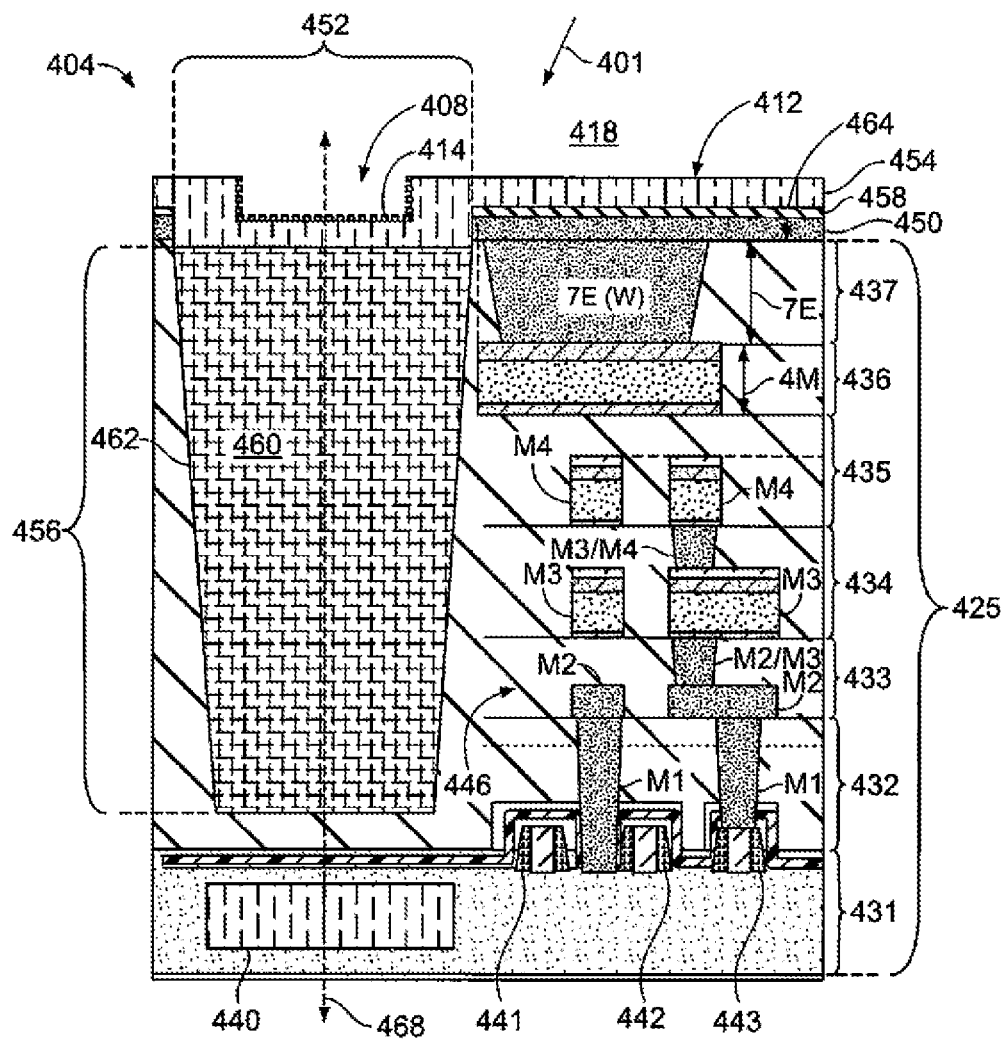
FIG. 8 is an enlarged portion of the cross-section of FIG. 7 illustrating the biosensor in greater detail.

FIG. 8 is an enlarged cross-section of the detection device 404 showing various features in greater detail. More specifically, FIG. 8 shows a single light sensor 440, a single light guide 462 for directing light emissions toward the light sensor 440, and associated circuitry 446 for transmitting signals based on the light emissions (e.g., photons) detected by the light sensor 440. It is understood that the other light sensors 440 of the sensor array 424 (FIG. 7) and associated components may be configured in an identical or similar manner. It is also understood, however, the detection device 404 is not required to be manufactured identically or uniformly throughout. Instead, one or more light sensors 440 and/or associated components may be manufactured differently or have different relationships with respect to one another.

The circuitry 446 may include interconnected conductive elements (e.g., conductors, traces, vias, interconnects, etc.) that are capable of conducting electrical current, such as the transmission of data signals that are based on detected photons. In some examples, the circuitry 446 may be similar to or include a microcircuit arrangement, such as the microcircuit arrangement described in U.S. Pat. No. 7,595,883, which is incorporated herein by reference in the entirety. The detection device 404 and/or the device base 425 may comprise an integrated circuit having a planar array of the light sensors 440. The circuitry 446 formed within the detection device 425 may be for at least one of signal amplification, digitization, storage, and processing. The circuitry may collect and analyze the detected light emissions and generate data signals for communicating detection data to a bioassay system. The circuitry 446 may also perform additional analog and/or digital signal processing in the detection device 404.

The device base 425 may be manufactured using integrated circuit manufacturing processes, such as processes used to manufacture complementary-metal-oxide semiconductors (CMOSs). For example, the device base 425 may include a plurality of stacked layers 431-437 including a sensor layer or base 431, which is a silicon layer or wafer in the illustrated example. The sensor layer 431 may include the light sensor 440 and gates 441-443 that are formed with the sensor layer 431. The gates 441-443 are electrically coupled to the light sensor 440. When the detection device 404 is fully formed as shown in FIGS. 7 and 8, the light sensor 440 may be electrically coupled to the circuitry 446 through the gates 441-443.

As used herein, the term "layer" is not limited to a single continuous body of material unless otherwise noted. For example, the sensor layer 431 may include multiple sub-layers that are different materials and/or may include coatings, adhesives, and the like. Furthermore, one or more of the layers (or sub-layers) may be modified (e.g., etched, deposited with material, etc.) to provide the features described herein.

In some examples, each light sensor 440 has a detection area that is less than about 50 $\mu m^2$. In particular examples, the detection area is less than about 10 $\mu m^2$. In more particular examples, the detection area is about 2 $\mu m^2$. In such cases, the light sensor 440 may constitute a single pixel. An average read noise of each pixel in a light sensor 440 may be, for example, less than about 150 electrons. In more particular examples, the read noise may be less than about 5 electrons. The resolution of the array, of light sensors 440 may be greater than about 0.5 megapixels (Mpixels). In more specific examples, the resolution may be greater than about 5 Mpixels and, more particularly, greater than about 10 Mpixels.

The device layers also include a plurality of metal-dielectric layers 432-437, which are hereinafter referred to as substrate layers. In the illustrated example, each of the substrate layers 432-437 includes metallic elements (e.g., W (tungsten), Cu (copper), or Al (aluminum)) and dielectric material (e.g., $SiO_2$). Various metallic elements and dielectric material may be used, such as those suitable for integrated circuit manufacturing. However, in other examples, one or more of the substrate layers 432-437 may include only dielectric material, such as one or more layers of $SiO_2$.

With respect to the specific example shown in FIG. 8, the first substrate layer 432 may include metallic elements referred to as M1 that are embedded within dielectric material (e.g., $SiO_2$). The metallic elements M1 comprise, for example, W (tungsten). The metallic elements M1 extend entirely through the substrate layer 432 in the illustrated example. The second substrate layer 433 includes metallic elements M2 and dielectric material as well as a metallic interconnects (M2/M3). The third substrate layer 434 includes metallic elements M3 and metal interconnects (M3/M4). The fourth substrate layer 435 also includes metallic elements M4. The device base 425 also includes fifth and sixth substrate layers 436, 437, which are described in greater detail below.

As shown, the metallic elements and interconnects are connected to each other to form at least a portion of the circuitry 446. In the illustrated example, the metallic elements M1, M2, M3, M4 include W (tungsten), Cu (copper), and/or aluminum (Al) and the metal interconnects M2/M3 and M3/M4 include W (tungsten), but it is understood that other materials and configurations may be used. It is also noted that the device base 425 and the detection device 404 shown in FIGS. 7 and 8 are for illustrative purposes only. For example, other examples may include fewer or additional layers than those shown in FIGS. 7 and 8 and/or different configurations of metallic elements.

In some examples, the detection device 404 includes a shield layer 450 that extends along an outer surface 464 of the device base 425. In the illustrated example, the shield layer 450 is deposited directly along the outer surface 464 of the substrate layer 437. However, an intervening layer may be disposed between the substrate layer 437 and the shield layer 450 in other examples. The shield layer 450 may include a material that is to block, reflect, and/or significantly attenuate the light signals that are propagating from the flow channel 418. By way of example only, the shield layer 450 may comprise tungsten (W).

As shown in FIG. 8, the shield layer 450 includes an aperture or opening 452 therethrough. The shield layer 450 may include an array of such apertures 452. In some examples, the shield layer 450 may extend continuously between adjacent apertures 452. As such, the light signals from the flow channel 418 may be blocked, reflected, and/or significantly attenuated to prevent detection of such light signals by the light sensors 440. However, in other examples, the shield layer 450 does not extend continuously between the adjacent apertures 452 such then one or more openings other than the apertures 452 exits in the shield layer 450.

The detection device 404 may also include a passivation layer 454 that extends along the shield layer 450 and across the apertures 452. The shield layer 450 may extend over the apertures 452 thereby directly or indirectly covering the apertures 452. The shield layer 450 may be located between the passivation layer 454 and the device base 425. An adhesive or promoter layer 458 may be located therebetween to facilitate coupling the passivation and shield layers 454, 450. The passivation layer 454 may be to protect the device base 425 and the shield layer 450 from the fluidic environment of the flow channel 418.

In some cases, the passivation layer 454 may also provide a solid surface (i.e., the detector surface 412) that permits biomolecules or other analytes-of-interest to be immobilized thereon. For example, each of the reaction sites 414 may include a cluster of biomolecules that are immobilized to the detector surface 412 of the passivation layer 454. Thus, the passivation layer 454 may be formed from a material that permits the reaction sites 414 to be immobilized thereto. The passivation layer 454 may also comprise a material that is at least transparent to a desired fluorescent light. By way of example, the passivation layer 454 may include silicon nitride ($Si_3N_4$) and/or silica ($SiO_2$). However, other suitable material(s) may be used. In addition, the passivation layer 454 may be physically or chemically modified to facilitate immobilizing the biomolecules and/or to facilitate detection of the light emissions.

In the illustrated example, a portion of the passivation layer 454 extends along the shield layer 450 and a portion of the passivation layer 454 extends directly along filter material 460 of a light guide 462. The reaction recess 408 may be formed directly over the light guide 462. In some cases, prior to the passivation layer 454 being deposited along the shield layer 450 or adhesion layer 458, a base hole or cavity 456 may be formed within the device base 425. For example, the device base 425 may be etched to form an array of the base holes 456. In particular examples, the base hole 456 is an elongated space that extends from proximate the aperture 452 toward the light sensor 440. The base hole may extend lengthwise along a central longitudinal axis 468. A three-dimensional shape of the base hole 456 may be substantially cylindrical or frustro-conical in some examples such that a cross-section taken along a plane that extends into the page of FIG. 8 is substantially circular. The longitudinal axis 468 may extend through a geometric center of the cross-section. However, other geometries may be used in alternative examples. For example, the cross-section may be substantially square-shaped or octagonal.

The filter material 460 may be deposited within the base hole 456 after the base hole 456 is formed. The filter material 460 may form (e.g., after curing) a light guide 462. The light guide 462 is to filter the excitation light 401 and permit the light emissions 466 to propagate therethrough toward the corresponding light sensor 440. The light guide 462 may be, for example, an organic absorption filter. By way of specific example only, the excitation light may be about 532 nm and the light emissions may be about 570 nm or more.

In some cases, the organic filter material may be incompatible with other materials of the biosensor. For example, organic filter material may have a coefficient of thermal expansion that causes the filter material to significantly expand. Alternatively or in addition to, the filter material may be unable to sufficiently adhere to certain layers, such as the shield layer (or other metal layers). Expansion of the filter material may cause mechanical stress on the layers that are adjacent to the filter material or structurally connected to the filter material. In some cases, the expansion may cause cracks or other unwanted features in the structure of the biosensor. As such, examples set forth herein may limit the degree to which the filter material expands and/or the degree to which the filter material is in contact with other layers. For example, the filter material of different light guides may be isolated from each other by the passivation layer. In such examples, the filter material may not contact the metal layer(s). Moreover, the passivation layer may resist expansion and/or permit some expansion while reducing generation of unwanted structural features (e.g., cracks).

The light guide 462 may be provided within surrounding material of the device base 425 (e.g., the dielectric material to form a light-guiding structure, thereby reducing crosstalk. For example, the light guide 462 may have a refractive index of about 2.0 so that the light emissions are substantially reflected at an interface between the light guide 462 and the material of the device base 425. In certain examples, the light guide 462 is configured such that the optical density (OD) or absorbance of the excitation light is at least about 4 OD. More specifically, the filter material may be selected and the light guide 462 may be dimensioned to achieve at least 4 OD. In more particular examples, the light guide 462 may achieve at least about 5 OD or at least about 6 OD.

Other approaches to reducing crosstalk may, either additionally or alternatively to the light guide 462 or other features of a biosensor 400, be used in some examples. For instance, in some versions, an array of light sensors 440 may be modeled as a two dimensional matrix, and illumination values detected by those sensors 440 may be subjected to various matrix operations to computationally derive how the light emitted from those sensors' 440 corresponding reaction sites 414 would have been measured in the absence of crosstalk. To illustrate, consider FIG. 9, which depicts a method in which a crosstalk in a N×N matrix of light sensors 440 can be counteracted by convolving an image captured by those sensors with an M×M matrix (where M<=N) referred to as a sharpening kernel.

Figure 9:
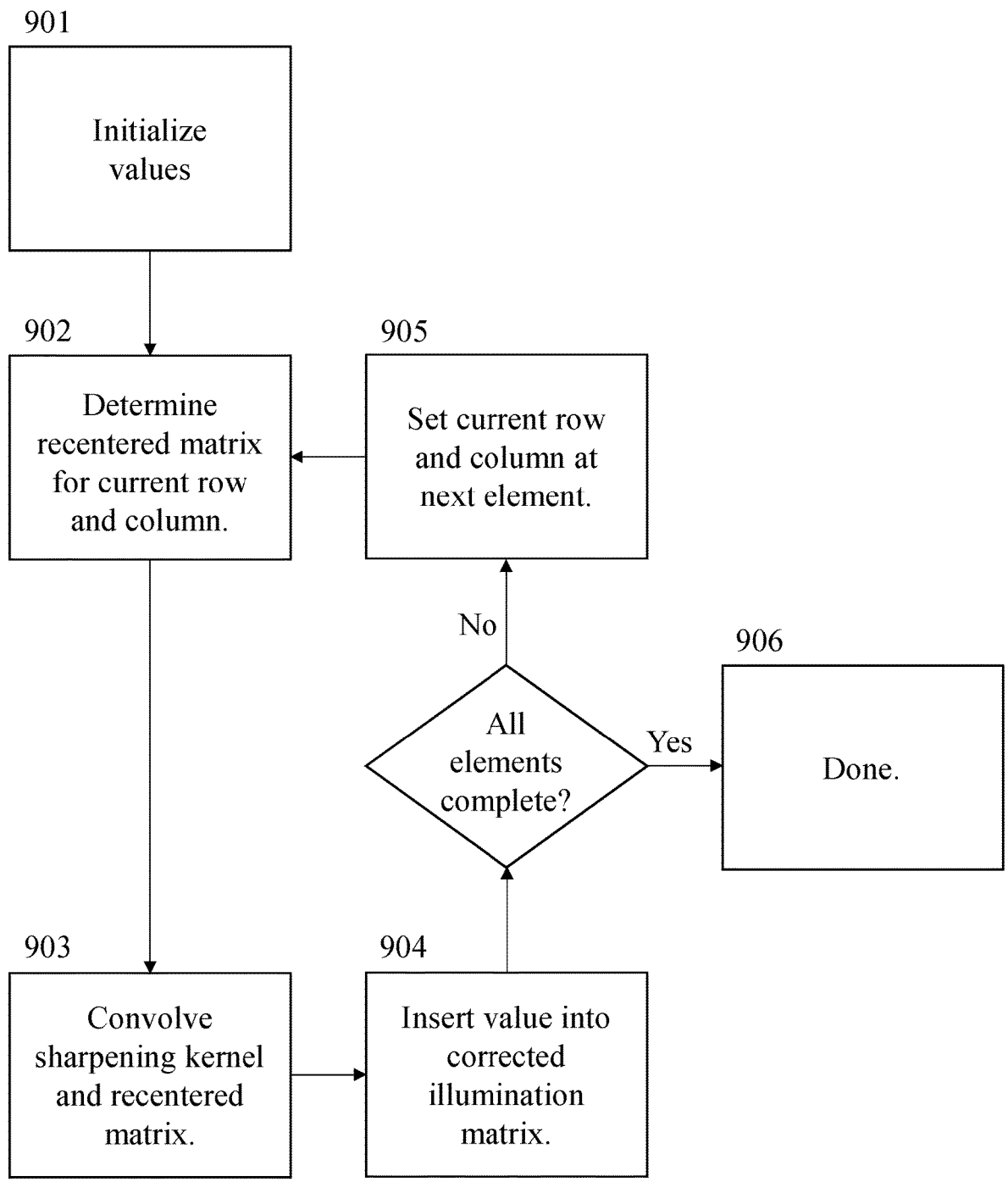
FIG. 9 illustrates a method of compensating for crosstalk.
Figure 10A:
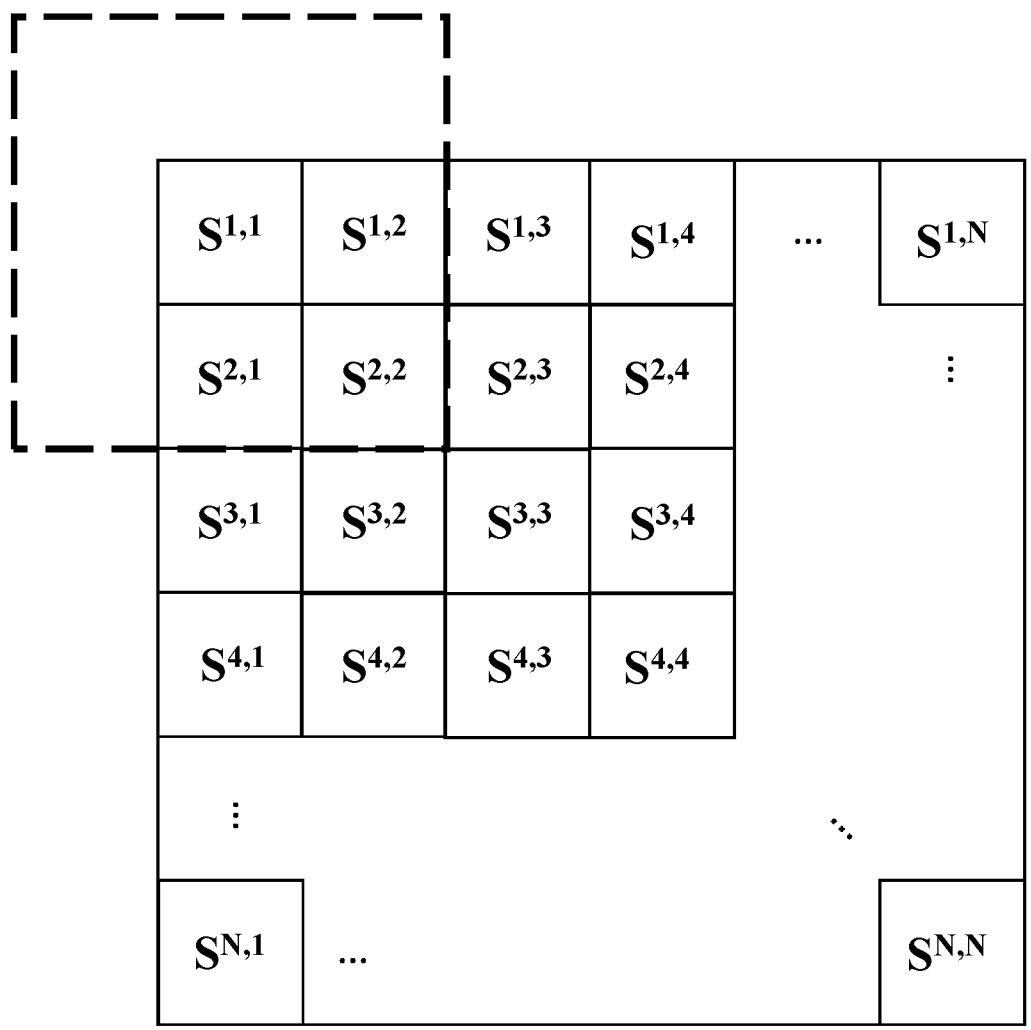

In the method of FIG. 9, values used in controlling the convolution may be initialized in block 901. This may include, for example, setting row and column variables to 1, reflecting a process which starts in the upper left corner of the light sensor matrix. After the variables have been initialized, the method of FIG. 9 continues in block 902 with determining a M×M recentered matrix which has the illumination value of the light sensor in the current row and column at its center. To consider how this recentered matrix determination could take place, consider how a 3×3 recentered matrix may be determined in two scenarios, illustrated in FIGS. 10A and 10B. In the scenario of FIG. 10A, a 3×3 recentered matrix is to be determined with the illumination value of the light sensor in the upper left corner of the N×N light sensor matrix (i.e., $S^{1,1}$) at its center. In this scenario, the illumination values from the light sensor matrix could be shifted one down and to the right, with values not present in the light sensor matrix (e.g., the value above and to the left of the value in the upper left corner of the light sensor matrix) being set to 0, resulting in the followed recentered matrix:

[0 0 0]
[0 $S^{1,1}$ $S^{1,2}$]
[0 $S^{2,1}$ $S^{2,2}$]

In the scenario of FIG. 10B, a 3×3 recentered matrix is to be determined with the illumination value from the second column of the third row of the N×N light sensor matrix (i.e., $S^{3,2}$) at its center. In this scenario, the illumination values from the light sensor matrix could be shifted up one column, resulting in the following recentered matrix:

[$S^{2,1}$ $S^{2,2}$ $S^{2,3}$]
[$S^{3,1}$ $S^{3,2}$ $S^{3,3}$]
[$S^{4,1}$ $S^{4,2}$ $S^{4,3}$]

Once the recentered matrix had been determined in block 902, the method of FIG. 9 continues with determining an illumination value for the current row and column in block 903 by convolving the recentered matrix determined in block 902 with an M×M sharpening kernel. The illumination value determined in block 903 may then be inserted into a matrix of crosstalk corrected illumination values in block 904. As an illustration of the convolution and insertion of blocks 903 and 904, consider a scenario using the following sharpening kernel:

[$K^{1,1}$ $K^{1,2}$ $K^{1,3}$]
[$K^{2,1}$ $K^{2,2}$ $K^{2,3}$]
[$K^{3,1}$ $K^{3,2}$ $K^{3,3}$]

If this sharpening kernel was used to find a value to insert into element 2,2 of the matrix of crosstalk corrected illumination values, it may be convolved with a recentered matrix having the value $S^{2,2}$ at its center by performing the following procedure:

1) flip the rows and columns of the sharpening kernel to obtain the following intermediate matrix:
[$K^{3,3}$ $K^{3,2}$ $K^{3,1}$]
[$K^{2,3}$ $K^{2,2}$ $K^{2,1}$]
[$K^{1,3}$ $K^{1,2}$ $K^{1,1}$]

2) multiply each row and column entry in that intermediate matrix by the corresponding entries in the recentered matrix as follows:

$$\left[\begin{matrix}K^{3,}_{3} & K^{3,}_{2} & K^{3,}_{1}\end{matrix}\right]\left[\begin{matrix}S^{1,}_{1} & S^{1,}_{2} & S^{1,}_{3}\end{matrix}\right] = \left[\begin{matrix}K^{3,3}*S^{1,}_{1} & K^{3,2}*S^{1,}_{2} & K^{3,1}*S^{1,}_{3}\end{matrix}\right]$$

$$\left[\begin{matrix}K^{2,}_{3} & K^{2,}_{2} & K^{2,}_{1}\end{matrix}\right]*\left[\begin{matrix}S^{2,}_{1} & S^{2,}_{2} & S^{2,}_{3}\end{matrix}\right] = \left[\begin{matrix}K^{2,3}*S^{2,}_{1} & K^{2,2}*S^{2,}_{2} & K^{2,1}*S^{2,}_{3}\end{matrix}\right]$$

$$\left[\begin{matrix}K^{1,}_{3} & K^{1,}_{2} & K^{1,}_{1}\end{matrix}\right]\left[\begin{matrix}S^{3,}_{1} & S^{3,}_{2} & S^{3,}_{3}\end{matrix}\right] = \left[\begin{matrix}K^{1,3}*S^{3,}_{1} & K^{1,2}*S^{3,}_{2} & K^{1,1}*S^{3,}_{3}\end{matrix}\right]$$

3) Add the results of the multiplication to obtain the value to insert into the matrix of the crosstalk corrected illumination values as follows:

$$I^{2,2} = K^{3,3}*S^{1,1}+K^{3,2}*S^{1,2}+K^{3,1}*S^{1,3}+K^{2,3}*S^{2,1}+K^{2,2}*S^{2,2}+K^{2,1}*S^{2,3}+K^{1,3}*S^{3,1}+K^{1,2}*S^{3,2}+K^{1,1}*S^{3,3}$$

Once the calculated value had been inserted into the crosstalk corrected illumination matrix in block 904, a check may be performed to determine if the crosstalk corrected illumination matrix had been completely populated (e.g., if all elements for columns 1 to N and rows 1 to N had been added). If the crosstalk corrected illumination matrix had not been completely populated, the process may move to the row and column corresponding to the next element in block 905. This may be done by, if the current column was less than N, incrementing the current column value by 1 and returning to block 902. Otherwise, if the current column was equal to N, then the current row could be incremented by 1, the current column value could be reset to 1, and the process could return to block 902. Alternatively, if the crosstalk corrected illumination matrix had been completely populated, the process could terminate in block 906, and the result could be provided as output, such as by storing it in a memory for later retrieval, passing it as an input to another process (e.g., a sequencing by synthesis process), displaying it on a user interface, and/or performing such other act as may be appropriate in the particular example where the process was being performed.

Figure 11:
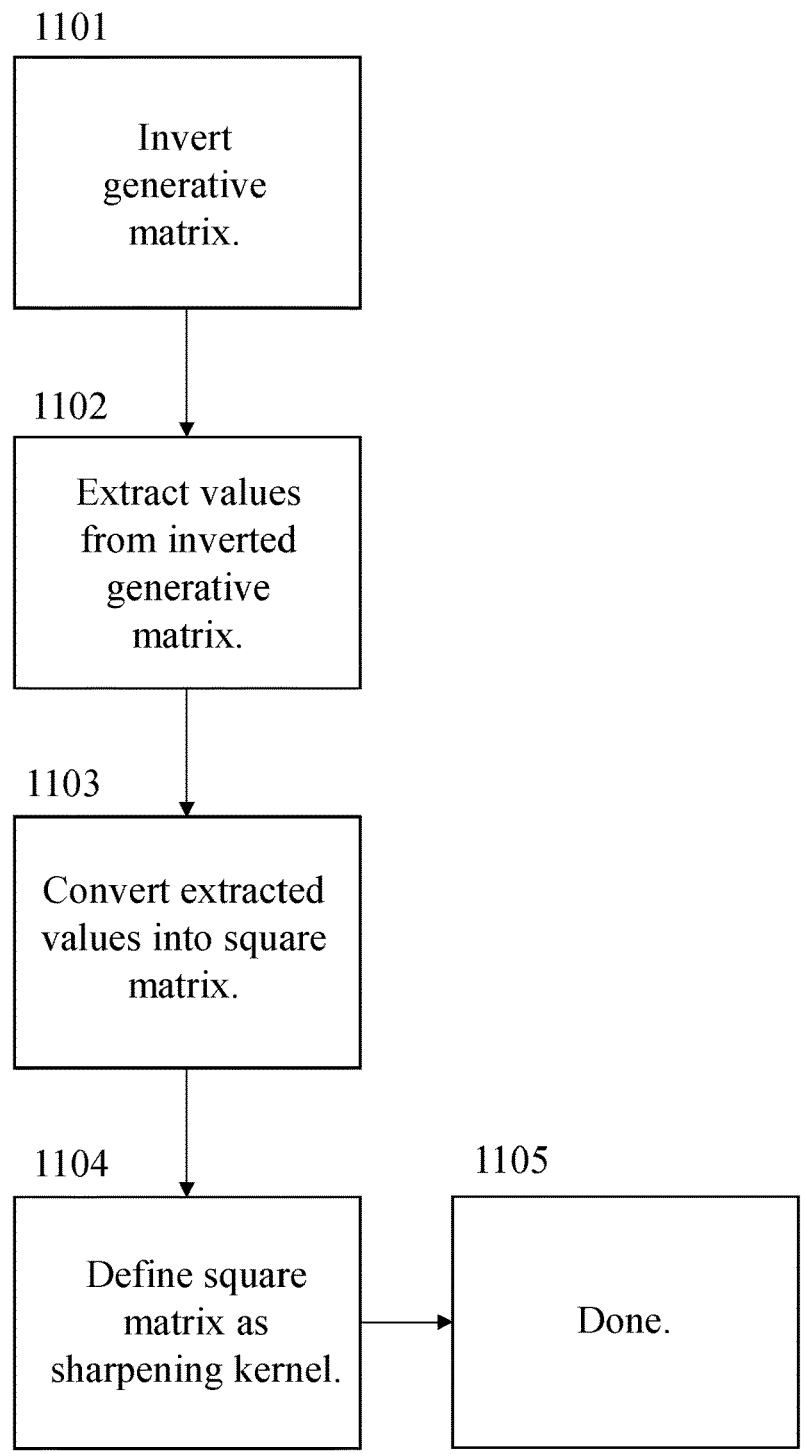
FIG. 11 illustrates a method which may be performed to generate sharpening kernels.

Turning now to FIG. 11, that figure depicts a method which may be performed to generate a sharpening kernel such as may be used in a process as described above in the context of FIG. 9. In the method of FIG. 11, a generative matrix is inverted in block 1101. This generative matrix may be a matrix which models crosstalk by mapping values for illumination emitted from reaction sites to values for illumination signals actually received at corresponding sensors. For example, in a case where a method such as shown in FIG. 11 is used to generate a sharpening kernel in the form of an M×M matrix, the generative matrix may be a $M^2 \times M^2$ matrix which, when multiplied by a flattened matrix of values for illumination emitted from an M×M array of reaction sites (i.e., $I^{1,1}$ to $I^{M,M}$) provides a flattened matrix of values for illumination signals received by an M×M array of corresponding sensors (i.e., $S^{1,1}$ to $S^{M,M}$). To illustrate this relationship, consider FIG. 12, which shows how values for illumination emitted from a 3×3 array of reaction sites 1201 may be represented in a 9×1 flattened illumination matrix 1202, and values for signals received at a corresponding 3×3 array of sensors 1203 may be represented by a 9×1 flattened signal matrix 1204. In this example, if the flattened illumination matrix 1202 is labeled $I_{9 \times 1}$ and the flattened signal matrix 1204 is labeled $S_{9 \times 1}$, then the matrix $G_{9 \times 9}$ in the following calculation may be a generative matrix that could be inverted in block 1101 of FIG. 11:

$$S_{9 \times 1} = G_{9 \times 9} \times I_{9 \times 1}$$

Continuing with the discussion of FIG. 11, after the generative matrix has been inverted, a set of $M^2$ values may be extracted from the inverted generative matrix in block 1102. For example, in a case where the generative matrix is $G_{9 \times 9}$ from the previous illustration the extraction of values may be performed by extracting the middle row from the matrix obtained by inverting $G_{9 \times 9}$. Then, in block 1103, the extracted values may be converted into a M×M square matrix. To illustrate, if the inverse of the generative matrix is the following 9×9 matrix IG

[$IG^{1,1}$ $IG^{1,2}$ $IG^{1,3}$ $IG^{1,4}$ $IG^{1,5}$ $IG^{1,6}$ $IG^{1,7}$ $IG^{1,8}$ $IG^{1,9}$]

[$IG^{2,1}$ $IG^{2,2}$ $IG^{2,3}$ $IG^{2,4}$ $IG^{2,5}$ $IG^{2,6}$ $IG^{2,7}$ $IG^{2,8}$ $IG^{2,9}$]

[$IG^{3,1}$ $IG^{3,2}$ $IG^{3,3}$ $IG^{3,4}$ $IG^{3,5}$ $IG^{3,6}$ $IG^{3,7}$ $IG^{3,8}$ $IG^{3,9}$]

[$IG^{4,1}$ $IG^{4,2}$ $IG^{4,3}$ $IG^{4,4}$ $IG^{4,5}$ $IG^{4,6}$ $IG^{4,7}$ $IG^{4,8}$ $IG^{4,9}$]

-continued $[IG^{5,1}\ IG^{5,2}\ IG^{5,3}\ IG^{5,4}\ IG^{5,5}\ IG^{5,6}\ IG^{5,7}\ IG^{5,8}\ IG^{5,9}]$ $[IG^{6,1}\ IG^{6,2}\ IG^{6,3}\ IG^{6,4}\ IG^{6,5}\ IG^{6,6}\ IG^{6,7}\ IG^{6,8}\ IG^{6,9}]$ $[IG^{7,1}\ IG^{7,2}\ IG^{7,3}\ IG^{7,4}\ IG^{7,5}\ IG^{7,6}\ IG^{7,7}\ IG^{7,8}\ IG^{7,9}]$ $[IG^{8,1}\ IG^{8,2}\ IG^{8,3}\ IG^{8,4}\ IG^{8,5}\ IG^{8,6}\ IG^{8,7}\ IG^{8,8}\ IG^{8,9}]$ $[IG^{9,1}\ IG^{9,2}\ IG^{9,3}\ IG^{9,4}\ IG^{9,5}\ IG^{9,6}\ IG^{9,7}\ IG^{9,8}\ IG^{9,9}]$ then the extraction of values in block 1102 may extract the middle row from IG as follows:

$[IG^{5,1}\ IG^{5,2}\ IG^{5,3}\ IG^{5,4}\ IG^{5,5}\ IG^{5,6}\ IG^{5,7}\ IG^{5,8}\ IG^{5,9}]$

That extracted row may then be converted into a square matrix in block 1103 by setting the first three elements as the first row of the square matrix, the second three elements as the second row, and the third three elements as the third row, resulting in the following square matrix:

$[IG^{5,1}\ IG^{5,2}\ IG^{5,3}]$
$[IG^{5,4}\ IG^{5,5}\ IG^{5,6}]$
$[IG^{5,7}\ IG^{5,8}\ IG^{5,9}]$

This general approach may be generalized to other sizes of inverse generative matrix by extracting a row of length $M^2$, and converting every M elements in that row into a row in the new square matrix until the entire M×M square matrix had been populated.

After the square matrix had been created at block 1103, that matrix could be stored as the sharpening kernel at block 1104. The process of FIG. 11 may then complete in block 1105, and the sharpening kernel generated in performing the process may then be used to compensate for crosstalk in a process such as discussed previously in the context of FIG. 9.

Figure 13:
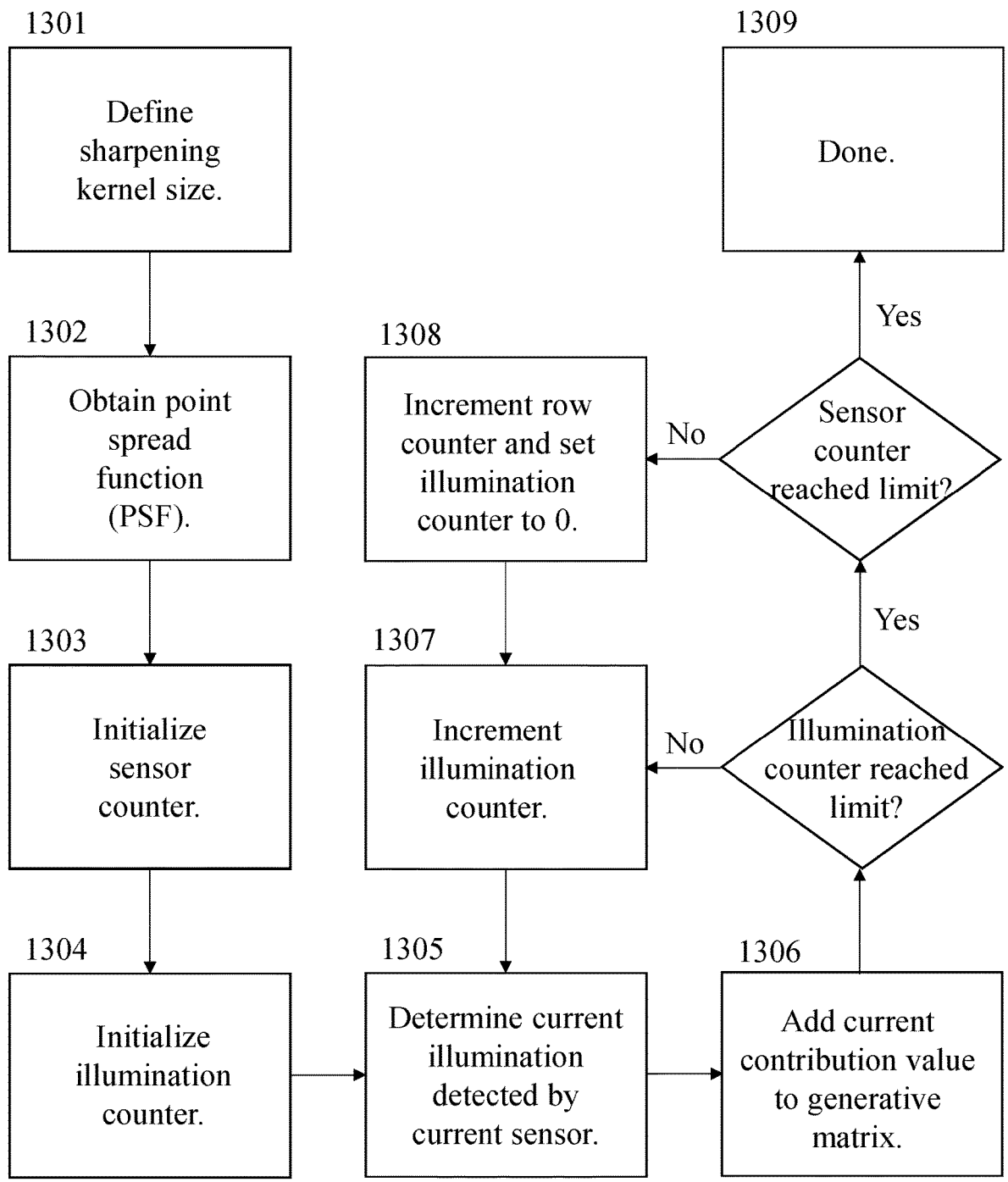
FIG. 13 illustrates a process which may be used to create a generative matrix.

Turning now to FIG. 13, that figure illustrates a process which may be used to create a generative matrix such as may be used in a process as illustrated in FIG. 11. Initially, in block 1301, the desired size of the ultimate sharpening kernel is defined. In some examples, this may be performed because there may be a relationship between the size of a generative matrix to be defined in the process of FIG. 13, and the size of the sharpening kernel that that generative matrix would be used to create. For example, if the sharpening kernel is to compensate for crosstalk in a pixel by looking at its closest neighbors, then the sharpening kernel may be a 3×3 matrix, and the generative matrix may be a 9×9 matrix. Similarly, if the sharpening kernel is to compensate for crosstalk by looking at a pixel's 2 closest neighbors, then the sharpening kernel may be a 5×5 matrix, and the generative matrix may be a 25×25 matrix. In general, if the ultimate sharpening kernel is to have size M×M, then the generative matrix may be of size $M^2 \times M^2$, and so the definition of sharpening kernel size in block 1301 may be used in setting the parameters of the generative matrix that would be created.

Continuing with the discussion of FIG. 13, after the sharpening kernel size had been defined in block 1301, a point spread function (PSF) would be obtained in block 1302. This PSF may be a O×O matrix (where the value O defining the length of the sides of the PSF may or may not be equal to the value M defining the length of the sides of the sharpening kernels) which shows what portion of the light that would be captured by a sensor in the absence of crosstalk is actually captured by that sensor and its surrounding sensors as a result of crosstalk. For example, in a case where a reaction site has only a single corresponding sensor, but, as a result of crosstalk, only 32% of the illumination emitted from that reaction site is detected by the corresponding sensor, 11% is detected at each of the sensor's horizontal and vertical neighbors, and 6% is detected at each of the sensor's diagonal neighbors, the PSF may be as follows:

[0.06 0.11 0.06]
[0.11 0.32 0.11]
[0.06 0.11 0.06]

Such a PSF may be obtained in a variety of manners. For example, a test structure may be used that blocks the light from all but one of the reaction sites in an array, and the illumination values detected by the sensor corresponding to the unblocked site and that sensor's neighbors may be treated as the values for the PSF. Other approaches, such as treating an illumination value from a sensor which detects an isolated signal during an imaging run as the equivalent to the illumination value detected by a sensor corresponding to an unblocked reaction site in the light blocking approach, may also be possible, and could be implemented by those of ordinary skill in the art without undue experimentation in light of this disclosure.

After the PSF has been obtained, an outer loop may be launched by initializing a sensor counter in block 1303. This may be done, for example, by setting a row counter that could be used to iterate through the rows of a flattened M×1 sensor matrix (e.g., matrix $S_{9 \times 1}$ from the example of FIG. 12) to 1. Then, in block 1304, an inner loop may be launched by initializing an illumination counter. This may be done, for example, by setting a second row counter that could be used to iterate through the rows of a flattened M×1 illumination matrix (e.g., matrix $I_{9 \times 1}$ from the example of FIG. 12) to 1. With both loops initialized, the process of FIG. 13 may continue in block 1305 by determining the portion of the illumination emitted from the reaction site corresponding to the current illumination counter that would be detected by the sensor corresponding to the current sensor counter.

Figure 12:
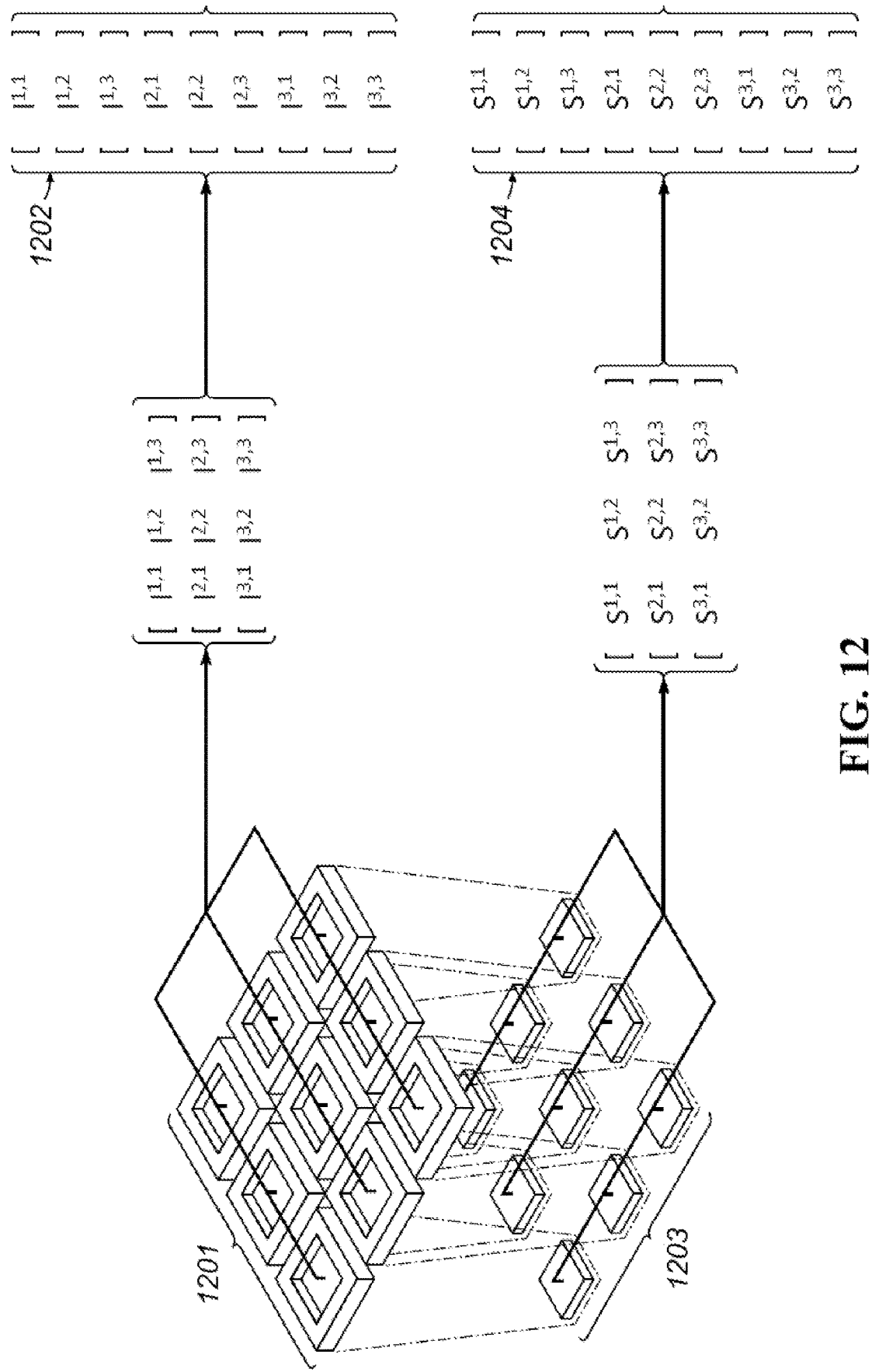
FIG. 12 illustrates how values for illumination emitted from reaction sites and detected by sensors may be represented in flattened matrices.

To illustrate how the determination of block 1305 may take place, consider the value $S^{1,1}$ from the example of FIG. 12. In the absence of crosstalk, the value of $S^{1,1}$ may simply be equal to $1^{1,1}$—i.e., the illumination emitted from the reaction site corresponding to the sensor where $S^{1,1}$ is measured. However, where crosstalk is present, that sensor may not receive all illumination from its corresponding reaction site, and may instead receive contributions from illumination emitted by neighboring reaction sites. In the case of the following 3×3 PSF $[a_{tl}\ a_t\ a_{tr}]$
$[a_l\ c\ a_r]$
$[a_{bl}\ a_b\ a_{br}]$ The contribution from $I^{1,1}$ may only be $I^{1,1}*c$, since the value c in the PSF may be less than 1 to reflect that only a portion (specifically, the portion c) of the light emitted by a reaction site is detected by that reaction site's corresponding sensor. The contribution from $I^{1,2}$ may be $I^{1,2}*a_l$, because the reaction site that emitted $I^{1,1}$ is the left neighbor of the reaction site that emitted $I^{1,2}$, and the PSF specifies that the portion of the illumination from a reaction site that is detected by the sensor that is the left neighbor of that reaction site's corresponding sensor $a_l$. For similar reasons, the contributions from $I^{2,1}$ and $I^{2,2}$ may be, respectively, $I^{2,1}*a_t$ and $I^{2,2}*a_{tl}$. As a result, the actual value for $S^{1,1}$ may be expressed as $S^{1,1}=I^{1,1}*c+I^{1,2}*a_l+I^{2,1}*a_t+I^{2,2}*a_{tl}$.

To complete this illustration, consider how the scenario described in the preceding paragraph may be applied to the exemplary method of FIG. 13. In this case, when the sensor and illumination counters are both equal to 1 (e.g., on the first iteration), the current illumination detected by the current sensor may be c, because the current sensor (i.e., the sensor which detects signal $S^{1,1}$, which is the element in the first row of matrix $S_{9\times 1}$) would only receive the portion c of the illumination emitted by the current reaction site (i.e., the reaction site which emits value $I^{1,1}$, which is the element in the first row of matrix $I_{9\times 1}$). When the sensor counter is equal to 1 and the illumination counter is equal to 2, the current illumination detected by the current sensor may be $a_l$, because the current sensor is the left neighbor of the sensor that corresponds to the current reaction site (i.e., the reaction site that emits $I^{1,2}$, which is element 2 in the matrix $I^{9\times 1}$). For similar reasons, when the sensor counter is equal to 1 and the illumination counter is equal to 4, the current illumination detected by the current sensor may be $a_t$ and when the sensor counter is equal to 1 and the illumination counter is equal to 5, the current illumination detected by the current sensor may be $a_{tl}$. In this example, on all other iterations where the current sensor counter is equal to 1, the current illumination detected by the current sensor may be 0, since, with a 3×3 PSF, a sensor may only detect illumination emitted from its corresponding reaction site and that site's direct neighbors. However, in other examples, this may not be the case. For example, if the PSF was a 5×5 PSF, then illumination from other reaction sites (e.g., illumination from the reaction site that emits $I^{1,3}$) may also make a contribution, and so the values determined on iterations corresponding to those reaction sites in such examples may not be zero.

Once the contribution of the current illumination to the value detected by the current sensor had been determined, in block 1306, the value of that contribution may be inserted into the generative matrix. For example, when the method of FIG. 13 is used to create a M×M sharpening kernel, the insertion of block 1306 may be accomplished by adding the contribution value to an $M^2 \times M^2$ generative matrix at a row position equal to the current sensor counter value, and a column position equal to the current illumination counter value. After the value has been inserted into the generative matrix, a check may be performed to determine if the current illumination counter had reached its limit. This may be done by comparing the illumination counter to the sharpening kernel size. For instance, if the sharpening kernel is an M×M matrix, the limit for the illumination counter may be $M^2$. If the limit had not been reached, then the illumination counter may be incremented in block 1307, and the process may loop back to make the determination of block 1305 with the new current illumination value. Alternatively, if the limit had been reached, a further check may be performed to determine if the sensor counter had reached its limit (e.g., if the sharpening kernel is to be an M×M matrix, this limit may be $M^2$). If the sensor counter had not reached its limit, then, in block 1308, the sensor counter may be incremented and the illumination counter may be set to zero, and the process may return to block 1307 to increment the illumination counter and iterate as described above. Alternatively, if the sensor counter had reached its limit, the process may terminate in block 1309, and the generative matrix created using that process may be applied to create a sharpening kernel using a process such as described above in the context of FIG. 11.

Figure 14:
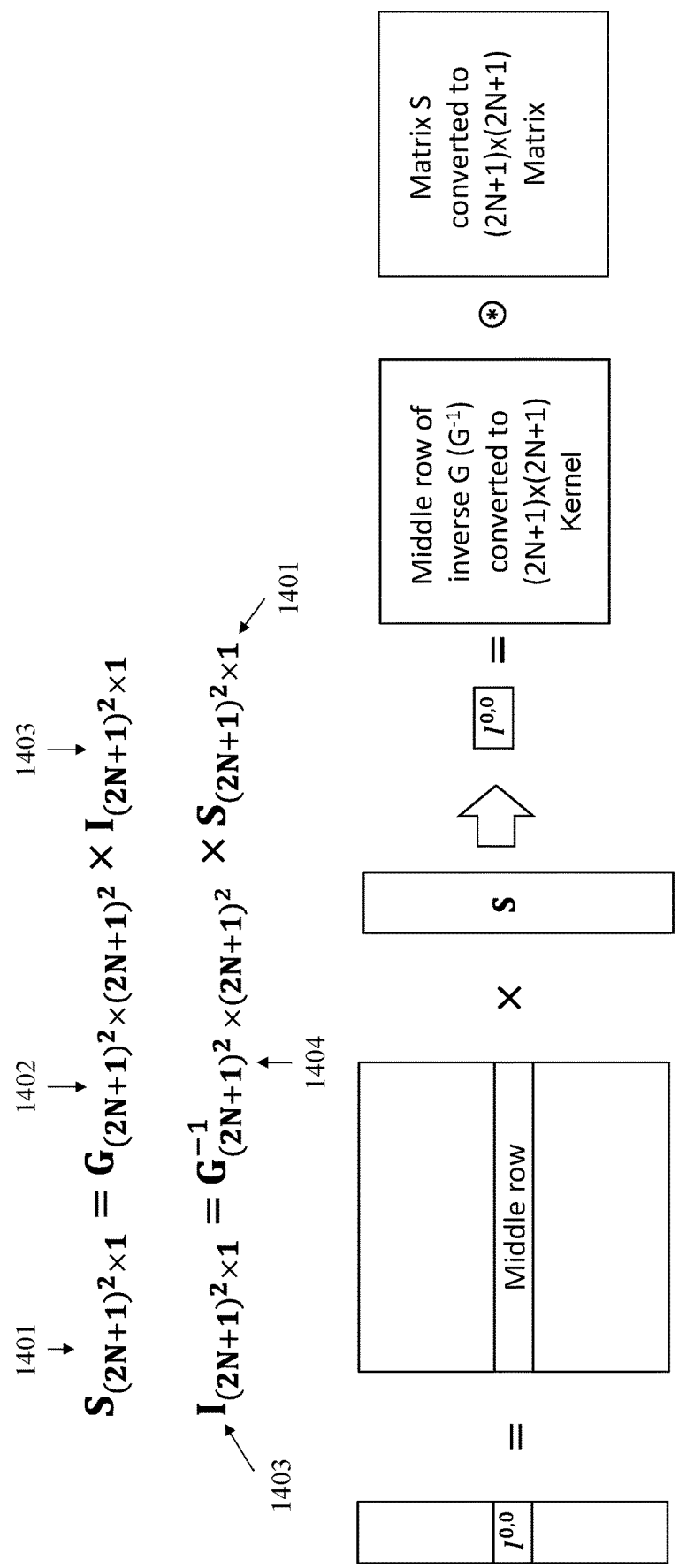
FIG. 14 illustrates how generative matrices, sharpening kernels and detected illumination values may be used to determine crosstalk corrected illumination values.

Turning now to FIG. 14, that figure illustrates mathematically how processes such as described in the context of FIGS. 9, 11 and 13 may be used in computationally correcting for inter-site crosstalk. As shown in FIG. 14, a flattened signal matrix having dimensions $(2N+1)^2 \times 1$ 1401 may be used to represent the result of multiplying a generative matrix 1402 such as could be derived using a process such as shown in FIG. 13 by a flattened illumination matrix 1403 representing the illumination values that would have been shown in the sensor matrix in the absence of crosstalk. Rewriting this relationship, the illumination values that would have been detected in the absence of crosstalk 1403 may be derived by multiplying an inverse of the generative matrix 1404 by the matrix representing the values which were actually detected 1401. Thus, individual elements of the matrix representing values that would have been detected in the absence of crosstalk (e.g., $I^{0,0}$) may be obtained by multiplying a of the inverse of the generative matrix (e.g., the middle row) by the matrix of values as actually detected. Similarly, a crosstalk corrected illumination value may be obtained by converting the middle row of the inverse of the generative matrix and the row flattened illumination matrix into square matrices, and convolving them as shown in FIG. 14.

Figure 15:
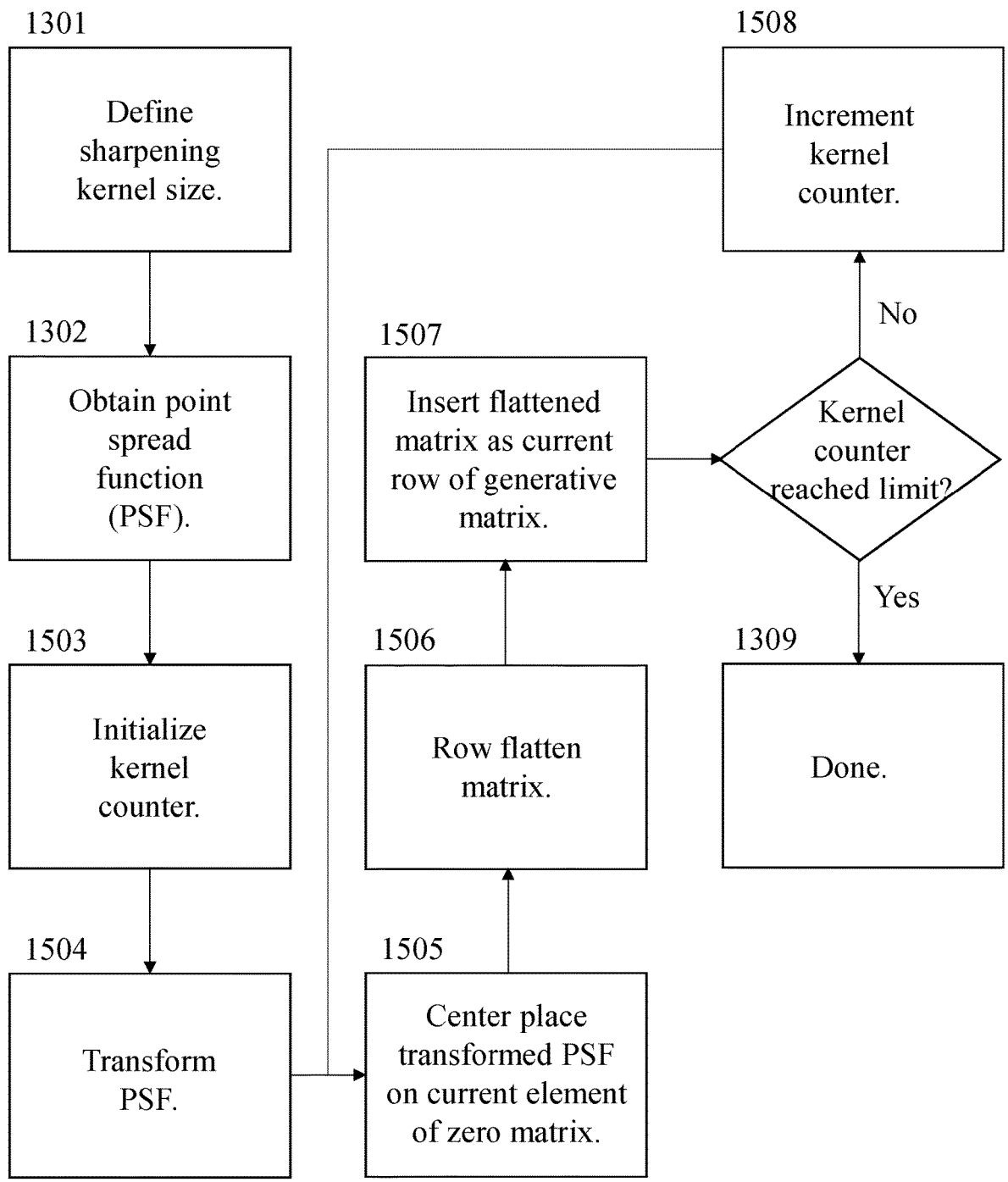
FIG. 15 illustrates a process which may be used to create a generative matrix.

It should be understood that, while the above examples have illustrated how sharpening kernels may be created and applied to counteract the impact of crosstalk, the above examples are not intended to be exclusive, and other approaches may also be possible. For instance, while FIG. 13 provided a method which may be used to create a generative matrix, other methods may also be possible. For example, FIG. 15 provides an alternate method that may be used for creating a generative matrix. The method of FIG. 15, like the method of FIG. 13, may begin with defining a sharpening kernel size and obtaining a PSF in blocks 1301 and 1302. However, in the example of FIG. 15, these steps are followed by initializing a counter in block 1503 which may be used to iterate through the elements of a matrix having the same size as the sharpening kernel that would be generated based on the generative matrix. Then, in block 1504, the PSF may be transformed in preparation for its elements to be inserted into the generative matrix. This may be performed, for example, by reflecting the elements of the PSF over that PSF's vertical and horizontal axis, an illustration of which is provided below for the PSF discussed previously in the context of FIG. 12:

$$\begin{bmatrix} a_{tl} & a_t & a_{tr} \\ a_l & c & a_r \\ a_{bl} & a_b & a_{br} \end{bmatrix} \rightarrow \begin{bmatrix} a_{br} & a_b & a_{bl} \\ a_r & c & a_l \\ a_{tr} & a_t & a_{tl} \end{bmatrix}$$

Figure 16:
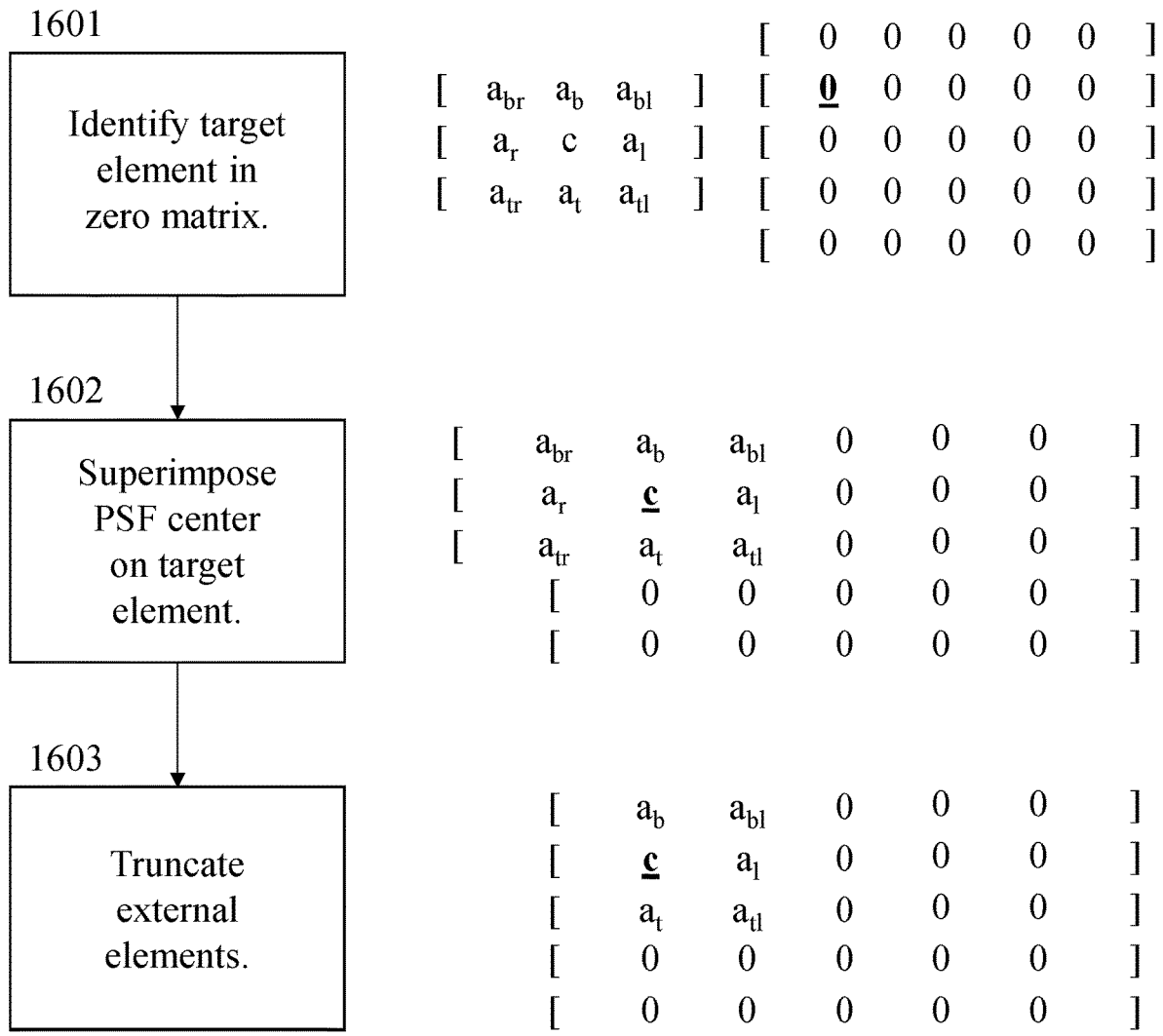
FIG. 16 illustrates how one matrix may be center placed on another.

After any applicable transformations had been performed on the PSF, the process of FIG. 15 may continue in block 1505 with center placing the transformed PSF on an element equal to the current kernel counter in a zero matrix which is the same size as the sharpening kernel whose size was defined in block 1301. An illustration of how this may be done using a transformed 3×3 PSF and 5×5 zero matrix is provided in FIG. 16. In block 1601 of that figure, the target element in the zero matrix may be identified. For example, if the target element in the 5×5 zero matrix shown in FIG. 16 is element 6, then this would be the first element in the second row of that matrix, since elements 1-5 would be the elements from the zero matrix's first row (starting from the left at element 1 and counting up to the right). Moving from the case shown in FIG. 16 where the zero matrix is 5×5 to the general case where the zero matrix is M×M, the row of the target element will generally be equal to the number of the target element divided by M and rounded up, while the column of the target element will generally be the remainder when the number of the target element is divided by M. After the target element has been identified, the PSF may be translated in block 1602 so that its center is superimposed over the target element. The portions of the PSF that fall outside of the zero matrix may then be truncated in block 1603, resulting in a square matrix some of whose elements match (a portion of) the PSF, while the remainder are zero.

Returning to the process of FIG. 15, after the transformed PSF had been center placed onto the current element in the zero matrix, the resulting matrix would be row flattened in block 1506. This may be done by concatenating the rows of the matrix obtained from block 1505 to create a single 1×M² matrix which included all of the values in a single row. In block 1507 this row flattened matrix may be inserted as the $Q^{th}$ row of the generative matrix, where Q is the value of the kernel counter at the time the insertion of block 1507 is performed. Once this insertion had been performed, a check could be made to see if the kernel counter had reached its limit. This may be done, for example, by checking if the value of the kernel counter had reached $M^2$—i.e., the number of elements in the sharpening kernel to be generated based on the generative matrix being created by the process of FIG. 15. If the kernel counter had not reached its limit, then it may be incremented in block 1508, and the process may return to center placing the transformed PSF on the new current element of the zero matrix at block 1505. Alternatively, if the kernel counter had reached its limit, then this may indicate that the generative matrix had been fully created, and, as with FIG. 13, the process may terminate in block 1309.

Other variations may also be possible. For instance, consider a case where a sharpening kernel is used to counteract crosstalk in a biosensor which is manufactured in such a way that its light sensors exhibited periodic variation in their PSFs. To illustrate, consider FIG. 17, which illustrates four PSFs, labeled odd_odd, odd_even, even-odd, and even-even. It may be the case that, in a biosensor having a rectangular array of light sensors, the PSF for all light sensors in odd rows and columns (e.g., the sensor at positions (1,1), (1,3), (1,5), (3,1), (3,3), etc.) may be odd_odd, the PSF for all light sensors in odd rows and even columns may be odd_even, the PSF for all light sensors in even rows and odd columns may be even-odd, and the PSF for all light sensors in even rows and columns may be even-even. In this type of scenario, all sensors may be treated as having a single PSF, such as by averaging the actual PSFs and applying the averaged PSF to all sensors. However, it may also be possible to account for the variation in PSFs to obtain improved crosstalk compensation. An example of how this may be done is provided in FIG. 18, discussed below.

Figure 18:
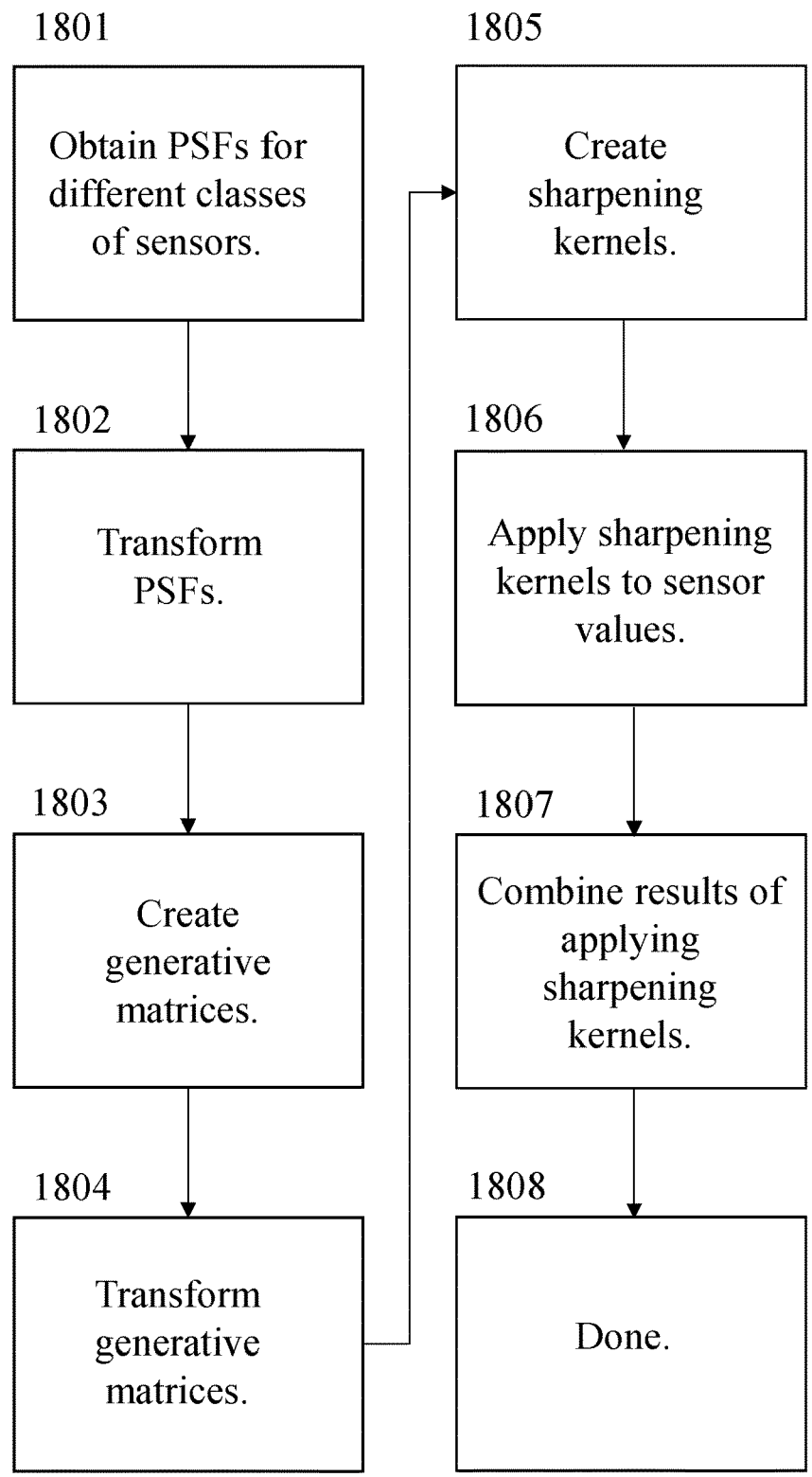
FIG. 18 illustrates a process that may be used to account for even-odd periodicity in compensating for crosstalk.

Turning now to FIG. 18, that figure illustrates a process that may be used to account for crosstalk in a sensor array exhibiting even-odd periodicity such as described above. In the method of FIG. 18, in block 1801 PSFs may be obtained for the different classes of sensors where the sharpening kernels may be used. For example, in a case where there is odd-even periodicity, this may include one PSF for sensors in odd rows and columns (i.e., $PSF_{o\text{-}o}$), one PSF for sensors in odd rows and even columns (i.e., $PSF_{o\text{-}e}$), one PSF for sensors in even rows and odd columns (i.e., $PSF_{e\text{-}o}$), and one PSF for sensors in even rows and columns (i.e., $PSF_{e\text{-}e}$). After the PSFs have been obtained, they may be transformed in block 1802. Because the sensors are part of a single array, this transformation may combine the various PSFs to reflect that the actual light detected by a sensor will be determined not only by that sensor's PSF, but also by PSFs for other sensors in that sensor's vicinity. An example of how this transformation may be implemented is provided in FIG. 19, which illustrates how four transformed PSFs may be derived from four underlying PSFs for a sensor array having even-odd periodicity.

Figure 19:
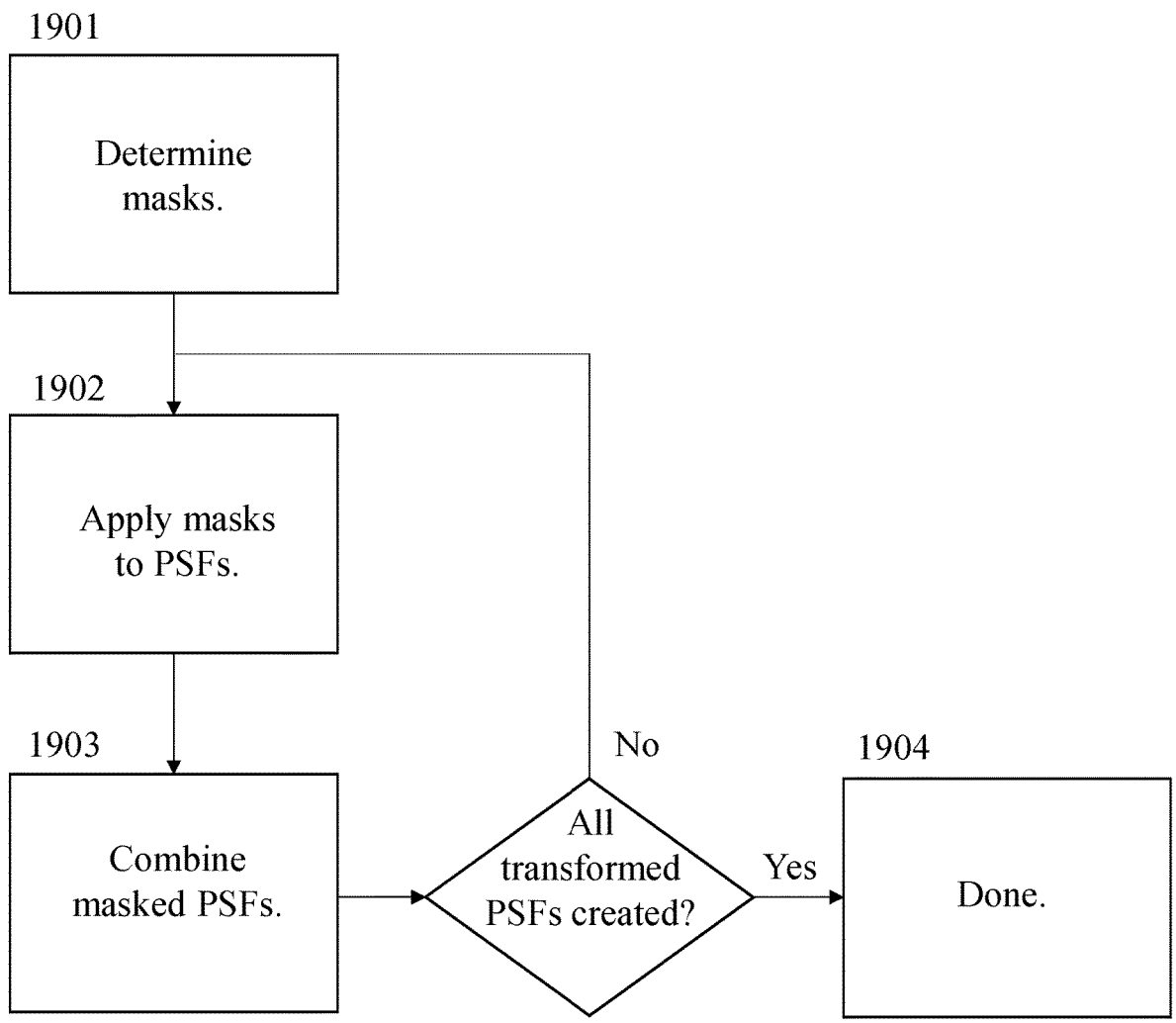
FIG. 19 illustrates how transformed point spread functions may be derived from underlying point spread functions for an array of sensors having even-odd periodicity.

In the example of FIG. 19, in block 1901 masks may be determined with characteristics based on the size of the PSFs. In some examples, these masks may comprise four masks which, for the sake of convenience are referred to as mask_self, mask_opos, mask_row and mask_col. In such an example, the masks may be matrices having the same dimensions as the PSFs, and element values defined as follows:

TABLE 1 potential mask definitions.

If the length of a side of a PSF is 2N + 1, and N is odd then:

mask_self  Elements at odd rows and columns are 1, other elements are 0
mask_opos  Elements at even rows and columns are 1, other elements are 0
mask_row   Elements at even rows and odd columns are 1, other elements are 0
mask_col   Elements at odd rows and even columns are 1, other elements are 0

If the length of a size of a PSF is 2N + 1, and N is even, then:

mask_self  Elements at even rows and columns are 1, other elements are 0
mask_opos  Elements at odd rows and columns are 1, other elements are 0
mask_row   Elements at odd rows and even columns are 1, other elements are 0
mask_col:  Elements at even rows and odd columns are 1, other elements are 0

In the example of FIG. 19, after the masks had been determined, those masks may be applied to the PSFs for the different classes of sensors in block 1902, and the results of that masking may be combined into a transformed PSF in block 1903, and this may be repeated until a transformed PSF had been created for each class of sensor and the process could terminate 1904. As an example of how this may take place, table 2, below provides equations which may be used to calculate four transformed PSFs—i.e., $PSF_{o\text{-}o}T$, $PSF_{o\text{-}e}T$, $PSF_{e\text{-}o}T$, and $PSF_{e\text{-}e}T$.

TABLE 2 potential PSF transformations (note that in table 2 * refers to element-wise multiplication)

| | |
|---|---|
| $PSF_{o\text{-}o}T =$ | $PSF_{o\text{-}o}$*mask_self + $PSF_{e\text{-}e}$*mask_opos + $PSF_{o\text{-}e}$*mask_row + $PSF_{e\text{-}o}$*mask col |
| $PSF_{o\text{-}e}T =$ | $PSF_{o\text{-}e}$*mask_self + $PSF_{e\text{-}o}$*mask_opos + $PSF_{o\text{-}o}$*mask_row + $PSF_{e\text{-}e}$*mask col |
| $PSF_{e\text{-}o}T =$ | $PSF_{e\text{-}o}$*mask_self + $PSF_{o\text{-}e}$*mask_opos + $PSF_{e\text{-}e}$*mask_row + $PSF_{o\text{-}o}$*mask col |
| $PSF_{e\text{-}e}T =$ | $PSF_{e\text{-}e}$*mask_self + $PSF_{o\text{-}o}$*mask_opos + $PSF_{e\text{-}o}$*mask_row + $PSF_{o\text{-}e}$*mask col |

Additionally, tables 3-5 illustrate how equations of table 2 could be applied to a set of exemplary PSFs to obtain the transformed PSF $PSF_{o\text{-}o}T$.

TABLE 3 exemplary PSFs $PSFo\text{-}o = \begin{bmatrix} o\text{-}o_{tl} & o\text{-}o_t & o\text{-}o_{tr} \\ o\text{-}o_l & o\text{-}o_c & o\text{-}o_r \\ o\text{-}o_{bl} & o\text{-}o_b & o\text{-}o_{br} \\ e\text{-}o_{tl} & e\text{-}o_t & e\text{-}o_{tr} \end{bmatrix}$  $PSFo\text{-}e = \begin{bmatrix} o\text{-}e_{tl} & o\text{-}e_t & o\text{-}e_{tr} \\ o\text{-}e_l & o\text{-}e_c & o\text{-}e_r \\ o\text{-}e_{bl} & o\text{-}e_b & o\text{-}e_{br} \\ o\text{-}e_{tl} & e\text{-}e_t & e\text{-}e_{tr} \end{bmatrix}$ TABLE 3-continued exemplary PSFs $$PSFe\text{-}o = \begin{bmatrix} e\text{-}o_{tl} & e\text{-}o_c & e\text{-}o_r \\ e\text{-}o_{bl} & e\text{-}o_b & e\text{-}o_{br} \end{bmatrix} \quad PSFe\text{-}e = \begin{bmatrix} e\text{-}e_l & e\text{-}e_c & e\text{-}e_r \\ e\text{-}e_{bl} & e\text{-}e_b & e\text{-}e_{br} \end{bmatrix}$$

TABLE 4 exemplary masks $$\text{mask\_opos} = \begin{bmatrix} 1 & 0 & 1 \\ 0 & 0 & 0 \\ 1 & 0 & 1 \end{bmatrix} \quad \text{mask\_col} = \begin{bmatrix} 0 & 1 & 0 \\ 0 & 0 & 0 \\ 0 & 1 & 0 \end{bmatrix}$$

$$\text{mask\_self} = \begin{bmatrix} 0 & 0 & 0 \\ 0 & 1 & 0 \\ 0 & 0 & 0 \end{bmatrix} \quad \text{mask\_row} = \begin{bmatrix} 0 & 0 & 0 \\ 1 & 0 & 1 \\ 0 & 0 & 0 \end{bmatrix}$$

TABLE 5

Exemplary calculations for deriving transformed PSF.

$$PSFo\text{-}o^*\text{mask\_self} = \begin{bmatrix} 0 & 0 & 0 \\ 0 & o\text{-}o_c & 0 \\ 0 & 0 & 0 \end{bmatrix}$$

$$PSFe\text{-}e^*\text{mask\_opos} = \begin{bmatrix} e\text{-}e_{tl} & 0 & e\text{-}e_{tr} \\ 0 & 0 & 0 \\ e\text{-}e_{bl} & 0 & e\text{-}e_{br} \end{bmatrix}$$

$$PSFo\text{-}e^*\text{mask\_row} = \begin{bmatrix} 0 & 0 & 0 \\ e\text{-}e_l & 0 & e\text{-}e_r \\ 0 & 0 & 0 \end{bmatrix}$$

$$PSFe\text{-}o^*\text{mask\_col} = \begin{bmatrix} 0 & e\text{-}o_t & 0 \\ 0 & 0 & 0 \\ 0 & e\text{-}o_b & 0 \end{bmatrix}$$

$$PSF_{o\text{-}o}T = \begin{bmatrix} e\text{-}e_{tl} & e\text{-}o_t & e\text{-}e_{tr} \\ o\text{-}e_l & o\text{-}o_c & o\text{-}e_r \\ e\text{-}e_{bl} & o\text{-}e_b & e\text{-}e_{br} \end{bmatrix}$$

Continuing with the discussion of FIG. 18, after the PSFs had been transformed, those transformed PSFs may be used to create corresponding generative matrices in block 1803. This may be done, for example, by applying a process such as described in the context of FIG. 13 or FIG. 14 to each of the transformed PSFs to obtain a generative matrix. Concretely, this may be represented as a set of procedures along the lines of those set forth below in table 6.

TABLE 6

Exemplary generative matrix procedures.

| | |
|---|---|
| $G_{e\text{-}e} =$ | create_generative_matrix($PSF_{e\text{-}e}T$) |
| $G_{e\text{-}o} =$ | create_generative_matrix($PSF_{e\text{-}o}T$) |
| $G_{o\text{-}o} =$ | create_generative_matrix($PSF_{o\text{-}o}T$) |
| $G_{o\text{-}e} =$ | create_generative_matrix($PSF_{o\text{-}e}T$) |

Those generative matrices may then be transformed in a manner similar to that described for the PSFs to create transformed generative matrices in block 1804. For instance, in some examples, four transformed generative matrices, referred to for convenience as Go-oT, Go-eT, Ge-oT, and Ge-eT, may be created using the calculations shown below in table 7.

TABLE 7

Exemplary generative matrix transformations

| | |
|---|---|
| $G_{o\text{-}o}T =$ | $G_{o\text{-}o}$*mask_self + $G_{e\text{-}e}$*mask_opos + $G_{o\text{-}o}$*mask_row + $G_{e\text{-}o}$*mask_col |
| $G_{o\text{-}e}T =$ | $G_{o\text{-}e}$*mask_self + $G_{e\text{-}o}$*mask_opos + $G_{o\text{-}o}$*mask_row + $G_{e\text{-}e}$*mask_col |
| Ge-oT = | Ge-o*mask_self + Go-e*mask_opos + Ge-e*mask_row + Go-o*mask_col |
| $G_{e\text{-}e}T =$ | $G_{e\text{-}e}$*mask_self + $G_{o\text{-}o}$*mask_opos + $G_{e\text{-}o}$*mask_row + $G_{o\text{-}o}$*mask_col |

After the transformed generative matrices have been created, those transformed generative matrices may be used in block 1805 to create sharpening kernels. This may be done by applying a process such as described previously in the context of FIG. 11, and may be concretely represented as a set of procedures along the lines set forth below in table 8:

TABLE 8

Exemplary sharpening kernel creation.

| | |
|---|---|
| $K_{e\text{-}e} =$ | create_sharpening_kernel($G_{e\text{-}e}T$) |
| $K_{e\text{-}o} =$ | create_sharpening_kernel($G_{e\text{-}o}T$) |
| $K_{o\text{-}o} =$ | create_sharpening_kernel($G_{o\text{-}o}T$) |
| $K_{o\text{-}e} =$ | create_sharpening_kernel($G_{o\text{-}e}T$) |

In block 1806, those sharpening kernels may be applied to values captured from an array of sensors using a process such as shown in FIG. 9, and the resulting sets of values may be combined to obtain a final crosstalk corrected set of values in block 1807. This may be done in a manner similar to what was described above for creating transformed PSFs and generative matrices. For instance, if signals from an N×N set of sensors are referred to as an "image," $\text{mask}_{o\text{-}o}$ is a square matrix in which elements at odd rows and columns are 1 and other elements are 0, $\text{mask}_{o\text{-}e}$, is a square matrix in which elements at odd rows and even columns are 1 and other elements are 0, $\text{mask}_{e\text{-}o}$ is a square matrix in which elements at even rows and odd columns are 1 and other elements are 0, and $\text{mask}_{e\text{-}e}$ is a square matrix in which elements at even rows and columns are 1 and other elements are 0, then the processes of blocks 1806 and 1807 may be represented by the following:

TABLE 9 calculations for creating sharpened image.

| | |
|---|---|
| $\text{image}_{o\text{-}o} =$ | convolve(Ko-o) |
| $\text{image}_{o\text{-}e} =$ | convolve(Ko-e) |
| $\text{image}_{e\text{-}o} =$ | convolve(Ke-o) |
| $\text{image}_{e\text{-}e} =$ | convolve(Ke-e) |
| image_sharpened = | $\text{image}_{o\text{-}o}$*$\text{mask}_{o\text{-}o}$ + $\text{image}_{o\text{-}e}$*$\text{mask}_{o\text{-}e}$ + $\text{image}_{e\text{-}o}$*$\text{mask}_{e\text{-}o}$ + $\text{imag}_{e\text{-}e}$*$\text{mask}_{e\text{-}e}$ |

Finally, after the final image had been created, the process of FIG. 18 may terminate in block 1808.

Another example of a type of variation which may exist between applications of aspects of the disclosed technology is variation in structure of implementation. For example, in some cases, the application of sharpening kernels such as described above may be performed in the context of a process illustrated in FIG. 20 and referred to as primary analysis or real time analysis on a bioassay system 100 itself.

In this type of process, in block 2001, signals are detected at light sensors, e.g., light sensors 440 of a biosensor 400. In block 2002, those signals are matched to sites. This may be performed in a variety of manners. For example, as noted in U.S. Patent Publ. No. 2020/0080142, the disclosure of which is hereby incorporated by reference in its entirety, a location template may be generated and used to register reaction sites with captured signals. Similarly, either in addition to, or as an alternative to, this type of registration, block 2002 may also include computationally correcting inter-site crosstalk using processes such as described above in the context of FIG. 9, so as to reduce the impact of light emitted from one reaction site on the signal associated with other reaction sites in its immediate vicinity. The intensities of the various signals may then be extracted in block 2003, for example, by detecting regions in an inter-site crosstalk corrected image where signals exceeding a specified background intensity are detected. These extracted intensities may then be subjected to further correction in block 2004, such as through correction of inter-channel crosstalk as described in U.S. Pat. No. 10,304,189 and U.S. Patent Publ. No. 2020/0080142, each of which is incorporated by reference in its entirety. Once all necessary corrections had been applied, they may be used in block 2005 for determining base calls. This base call information may then be outputted in the form abase call files storing nucleic acid (DNA, RNA) sequencing information, and, at block 2006, the process of FIG. 20 may terminate.

However, even when the application of sharpening kernels such as described above is performed as part of real time analysis by a bioassay system, other aspects of the disclosed technology may be performed in other manners. In some cases, preparatory steps for the application of sharpening kernels, may also be performed on a bioassay system, such as through identifying one or more PSF(s) using data gathered from a sample, such as through identification of isolated signals, then using those PSF(s) to create a generative matrix (or generative matrices) and deriving sharpening kernels form those generative matrices. In other cases, a manufacturer of a biosensor may obtain PSFs, use them to create generative matrices and sharpening kernels, and store the sharpening kernels in memory on a biosensor. Later, when the biosensor was used for analyzing a substance, those sharpening kernels may be applied using the biosensor's circuitry to obtain crosstalk corrected values which may then be provided to (and applied by) the controller of a bioassay system.

Figure 23:
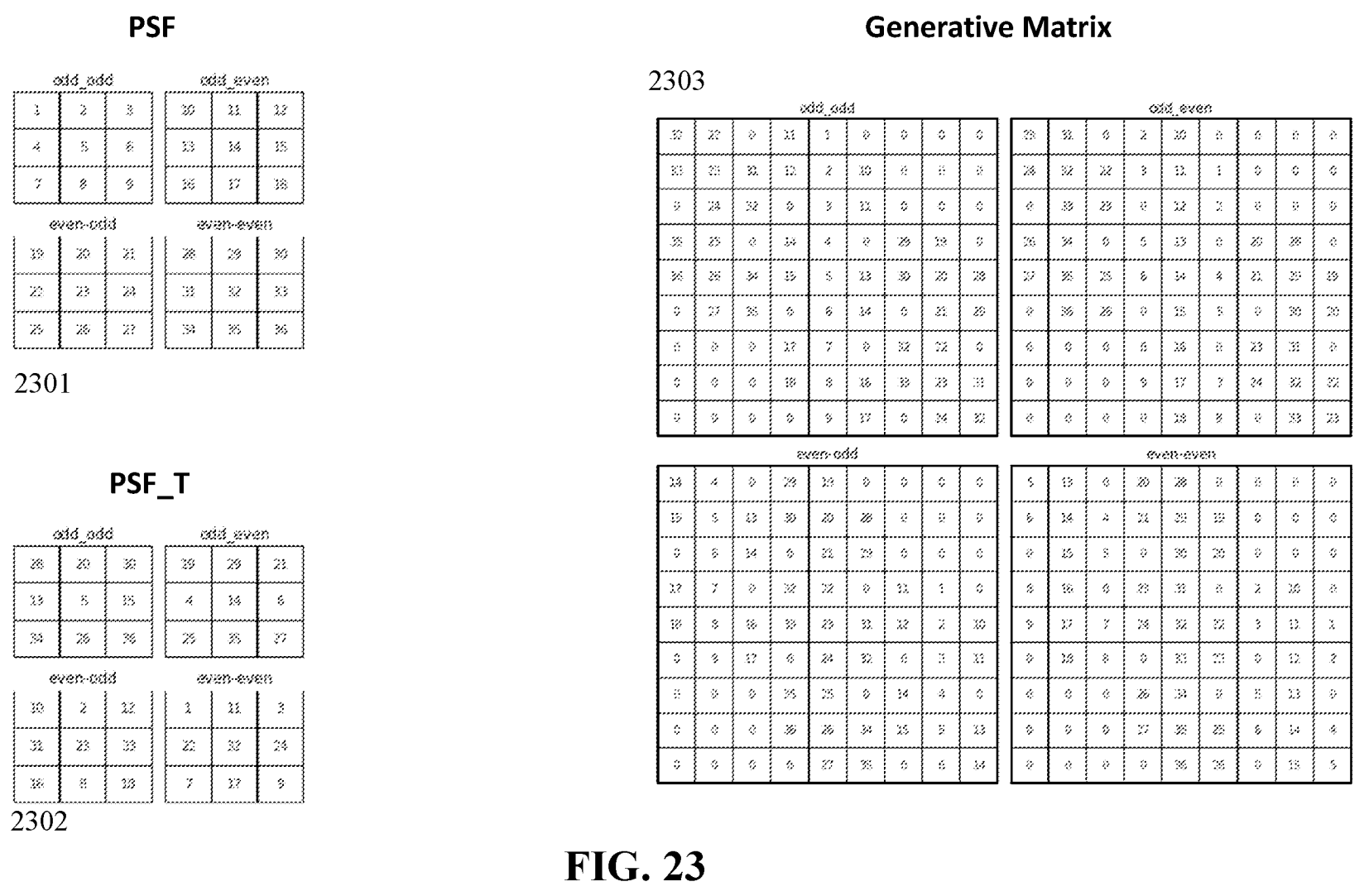

As another type of variation, in some examples, rather than using processes such as shown and described above for determining generative matrices and sharpening kernels, in some implementations, template generative matrices that could be used to derive different types of sharpening kernels from different types of PSFs may be created, and those templates may then be to create sharpening kernels once appropriate PSFs are available. Examples of these types of templates are provided in FIGS. 21-23. In FIG. 21, an example 3×3 PSF 2101 is provided, with its values labeled starting in the upper left with 1 and ending in the lower right with 9. Also shown is a template 9×9 generative matrix 2012 that could be derived from that PSF (e.g., using processes such as described previously) for the creation of 3×3 sharpening kernels, with the elements in the template generative matrix labeled showing where the values from the PSF would be inserted into the generative matrix once they were available. FIG. 22 is similar with an example 5×5 PSF 2201 being provided with elements labeled in manner similar to that described for the example 3×3 PSF 2101 in FIG. 21, and a template 25×25 generative matrix 2202 being provided showing where the elements from a PSF could be inserted into an actual generative matrix once they were available. FIG. 23 provides similar templates for creating sharpening 3×3 kernels for an array of sensors having even-odd periodicity. In FIG. 23 a set of 3×3 PSFs 2301 is illustrated, as is a set of transformed PSFs 2302 (e.g., as could be derived from application of a process such as shown in FIG. 19) with elements numbered in a manner similar to that used for the 3×3 and 5×5 PSFs from FIGS. 21 and 22. There is also a set of 9×9 template generative matrices 2304, which illustrates where the values from the PSFs could be inserted once they were available to allow for creation of sharpening kernels such as described previously.

Other types of variations may also be possible. For example, in some implementations, a biosensor may be manufactured which omits one or more features designed to minimize crosstalk, such as omitting light guides 462 of the detection device 404, relying on computational methods such as described herein instead of physical structures to address crosstalk. Similarly, aspects of the disclosed technology may also be applied in contexts other than bioassay systems. For example, other types of imaging systems, such as digital cameras may also experience crosstalk in which photons for one imaging element will be detected by another imaging element, and the disclosed technology may be applied to compensate for crosstalk in such signals in a manner similar to how it may be applied in bioassay systems. Accordingly, the examples provided herein should be understood as being illustrative only, and should not be treated as limiting on the protection provided by this document or any related document.

It is to be understood that the subject matter described herein is not limited in its application to the details of construction and the arrangement of components set forth in the description herein or illustrated in the drawings hereof. The subject matter described herein is capable of other implementations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

When used in the claims, the term "set" should be understood as one or more things which are grouped together. Similarly, when used in the claims "based on" should be understood as indicating that one thing is determined at least in part by what it is specified as being "based on". Where one thing is required to be exclusively determined by another thing, then that thing will be referred to as being "EXCLUSIVELY based on" that which it is determined by.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Also, it is to be understood that phraseology and terminology used herein with reference to device or element orientation (such as, for example, terms like "above," "below," "front," "rear," "distal," "proximal," and the like) are only used to simplify description of one or more examples described herein, and do not alone indicate or imply that the device or element referred to must have a particular orientation. In addition, terms such as "outer" and "inner" are used herein for purposes of description and are not intended to indicate or imply relative importance or significance.

It is to be understood that the above description is intended to be illustrative, and not restrictive. For example, the above-described examples (and/or aspects thereof) may be used in combination with each other. In addition, many modifications may be made to adapt a particular situation or material to the teachings of the presently described subject matter without departing from its scope. While the dimensions, types of materials and coatings described herein are intended to define the parameters of the disclosed subject matter, they are by no means limiting and instead illustrations. Many further examples will be apparent to those of skill in the art upon reviewing the above description. The scope of the disclosed subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first" "second," and "third," etc. are used merely as labels, and are not intended to impose numerical requirements on their objects. Further, the limitations of the following claims are not written in means plus-function format and are not intended to be interpreted based on 35 U.S.C. § 112, sixth paragraph, unless and until such claim limitations expressly use the phrase "means for" followed by a statement of function void of further structure.

The following claims recite aspects of certain examples of the disclosed subject matter and are considered to be part of the above disclosure. These aspects may be combined with one another.

What is claimed is:

1. A method comprising:
   capturing, at each of a set of light sensors, a captured illumination value representing photons detected by that light sensor, wherein:
     the set of light sensors is disposed in a two dimensional pattern in which each light sensor from the set of light sensors is adjacent to at least two other light sensors from the set of light sensors; and
     each light sensor from the set of light sensors has a corresponding reaction site from a set of reaction sites;
   determining a generative function, wherein:
     the generative function is determined based on one or more point spread functions (PSFs), each modeling how illumination emitted by a reaction site is detected by both a corresponding light sensor for that reaction site as well as surrounding light sensors; and
     the generative function provides a mapping of illumination emitted from the set of reaction sites to photons detected by the set of light sensors;
   determining a set of sharpening kernels based on the generative function; and
   obtaining a set of crosstalk corrected illumination values based on, for each light sensor from the set of light sensors, applying a corresponding sharpening kernel from the set of sharpening kernels to a set of captured illumination values comprising:
     the captured illumination value representing photons detected by that light sensor; and
     captured illumination values representing photons detected by a plurality of light sensors, wherein the plurality of light sensors comprises each light sensor which is adjacent to that light sensor;
   wherein:
     each sharpening kernel from the set of sharpening kernels is a square matrix having a first side length;
     the generative function comprises a set of generative matrices, each of which is a square matrix having a second side length;
     each of the one or more point spread functions is a square matrix having a third side length;
     each generative matrix from the set of generative matrices has a corresponding point spread function;
     the second side length is equal to the square of the first side length; and
     the first side length and the third side length are both odd.

2. The method of claim 1, wherein the third side length is different from the first side length.

3. The method of claim 1, wherein determining the generative function comprises, for each generative matrix, defining elements of that generative matrix to have values corresponding to a plurality of square submatrices which form a tiling of that generative matrix, wherein:
   each of the plurality of square submatrices has a side length equal to the first side length;
   the plurality of square submatrices comprises a submatrix corresponding to each row of that generative matrix's corresponding PSF, in which:
   that submatrix has a top row comprising:
   a leftmost set of elements having element values are equal to those of that generative matrix's corresponding PSF's corresponding row's middle element and that element's leftward neighbors, wherein the leftmost set of elements' cardinality is equal to a first number, and wherein the first number is equal to the third side length divided by two and rounded up;
   a rightmost set of elements having element values equal to zero, wherein the rightmost set of elements' cardinality is equal to the first side length less the first number of elements;
   that submatrix has a left column comprising:
   a topmost set of elements having element values equal to those of that generative matrix's corresponding PSF's corresponding row's middle element and that element's rightward neighbors, wherein the topmost set of elements' cardinality is equal to the first number;
   a bottommost set of elements having element values equal to zero, wherein the bottommost set of elements' cardinality is equal to the first side length less the first number of elements;
   and
   that submatrix comprises a set of diagonal elements, each of which has an element value equal to that of its upper left neighbor, wherein the cardinality of the union of the top row, the left column, and the set of diagonal elements is equal to the square of the first side length;
   the plurality of square submatrices comprises a top row of submatrices, a left column of submatrices, and a diagonal set of submatrices, in which:
   the top row of submatrices comprises:
   a leftmost set of submatrices, starting with the submatrix corresponding to that generative matrix's corresponding PSF's middle row and continuing rightward with the submatrices corresponding to all rows below the middle row in that generative matrix's corresponding PSF;
   and
   a rightmost set of submatrices, the rightmost set of submatrices having a cardinality equal to the first side length less the first number, wherein each submatrix in the rightmost set of submatrices consists of zero valued elements;

the left column of submatrices comprises:
a topmost set of submatrices, starting with the submatrix corresponding to that generative matrix's corresponding PSF's middle row and continuing downward with the submatrices corresponding to all rows above the middle row in that generative matrix's corresponding PSF; and a bottommost set of submatrices, the bottommost set of submatrices having a cardinality equal to the first side length less the first number, wherein each submatrix in the bottommost set of submatrices consists of zero valued elements;

the diagonal set of submatrices comprises all of the plurality of square submatrices which are not comprised by the top row of submatrices or the left column of submatrices; and each submatrix in the diagonal set of submatrices is the same as its upper left neighbor.

4. The method of claim 1, wherein determining the generative function comprises, for each generative matrix:
for each row in that generative matrix, defining that row by:
obtaining a transformed PSF by reflecting that generative matrix's corresponding PSF over its vertical and horizontal axes;
creating an intermediate matrix by center placing the transformed PSF on a corresponding element in a square matrix consisting of zero valued elements and having a cardinality equal to the square of the first side length; and
row flattening that intermediate matrix to define that row.

5. The method of claim 1, wherein determining the set of sharpening kernels based on the generative function comprises, for each generative matrix from the set of generative matrices:
determining an intermediate matrix which is an inverse of that generative matrix; and
convert a middle row of the intermediate matrix into a corresponding sharpening kernel in which:
the corresponding sharpening kernel's topmost row is the same as a leftmost set of elements in the middle row of the intermediate matrix having a cardinality equal to the first side length; and
each row below the topmost row in the corresponding sharpening kernel starts with the leftmost element from the middle row of the intermediate matrix which does not appear in any higher row of the corresponding sharpening kernel, and continues with so many of that element's rightward neighbors as are necessary to complete that row.

6. The method of claim 1, wherein:
the set of light sensors is organized as an array having a plurality of odd columns, a plurality of odd rows, a plurality of even columns and a plurality of even rows;
the one or more PSFs comprises:
an odd-odd PSF, modeling how illumination from reaction sites corresponding to light sensors in odd rows and columns is detected by both those reaction sites' corresponding light sensors and surrounding light sensors;
an odd-even PSF, modeling how illumination from reaction sites corresponding to light sensors in odd rows and even columns is detected by both those reaction sites' corresponding light sensors and surrounding light sensors;
an even-odd PSF, modeling how illumination from reaction sites corresponding to light sensors in even rows and odd columns is detected by both those reaction sites' corresponding light sensors and surrounding light sensors; and
an even-even PSF, modeling how illumination from reaction sites corresponding to light sensors in even rows and odd columns is detected by both those reaction sites' corresponding light sensors and surrounding light sensors;

the generative function comprises:
an even-even generative matrix;
an even-odd generative matrix;
an odd-odd generative matrix;
an odd-even generative matrix;

the even-even generative matrix corresponds to a first intermediate PSF consisting of:
a first subset of elements of the odd-odd PSF;
a first subset of elements of the even-even PSF;
a first subset of elements of the odd-even PSF; and
a first subset of elements of the even-odd PSF;

the even-odd generative matrix corresponds to a second intermediate PSF consisting of:
a second subset of elements of the odd-odd PSF;
a second subset of elements of the even-even PSF;
a second subset of elements of the odd-even PSF; and
a second subset of elements of the even-odd PSF;

the odd-odd generative matrix corresponds to a third intermediate PSF consisting of:
a third subset of elements of the odd-odd PSF;
a third subset of elements of the even-even PSF;
a third subset of elements of the odd-even PSF; and
a third subset of elements of the even-odd PSF;

the odd-even generative matrix corresponds to a fourth intermediate PSF consisting of:
a fourth subset of elements of the odd-odd PSF;
a fourth subset of elements of the even-even PSF;
a fourth subset of elements of the odd-even PSF; and
a fourth subset of elements of the even-odd PSF; and for each of the odd-odd, even-even, odd-even, and even-odd PSFs, that PSF's first, second, third and fourth subsets of elements are disjoint.

7. The method of claim 6, wherein:
determining the set of sharpening kernels based on the generative function comprises:
generating a first intermediate generative matrix consisting of:
a first subset of elements of the odd-odd generative matrix;
a first subset of elements of the even-even generative matrix;
a first subset of elements of the odd-even generative matrix; and
a first subset of elements of the even-odd generative matrix;
generating a second intermediate generative matrix consisting of:
a second subset of elements of the odd-odd generative matrix;
a second subset of elements of the even-even generative matrix;
a second subset of elements of the odd-even generative matrix; and a second subset of elements of the even-odd generative matrix;
generating a third intermediate generative matrix consisting of:
a third subset of elements of the odd-odd generative matrix;
a third subset of elements of the even-even generative matrix;
a third subset of elements of the odd-even generative matrix; and
a third subset of elements of the even-odd generative matrix;
generating a fourth intermediate generative matrix consisting of:
a fourth subset of elements of the odd-odd generative matrix;
a fourth subset of elements of the even-even generative matrix;
a fourth subset of elements of the odd-even generative matrix; and
a fourth subset of elements of the even-odd generative matrix;
for each of the first, second, third and fourth intermediate generative matrices:
determining an additional intermediate matrix which is an inverse of that generative matrix;
convert a middle row of the additional intermediate matrix into a corresponding sharpening kernel in which:
the corresponding sharpening kernel's topmost row is the same as a leftmost set of elements in the middle row of the additional intermediate matrix having a cardinality equal to the first side length; and
each row below the topmost row in the corresponding sharpening kernel starts with the leftmost element from the middle row of the additional intermediate matrix which does not appear in any higher row of the corresponding sharpening kernel, and continues with so many of that element's rightward neighbors as are necessary to complete that row;
for each of the odd-odd, even-even, odd-even, and even-odd generative matrices, that generative matrix's first, second, third and fourth subsets of elements are disjoint;
obtaining the set of crosstalk corrected illumination values comprises, for each light sensor from the plurality of light sensors:
obtaining a first intermediate sharpened matrix by applying a corresponding sharpening kernel converted from the middle row in the first intermediate generative matrix to the set of captured illumination values;
obtaining a second intermediate sharpened matrix by applying a corresponding sharpening kernel converted from the middle row in the second intermediate generative matrix to the set of captured illumination values;
obtaining a third intermediate sharpened matrix by applying a corresponding sharpening kernel converted from the middle row in the third intermediate generative matrix to the set of captured illumination values;
obtaining a fourth intermediate sharpened matrix by applying a corresponding sharpening kernel converted from the middle row in the fourth intermediate generative matrix to the set of captured illumination values;

obtaining the set of crosstalk corrected illumination values by combining:
a first subset of elements of the first intermediate sharpened matrix;
a second subset of elements of the second intermediate sharpened matrix;
a third subset of elements of the third intermediate sharpened matrix; and
a fourth subset of elements of the fourth intermediate sharpened matrix.

8. The method of claim 1, wherein:
each reaction site from the set of reaction sites corresponds to only one light sensor from the set of light sensors
the set of reaction sites are wells disposed in the surface of a flowcell; and
the set of crosstalk corrected illumination values is used in sequencing nucleotides disposed within the reaction sites.

9. The method of claim 1, wherein the generative function and set of sharpening kernels are determined prior to capturing, at each of the set of light sensors, the captured illumination value representing photons detected by that light sensor.

10. A system comprising a processor and a non-transitory computer readable medium storing instructions to, when executed by the processor:
determine a generative function, wherein:
the generative function is determined based on one or more point spread functions (PSFs), each modeling how illumination emitted by a reaction site from a set of reaction sites is detected by both a corresponding light sensor for that reaction site as well as surrounding light sensors comprised by a set of light sensors; and
the generative function provides a mapping of illumination emitted from the set of reaction sites to photons detected by the set of light sensors;
determine a set of sharpening kernels based on the generative function, wherein each sharpening kernel from the set of sharpening kernels corresponds to a light sensor from the set of light sensors; and
obtain a set of crosstalk corrected illumination values based on, for each light sensor from the set of light sensors, applying a corresponding sharpening kernel from the set of sharpening kernels to a set of captured illumination values comprising:
the captured illumination value representing photons detected by that light sensor; and
captured illumination values representing photons detected by a plurality of light sensors, wherein the plurality of light sensors comprises each light sensor which is adjacent to that light sensor;
wherein:
each sharpening kernel from the set of sharpening kernels is a square matrix having a first side length;
the generative function comprises a set of generative matrices, each of which is a square matrix having a second side length;
each of the one or more point spread functions is a square matrix having a third side length;
each generative matrix from the set of generative matrices has a corresponding point spread function;
the second side length is equal to the square of the first side length; and
the first side length and the third side length are both odd.

11. The system of claim 10, wherein the third side length is different from the first side length.

12. The system of claim 10, wherein determining the generative function comprises, for each generative matrix, defining elements of that generative matrix to have values corresponding to a plurality of square submatrices which form a tiling of that generative matrix, wherein:
- each of the plurality of square submatrices has a side length equal to the first side length;
- the plurality of square submatrices comprises a submatrix corresponding to each row of that generative matrix's corresponding PSF, in which:
  - that submatrix has a top row comprising:
    - a leftmost set of elements having element values are equal to those of that generative matrix's corresponding PSF's corresponding row's middle element and that element's leftward neighbors, wherein the leftmost set of elements' cardinality is equal to a first number, and wherein the first number is equal to the third side length divided by two and rounded up;
    - a rightmost set of elements having element values equal to zero, wherein the rightmost set of elements' cardinality is equal to the first side length less the first number of elements;
  - that submatrix has a left column comprising:
    - a topmost set of elements having element values equal to those of that generative matrix's corresponding PSF's corresponding row's middle element that element's rightward neighbors, wherein the topmost set of elements' cardinality is equal to the first number;
    - a bottommost set of elements having element values equal to zero, wherein the bottommost set of elements' cardinality is equal to the first side length less the first number of elements; and
  - that submatrix comprises a set of diagonal elements, each of which has an element value equal to that of its upper left neighbor, wherein the cardinality of the union of the top row, the left column, and the set of diagonal elements is equal to the square of the first side length;
- the plurality of square submatrices comprises a top row of submatrices, a left column of submatrices, and a diagonal set of submatrices, in which:
  - the top row of submatrices comprises:
    - a leftmost set of submatrices, starting with the submatrix corresponding to that generative matrix's corresponding PSF's middle row and continuing rightward with the submatrices corresponding to all rows below the middle row in that generative matrix's corresponding PSF; and
    - a rightmost set of submatrices, the rightmost set of submatrices having a cardinality equal to the first side length less the first number, wherein each submatrix in the rightmost set of submatrices consists of zero valued elements;
  - the left column of submatrices comprises:
    - a topmost set of submatrices, starting with the submatrix corresponding to that generative matrix's corresponding PSF's middle row and continuing downward with the submatrices corresponding to all rows above the middle row in that generative matrix's corresponding PSF; and
    - a bottommost set of submatrices, the bottommost set of submatrices having a cardinality equal to the first side length less the first number, wherein each submatrix in the bottommost set of submatrices consists of zero valued elements;
  - the diagonal set of submatrices comprises all of the plurality of square submatrices which are not comprised by the top row of submatrices or the left column of submatrices; and
  - each submatrix in the diagonal set of submatrices is the same as its upper left neighbor.

13. The system of claim 10, wherein determining the generative function comprises, for each generative matrix:
- for each row in that generative matrix, defining that row by:
  - obtaining a transformed PSF by reflecting that generative matrix's corresponding PSF over its vertical and horizontal axes;
  - creating an intermediate matrix by center placing the transformed PSF on a corresponding element in a square matrix consisting of zero valued elements and having a cardinality equal to the square of the first side length; and
  - row flattening that intermediate matrix to define that row.

14. The system of claim 10, wherein determining the set of sharpening kernels based on the generative function comprises, for each generative matrix from the set of generative matrices:
- determining an intermediate matrix which is an inverse of that generative matrix; and
- convert a middle row of the intermediate matrix into a corresponding sharpening kernel in which:
  - the corresponding sharpening kernel's topmost row is the same as a leftmost set of elements in the middle row of the intermediate matrix having a cardinality equal to the first side length; and
  - each row below the topmost row in the corresponding sharpening kernel starts with the leftmost element from the middle row of the intermediate matrix which does not appear in any higher row of the corresponding sharpening kernel, and continues with so many of that element's rightward neighbors as are necessary to complete that row.

15. The system of claim 10, wherein:
- the set of light sensors is organized as an array having a plurality of odd columns, a plurality of odd rows, a plurality of even columns and a plurality of even rows;
- the one or more PSFs comprises:
  - an odd-odd PSF, modeling how illumination from reaction sites corresponding to light sensors in odd rows and columns is detected by both those reaction sites' corresponding light sensors and surrounding light sensors;
  - an odd-even PSF, modeling how illumination from reaction sites corresponding to light sensors in odd rows and even columns is detected by both those reaction sites' corresponding light sensors and surrounding light sensors;
  - an even-odd PSF, modeling how illumination from reaction sites corresponding to light sensors in even rows and odd columns is detected by both those reaction sites' corresponding light sensors and surrounding light sensors; and
  - an even-even PSF, modeling how illumination from reaction sites corresponding to light sensors in even rows and odd columns is detected by both those reaction sites' corresponding light sensors and surrounding light sensors the generative function comprises:
an even-even generative matrix;
an even-odd generative matrix;
an odd-odd generative matrix;
an odd-even generative matrix;
the even-even generative matrix corresponds to a first intermediate PSF consisting of:
a first subset of elements of the odd-odd PSF;
a first subset of elements of the even-even PSF;
a first subset of elements of the odd-even PSF; and
a first subset of elements of the even-odd PSF;
the even-odd generative matrix corresponds to a second intermediate PSF consisting of:
a second subset of elements of the odd-odd PSF;
a second subset of elements of the even-even PSF;
a second subset of elements of the odd-even PSF; and
a second subset of elements of the even-odd PSF;
the odd-odd generative matrix corresponds to a third intermediate PSF consisting of:
a third subset of elements of the odd-odd PSF;
a third subset of elements of the even-even PSF;
a third subset of elements of the odd-even PSF; and
a third subset of elements of the even-odd PSF;
the odd-even generative matrix corresponds to a fourth intermediate PSF consisting of:
a fourth subset of elements of the odd-odd PSF;
a fourth subset of elements of the even-even PSF;
a fourth subset of elements of the odd-even PSF; and
a fourth subset of elements of the even-odd PSF;
for each of the odd-odd, even-even, odd-even, and even-odd PSFs, that PSF's first, second, third and fourth subsets of elements are disjoint;
determining the set of sharpening kernels based on the generative function comprises:
generating a first intermediate generative matrix consisting of:
a first subset of elements of the odd-odd generative matrix;
a first subset of elements of the even-even generative matrix;
a first subset of elements of the odd-even generative matrix; and
a first subset of elements of the even-odd generative matrix;
generating a second intermediate generative matrix consisting of:
a second subset of elements of the odd-odd generative matrix;
a second subset of elements of the even-even generative matrix;
a second subset of elements of the odd-even generative matrix; and
a second subset of elements of the even-odd generative matrix;
generating a third intermediate generative matrix consisting of:
a third subset of elements of the odd-odd generative matrix;
a third subset of elements of the even-even generative matrix;
a third subset of elements of the odd-even generative matrix; and
a third subset of elements of the even-odd generative matrix;
generating a fourth intermediate generative matrix consisting of:
a fourth subset of elements of the odd-odd generative matrix;
a fourth subset of elements of the even-even generative matrix;
a fourth subset of elements of the odd-even generative matrix; and
a fourth subset of elements of the even-odd generative matrix;
for each of the first, second, third and fourth intermediate generative matrices:
determining an additional intermediate matrix which is an inverse of that generative matrix;
convert a middle row of the additional intermediate matrix into a corresponding sharpening kernel in which:
the corresponding sharpening kernel's topmost row is the same as a leftmost set of elements in the middle row of the additional intermediate matrix having a cardinality equal to the first side length; and
each row below the topmost row in the corresponding sharpening kernel starts with the leftmost element from the middle row of the additional intermediate matrix which does not appear in any higher row of the corresponding sharpening kernel, and continues with so many of that element's rightward neighbors as are necessary to complete that row;
and
for each of the odd-odd, even-even, odd-even, and even-odd generative matrices, that generative matrix's first, second, third and fourth subsets of elements are disjoint.

16. A system comprising a processor and a non-transitory computer readable medium storing instructions to, when executed by the processor:
capture, at each of a set of light sensors, a captured illumination value representing photons detected by that light sensor, wherein:
the set of light sensors is disposed in a two dimensional pattern in which each light sensor from the set of light sensors is adjacent to at least two other light sensors from the set of light sensors; and
each light sensor from the set of light sensors has a corresponding reaction site from a set of reaction sites;
determine a generative function, wherein:
the generative function is determined based on one or more point spread functions (PSFs), each modeling how illumination emitted by a reaction site is detected by both a corresponding light sensor for that reaction site as well as surrounding light sensors; and
the generative function provides a mapping of illumination emitted from the set of reaction sites to photons detected by the set of light sensors;
determine a set of sharpening kernels based on the generative function;
and
obtain a set of crosstalk corrected illumination values based on, for each light sensor from the set of light sensors, applying a corresponding sharpening kernel from the set of sharpening kernels to a set of captured illumination values comprising:
the captured illumination value representing photons detected by that light sensor; and
captured illumination values representing photons detected by a plurality of light sensors, wherein the plurality of light sensors comprises each light sensor which is adjacent to that light sensor;

wherein:

each sharpening kernel from the set of sharpening kernels is a square matrix having a first side length;

the generative function comprises a set of generative matrices, each of which is a square matrix having a second side length;

each of the one or more point spread functions is a square matrix having a third side length;

each generative matrix from the set of generative matrices has a corresponding point spread function;

the second side length is equal to the square of the first side length; and the first side length and the third side length are both odd.

17. The system of claim 16, wherein obtaining the set of crosstalk corrected illumination values comprises, for each light sensor from the plurality of light sensors:

obtaining a first intermediate sharpened matrix by applying a first corresponding sharpening kernel to the set of captured illumination values;

obtaining a second intermediate sharpened matrix by applying a second corresponding sharpening kernel to the set of captured illumination values;

obtaining a third intermediate sharpened matrix by applying a third corresponding sharpening kernel to the set of captured illumination values;

obtaining a fourth intermediate sharpened matrix by applying a fourth corresponding sharpening kernel to the set of captured illumination values;

obtaining the set of crosstalk corrected illumination values by combining:

a first subset of elements of the first intermediate sharpened matrix;

a second subset of elements of the second intermediate sharpened matrix;

a third subset of elements of the third intermediate sharpened matrix; and a fourth subset of elements of the fourth intermediate sharpened matrix.

18. The system of claim 16, wherein:

the set of reaction sites are wells disposed in the surface of a flowcell; and the non-transitory computer readable medium stores instructions to use the set of crosstalk corrected illumination values in sequencing nucleotides disposed within the reaction sites.

* * * * *